United States Patent
Mori

(10) Patent No.: US 9,165,590 B2
(45) Date of Patent: *Oct. 20, 2015

(54) MINUTE STRUCTURE AND INFORMATION RECORDING MEDIUM

(71) Applicant: RICOH COMPANY, LTD., Tokyo (JP)

(72) Inventor: Tetsuji Mori, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/044,069

(22) Filed: Oct. 2, 2013

(65) Prior Publication Data

US 2014/0030531 A1 Jan. 30, 2014

Related U.S. Application Data

(62) Division of application No. 12/050,266, filed on Mar. 18, 2008, now Pat. No. 8,663,772.

(30) Foreign Application Priority Data

| Mar. 19, 2007 | (JP) | 2007-071485 |
| Mar. 26, 2007 | (JP) | 2007-079482 |
| Apr. 27, 2007 | (JP) | 2007-120218 |
| Oct. 24, 2007 | (JP) | 2007-276730 |

(51) Int. Cl.
  *G11B 7/243* (2013.01)
  *G11B 7/26* (2006.01)
  *B82Y 10/00* (2011.01)
  *B82Y 30/00* (2011.01)
  *G11B 7/0045* (2006.01)
  *G11B 7/2403* (2013.01)
  *G11B 7/24085* (2013.01)
  *G11B 7/2467* (2013.01)

(52) U.S. Cl.
  CPC . *G11B 7/26* (2013.01); *B82Y 10/00* (2013.01); *B82Y 30/00* (2013.01); *G11B 7/00452* (2013.01); *G11B 7/2403* (2013.01); *G11B 7/243* (2013.01); *G11B 7/24085* (2013.01); *G11B 7/2467* (2013.01); *G11B 7/261* (2013.01); *G11B 7/263* (2013.01); *G11B 2007/2432* (2013.01); *G11B 2007/24312* (2013.01); *G11B 2007/24324* (2013.01)

(58) Field of Classification Search
  CPC .......... G11B 7/243; G11B 7/2437; G11B 2007/2432; G11B 2007/24324; G11B 2007/24304
  USPC .......... 428/64.4; 430/270.12, 270.13
  See application file for complete search history.

(56) References Cited

U.S. PATENT DOCUMENTS

| 3,223,838 | A | 12/1965 | Hoshino et al. |
| 3,793,025 | A | 2/1974 | Vrancken et al. |
| 4,005,654 | A | 2/1977 | Gundlach |
| 4,188,214 | A | 2/1980 | Kido et al. |
| 4,214,249 | A | 7/1980 | Kasai et al. |
| 4,405,706 | A | 9/1983 | Takahashi et al. |
| 4,499,178 | A * | 2/1985 | Wada et al. ............. 430/270.12 |
| 5,326,673 | A | 7/1994 | Kurumisawa |
| 5,718,996 | A | 2/1998 | Iijima et al. |
| 6,339,582 | B1 | 1/2002 | Ichihara et al. |
| 6,544,617 | B1 * | 4/2003 | Tyan et al. ................... 428/64.1 |
| 6,961,300 | B2 | 11/2005 | Cheong et al. |
| 7,501,225 | B2 | 3/2009 | Miura |
| 7,748,321 | B2 | 7/2010 | Brehm et al. |
| 7,851,779 | B2 | 12/2010 | Chong et al. |
| 2002/0005888 | A1 | 1/2002 | Obata et al. |
| 2003/0066638 | A1 | 4/2003 | Qu et al. |
| 2005/0041571 | A1 | 2/2005 | Ichihara et al. |
| 2005/0224452 | A1 | 10/2005 | Spiess et al. |
| 2006/0028970 | A1 | 2/2006 | Kondo et al. |
| 2006/0188828 | A1 | 8/2006 | Kwasny et al. |
| 2006/0216413 | A1 | 9/2006 | Saito et al. |
| 2006/0233999 | A1 | 10/2006 | Kurt et al. |
| 2007/0082293 | A1 | 4/2007 | Wimmberger-Friedl et al. |
| 2007/0217322 | A1 | 9/2007 | Hanaoka et al. |
| 2008/0035736 | A1 | 2/2008 | Tompkin et al. |
| 2008/0055970 | A1 | 3/2008 | Chong et al. |
| 2009/0314936 | A1 | 12/2009 | Okuno |

FOREIGN PATENT DOCUMENTS

| EP | 1 624 454 A2 | 2/2006 |
| EP | 1 695 780 A1 | 8/2006 |
| JP | 52-020821 A | 2/1977 |
| JP | 2001-250280 | 9/2001 |
| JP | 2002-365806 | 12/2002 |
| JP | 2003-145941 | 5/2003 |

(Continued)

OTHER PUBLICATIONS

Miura, Hiroshi et al., "Patterning of ZnS-SiO$_2$ by Laser Irradiation and Wet Etching Treatment", International Symposium on Optical Memory and Optical Data Storage, Jul. 10, 2005.

H. Kikuta et al., "Optical Elements with Subwavelength Structured Surfaces", Optical Review, vol. 10, No. 2, 2003, pp. 63-73.

M. Fujita et al., "Organic Light-Emitting Diode with ITO/Organic Photonic Crystal", Electronics Letters, vol. 39, No. 24, 2003, pp. 1750-1752.

Y. Lee et al., "A High-Extraction-Efficiency Nanopatterned Organic Light-emitting Diode", Applied Physics Letters, vol. 82, No. 21, 2003, pp. 3779-3781.

(Continued)

*Primary Examiner* — Gerard Higgins
(74) *Attorney, Agent, or Firm* — Dickstein Shapiro LLP

(57) ABSTRACT

There is disclosed a minute structure including a sulfur compound and a silicon oxide. There is also disclosed a write-once information recording medium including a substrate and a recording layer formed of a mixed inorganic material and deposited on the substrate, wherein the mixed inorganic material contains a sulfur compound and a silicon oxide.

2 Claims, 44 Drawing Sheets

(56) References Cited

FOREIGN PATENT DOCUMENTS

| | | |
|---|---|---|
| JP | 2005-071564 | 3/2005 |
| JP | 2005-099467 A | 4/2005 |
| JP | 2005-100602 | 4/2005 |
| JP | 2005-158191 | 6/2005 |
| JP | 2005-332452 A | 12/2005 |
| JP | 2006-219598 A | 8/2006 |
| JP | 2006-252671 | 9/2006 |
| KR | 10-2006-0096165 | 9/2006 |
| TW | 200423078 | 11/2004 |
| TW | 200508048 | 3/2005 |
| TW | 200523919 | 7/2005 |
| TW | 200635796 | 10/2006 |
| WO | WO 2005/063484 A1 | 7/2005 |
| WO | WO-2005083418 A1 | 9/2005 |
| WO | WO 2005112024 A1 | 11/2005 |
| WO | WO-2006029857 A2 | 3/2006 |
| WO | WO 2006/072895 A2 | 7/2006 |
| WO | WO 2007/026294 A1 | 3/2007 |
| WO | WO-2007/041255 A1 | 4/2007 |

OTHER PUBLICATIONS

M. Kitamura et al., "Enhanced Luminance Efficiency of Organic Light-Emitting Diodes with Two-Dimensional Photonic Crystals", Japanese Journal of Applied Physics, vol. 44, No. 4B, 2005, pp. 2844-2848.

K. Ishihara et al., "Direct Fabrication of Photonic Crystal on Glass Substrate by Nanoimprint Lithography", Japanese Journal of Applied Physics, vol. 45, No. 7, 2006, pp. L210-212.

M. Fujita, et al., "Optical and Electrical Characteristics of Organic Light-Emitting Diodes with Two-Dimensional Photonic Crystals in Organic/Electrode Layers", Japanese Journal of Applied Physics, vol. 44, No. 6A, 2005, pp. 3669-3677.

K. Kurihara et al., "High-Speed Optical Nanofabrication by Platinum Oxide Nano-Explosion", Journal of Optics A: Pure and Applied Optics, vol. 8, 2006, pp. S139-S143.

Ramsley, A., "Measurement of Infrared Fluorescence of Surfaces"; Opt. Soc. Am., 1967, vol. 57, p. 111-112.

* cited by examiner

750nm

500nm

750nm

500nm

750nm

500nm

750nm

500nm

750nm

500nm

750nm

500nm

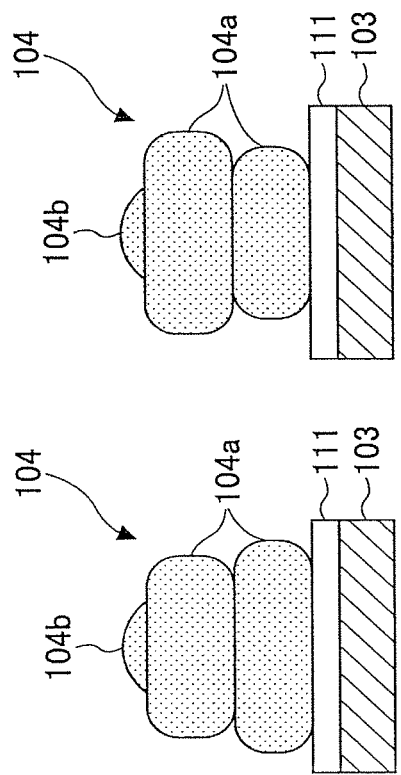

201

0.32 μm

200A

→ TRACK DIRECTION

750nm

750nm

750nm

750nm

750nm 1.50 μm

750nm

500nm

500nm

500nm

500nm

500nm

500nm

303

200nm 303    308

301    100nm

306

100nm

306

301

200nm

FIG.40A
FIG.40B
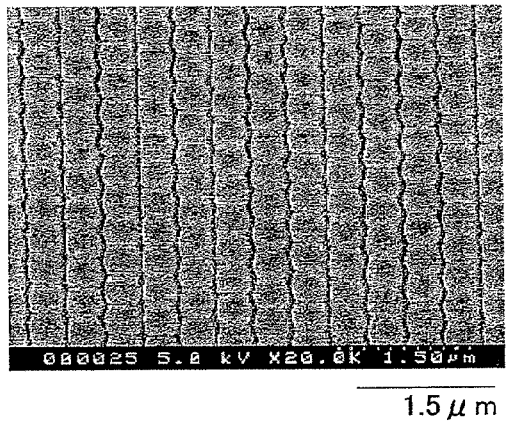
1.5 μm
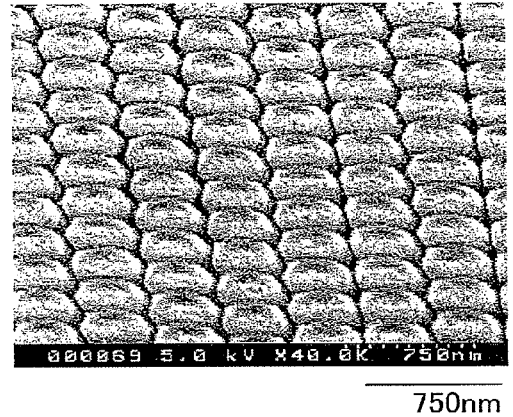
750nm

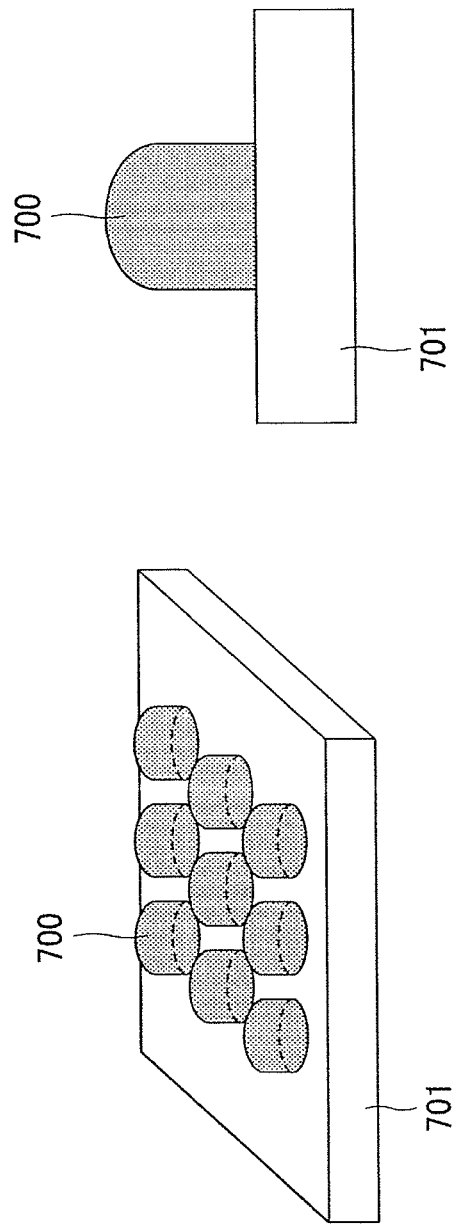

FIG.46A
FIG.46B
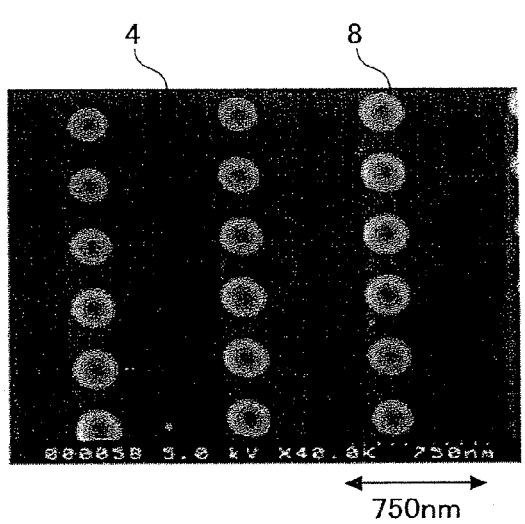
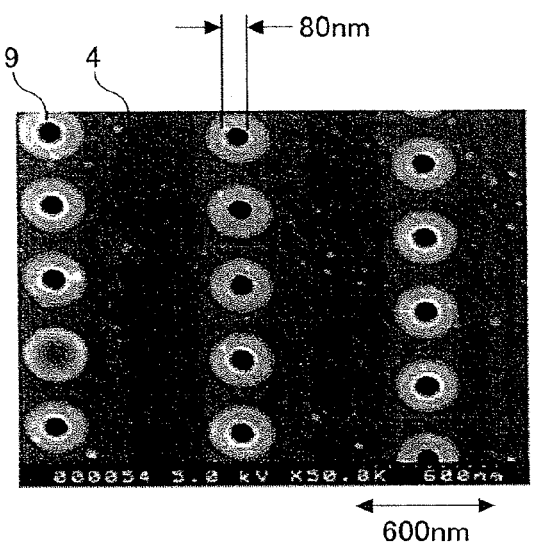

→ RADIAL DIRECTION

←→ 750nm

←→ 750nm

MINUTE STRUCTURE AND INFORMATION RECORDING MEDIUM

This application is a divisional of U.S. application Ser. No. 12/050,266, filed on Mar. 28, 2008, the entire disclosure of which is incorporated herein by reference.

BACKGROUND OF THE INVENTION

1. Field of the Invention

This invention relates to a minute structure and a write-once (WORM, or write-once read-many) information recording medium.

2. Description of the Related Art

Recently, the research and development of minute structures with a size ranging from nanometer scale to micrometer scale is carried out in many fields including nanophotonics, high-density recording media, optical elements, and biochemical chips. What is indispensable to those devices utilizing the opto-electronics is a material which is optically transparent in a visible light region and has little optical loss. For this reason, the research and development of a technology for producing a minute structure from a transparent material is carried out briskly.

Zinc oxide is optically transparent in a visible light region and has a property to absorb ultraviolet light. Zinc oxide is used for the purposes, such as LED, transparent transistor, UV cut material, electrophotography, etc.

Examples of the method of forming a zinc oxide may include the sputtering method, the ion plating method (refer to Japanese Laid-Open Patent Application No. 2006-117462), and the thermal decomposition of a precursor (refer to Japanese Laid-Open Patent Application No. 2007-022851).

Generally, when producing quantum wires, dots, etc. having a one-dimensional or two-dimensional periodical minute structure, any of an electron beam exposure system, an ion beam exposure system, and a stepper exposure system is used. However, these exposure systems require the vacuum source and they are expensive, and the production cost becomes high. For this reason, it is desired that simple patterning is performed with low cost and a periodical minute structure is produced.

If a periodical structure in which minute structures are arranged regularly is irradiated by light, unique phenomena, such as the photonic band effect, will arise. Applications of the periodical structure to an optical waveguide, an optical filter, an optical switch, a low threshold laser, etc. which utilize light resonance or photon inclusion, are expected. Moreover, it is known that a periodical structure in which minute structures are arranged regularly at intervals below the subwavelength serves to prevent the Fresnel reflection and exhibits non-reflection characteristics by the structure called moth-eye structure (refer to OPTICAL REVIEW, Vol. 10, No. 2, 2003, pages 63-73).

On the other hand, in the field of biotechnology, it is strongly demanded to use a minute structure as a DNA chip in which molecules and atoms are selectively combined. The DNA chip enables the existence of a gene which is the cause of sickness to be easily investigated, and is used for study on the gene and diagnosis of the sickness.

The DNA chip usually is composed of a thin substrate of silicon or glass, and a DNA (deoxyribonucleic acid) which constitutes the gene which is the cause of sickness is stuck on the DNA chip. If the blood taken from the patient and processed is dropped on the DNA chip and the gene which is the cause of sickness exists in the blood, the DNA in the blood adheres to the DNA of the DNA chip. It is easily judged whether the patient is sick or not. If the behavior of gene is investigated, early detection of sickness and anticipation of the side effects of drugs will be attained. At the medical spots, the demands for genetic screening grow quickly.

Moreover, as for metallic minute structures which are regularly arranged in a two-dimensional formation, the application deployment utilizing interaction of light and molecules by surface plasmon excitation is expected.

The existing method of producing a minute structure and a periodical structure in which minute structures are arranged regularly, uses optical lithography in a semiconductor microfabrication. Since the existing method requires an expensive electron-beam lithography system, it has a problem of high cost. Moreover, the size of the minute structure produced depends on the performance of the producing equipment.

On the other hand, a mask is produced and the existing method has an advantage that it is suitable for mass production. However, it is unsuitable for a simple circuit design at a time of specification change and a simple experiment at an experimental stage.

There is also known a method of producing a three-dimensional minute structure or a three-dimensional photonic crystal using the 2-photon absorption by a laser beam (refer to Japanese Laid-Open Patent Applications No. 2003-001599 and No. 2005-122002). However, the production needs much time and the material used is limited to the resin that can be produced by a photopolymerization reaction. For this reason, a simple, inexpensive method of producing a minute structure which can improve resource saving further is demanded.

The existing method of forming a reversal structure of a minute structure or a periodical structure in which minute structures are arranged regularly uses emboss processing including an injection molding. In recent years, the nano imprint technology which accurately transfers a reversal structure of a nano-scale structure has been developed. The nano imprint technology using photopolymerization or thermal polymerization can produce a reversal structure of a master mold with sufficiently high accuracy, and it is suitable for mass production. When a reversal structure is used as a photonic crystal, a different effect from a master mold arises.

In recent years, attention is given to heat lithography as a low-cost processing method which is more cost-effective than the microfabrication using optical lithography. Heat lithography is a microfabrication technology utilizing the principle that when an endothermic layer is heated (which layer functions as a light absorption layer when irradiated by a laser beam), the characteristics (light transmittance, refractive index, conductivity, chemistry corrosion resistance, etc.) of the heated part are changed. The temperature distribution of the area irradiated by light turns into Gaussian distribution, the area of the high-temperature region in the center of the distribution is about $1/10$ of the area of a light spot, and the characteristics of that area only are changed. Thus, fabrication of a minute pattern is possible.

Japanese Laid-Open Patent Application No 2005-158191 discloses a method of manufacturing an optical recording medium which includes at least a step of laminating a first dielectric layer, a light absorption layer, and a second dielectric layer one by one on a supporting substrate, a step of emitting a laser beam to record information, and a step of removing a non-recorded area of the second dielectric layer by wet etching, to form a convex part of the second dielectric layer.

In the method disclosed in Japanese Laid-Open Patent Application No. 2005-158191, the convex part of the second dielectric layer formed has a cross section which is rectangular or in an inverse tapered shape, and since the etching resistance is increased only in the vicinity of the maximum value in the heat distribution (Gaussian distribution), the size of the convex part is less than the diffraction limit of light. And the etching resistance of the 2nd dielectric layer on the light absorption layer where the laser light is absorbed improves and the convex part is formed. However, since there are many uses which require removal of the light absorption layer, forming the convex part, without forming the light absorption layer is demanded. There is also a problem that, when forming a concave part in the second dielectric layer, the end of the concave part is roughed.

An optical element having a subwavelength structure or a fine structure of photonic crystal is demanded in recent years. Application of such fine structure is not limited to optical elements. For example, an organic electro-luminescence (OEL) display or organic light-emitting diode display (OLED) is a new generation light-emitting display using an organic compound. When compared with the conventional display, the light emitted by the OLED is bright and clear, the angle of field is large, the display is of thin type, and the operational temperature range is extensive. The OLED is observed as a display with the outstanding features. Moreover, it is known that the luminous efficiency of OLED is improved by combining it with a two-dimensional photonic crystal structure. For example, refer to "M. Fujita, T. Ueno, T. Asano, S. Noda, H. Ohata, T. Tsuji, H. Nakada and N. Shimoji, Electronics Letters, Vol. 39, p. 1750 (2003)", "Y. Lee, S. Kim, J. Huh, G. Kim and Y. Lee, Applied Physics Letters, Vol. 82, p. 3779 (2003)", "M. Kitamura, S. Iwamoto and Y. Arakawa, Japanese Journal of Applied Physics, Vol. 44, p. 2844 (2005)", "K. Ishihara, M. Fujita, I. Matsubara, T. Asano and S. Noda, Japanese Journal of Applied Physics, Vol. 45, No. 7, p. L210 (2006)", and "M. Fujita, K. Ishihara, T. Ueno, T. Asano, S. Noda, H. Ohata, T. Tsuji, H. Nakada and N. Shimoji, Japanese Journal of Applied Physics, Vol. 44, p. 3669 (2005)".

Also in photoelectric conversion devices, such as solar cells, the necessity for fine structure is known. The solar cells are grouped into dry-type solar cells formed of single crystal silicon, polycrystalline silicon, amorphous silicone, etc. and wet-type solar cells, such as Graetzel cell or dye-sensitized solar cell. In the dye sensitized type solar cell, titanium oxide is used as a semiconductor electrode. However, theoretically, solar cells using other oxide semiconductors may be attained and various researches for the purposes are in progress.

SUMMARY OF THE INVENTION

According to one aspect of the invention, there is disclosed an improved minute structure in which the above-described problems are eliminated.

According to one aspect of the invention, there is disclosed a minute structure which can be easily formed by using the heat lithography.

According to one aspect of the invention, there is disclosed a minute-structure manufacturing method which can easily form a minute structure by using the heat lithography.

According to one aspect of the invention, there is disclosed a write-once information recording medium which can be produced with low cost and can form a minute recording mark therein.

In an embodiment of the invention which solves or reduces one or more of the above-mentioned problems, there is disclosed a minute structure comprising a sulfur compound and a silicon oxide.

The above-mentioned minute structure may be arranged so that the minute structure is in any one of a convex configuration having a curved surface, a configuration in which a convex structure having a curved surface is formed on a cylinder structure, and a cylindrical configuration.

The above-mentioned minute structure may be arranged so that the minute structure is in any one of a convex configuration having a curved surface, a configuration in which a convex structure having a curved surface is formed on a cylinder structure, and a configuration in which a cylindrical cross section is formed continuously.

The above-mentioned minute structure may be arranged so that the sulfur compound contains ZnS.

The above-mentioned minute structure may be arranged so that the sulfur compound contains a first sulfur compound for raising an optical absorption ability to a light with a predetermined wavelength.

The above-mentioned minute structure may be arranged so that the sulfur compound contains at least one of FeS and $GeS_2$.

The above-mentioned minute structure may be arranged so that the minute structure further comprises a material for raising an optical absorption ability to a light with a predetermined wavelength.

The above-mentioned minute structure may be arranged so that the material for raising the optical absorption ability to the light with the predetermined wavelength contains at least one of Al, Ag, Au, Cu, Zn, Pt, Sb, Te, Ge, Si, Bi, Mn, W, Nb, Co, Sr, Fe, In, Sn, Ni, Mo, Mg, and Ca.

The above-mentioned minute structure may be arranged so that the minute structure further comprises an oxide of the material for raising the optical absorption ability to the light with the predetermined wavelength.

The above-mentioned minute structure may be arranged so that the material for raising the optical absorption ability to the light with the predetermined wavelength contains at least one of a second sulfur compound and a zinc compound.

The above-mentioned minute structure may be arranged so that the material for raising the optical absorption ability to the light with the predetermined wavelength contains at least one of ZnTe, ZnSe, and MnS.

The above-mentioned minute structure may be arranged so that the material for raising the optical absorption ability to the light with the predetermined wavelength contains a fluorescent material.

The above-mentioned minute structure may be arranged so that the fluorescent material is either CdSe or CdTe.

The above-mentioned minute structure may be arranged so that a percentage of content of the silicon oxide is in a range between 10 mol % and 30 mol %.

In an embodiment of the invention which solves or reduces one or more of the above-mentioned problems, there is disclosed a method of manufacturing a minute structure, the method comprising the steps of: forming a layer, containing a sulfur compound and a silicon oxide, on a substrate; irradiating the layer containing the sulfur compound and the silicon oxide by a laser beam; etching the layer irradiated by the laser beam to form a minute structure, wherein the sulfur compound contains a first sulfur compound for raising an optical absorption ability to a light with a predetermined wavelength, or the layer containing the sulfur compound and the silicon oxide further contains a material for raising the optical absorption ability.

In an embodiment of the invention which solves or reduces one or more of the above-mentioned problems, there is disclosed a write-once information recording medium comprising: a substrate; and a recording layer formed of a mixed inorganic material and deposited on the substrate, wherein the mixed inorganic material contains a sulfur compound and a silicon oxide.

The above-mentioned write-once information recording medium may be arranged so that the mixed inorganic material further contains an inorganic material which is different from the sulfur compound and the silicon oxide and chosen from among a metal, a semimetal, and a semiconductor, and the recording layer has an optical absorption ability to a light with a predetermined wavelength which is larger than an optical absorption ability of a recording layer of a same thickness which does not contain the inorganic material.

The above-mentioned write-once information recording medium may be arranged so that the write-once information recording medium further comprises a dielectric layer and a reflection layer which are deposited on the substrate.

The above-mentioned write-once information recording medium may be arranged so that the inorganic material contains an element which constitutes the sulfur compound and the silicon oxide.

The above-mentioned write-once information recording medium may be arranged so that the inorganic material contains at least one element chosen from among Al, Ag, Au, Cu, Zn, Pt, Sb, Te, Ge, Si, Bi, Mn, W, Nb, Co, Sr, Fe, In, Sn, Ni, Mo, Mg, Ca, Pb, and Ba.

According to the embodiments of the invention, it is possible to provide a minute structure which can be easily formed by using the heat lithography, and a minute-structure manufacturing method which can easily form a minute structure by using the heat lithography.

According to the embodiments of the invention, it is possible to provide a patterning method of a substrate using the minute structure, and a structure, an information recording medium, a master substrate, an optical element, an optical communication device, a DNA chip, a light emitting device, a photoelectric transducer and an optical lens which include the minute structure.

According to the embodiments of the invention, it is possible to provide a write-once information recording medium which can be produced with low cost and can form a minute recording mark therein.

BRIEF DESCRIPTION OF THE DRAWINGS

Other objects, features and advantages of the invention will be apparent from the following detailed description when reading in conjunction with the accompanying drawings.

FIG. 11A, FIG. 11B, FIG. 11C and FIG. 11D are cross-sectional diagrams of the minute structure in stage I, stage II, stage III and stage IV, respectively.

FIG. 40A and FIG. 40B are diagrams showing scanning electron microscope photographs of the optical filter of the embodiment 18.

FIG. 44A and FIG. 44B are diagrams showing the composition of an aspheric optical lens of the embodiment 21.

FIG. 46A and FIG. 46B are diagrams showing scanning electron microscope photographs of samples of the optical information recording medium in which the recording layer is irradiated by a laser beam.

DETAILED DESCRIPTION OF PREFERRED EMBODIMENTS

Figure 1A:
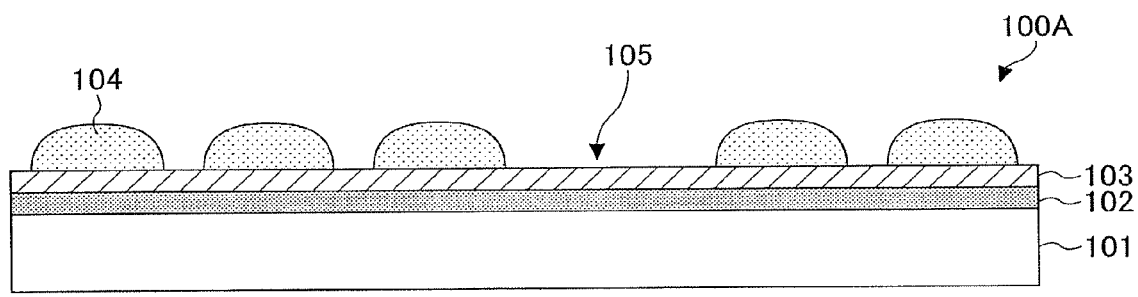
FIG. 1A and FIG. 1B are diagrams showing the composition of an information recording medium of the embodiment 1.

A description will be given of embodiments of the invention with reference to the accompanying drawings.

The minute structure of the embodiment 1 of the invention includes a mixed component which contains at least one kind of a sulfur compound (called material A) and at least one kind of a silicon oxide (called material B). The sintering by heat when forming the minute structure is promoted as the material A is contained, and patterning using etching is possible as the material B is contained. Design of an optical nonreflection film or a photonic crystal in which the configuration of the minute structure reflected is possible, and the refractive index of minute structure can be easily adjusted.

Examples of material A may include ZnS, CaS, BaS, CdS, K2S, Ag2S, GeS, CoS, Bi2S3, PbS, Na2S, Cu2S, CuS, Al2S3, Sb2S3, SmS, PbS, Na2S, LiS, SiS, SiS2, and any combination including two or more compounds may be used. Among these, ZnS is preferred since it is easily mixed with material B and it is available as a sputtering target with a low price. Since the crystallinity improves with optical irradiation or heating by a laser beam, a difference in the etching resistance between the irradiated area and the non-irradiated area arises. The minute structure can be produced by using this principle. Adjustment of the refractive index of minute structure is also attained. Therefore, the processing by heat lithography is possible and an optical element and an information recording medium having the feasible optical property can be obtained.

The material B is primarily SiO2, and SiO may be contained therein. SiO may be produced due to the oxygen deficiency at the time of forming a target or at the time of forming a mixed material layer.

The minute structure of the embodiment 2 of the invention includes either a mixed component which contains a sulfur compound (called material A'), the material B and a material for raising an optical absorption ability to a light with a predetermined wavelength (called material C), or a mixed component which contains a material A' for raising an optical absorption ability to a light with a predetermined wavelength and the material B. The minute structure can be formed on a substrate having no light absorption layer by using heat lithography.

It is preferred that the size of the minute structure is in a range between several tens of nanometers and several hundreds of nanometers. This size is equivalent to the size of a recording mark of a high-density-recording medium, or the size of a constitutional unit of a periodical structure. In the latter case, the material A' for raising the optical absorption ability to the light with the predetermined wavelength may be used together with the material C or a material A' which does not raise the optical absorption ability to the light with the predetermined wavelength.

A description will be given of the optical absorption ability. A substance having an optical absorption ability reflects light and simultaneously absorbs light. The amount of absorption of light varies depending on depth z by which light invades into the substance, and the amount of absorption of light is determined by its extinction coefficient k. The extinction coefficient k is represented by the following Beer's law:

$$I = I_o \exp(-\alpha z), \alpha = 4\pi k/\lambda$$

where I denotes the intensity of light after penetrating the substance, Io denotes the intensity of light before penetrating the substance, α denotes the absorption coefficient, and λ denotes the wavelength of light.

Namely, if the depth (the thickness of the substance) by which light invades into the substance increases, the substance absorbs a larger amount of light and the intensity of light penetrated the substance decreases. Raising the optical absorption ability according to the invention means enlarging the extinction coefficient k of the minute structure containing the material concerned from that of a minute structure with the same thickness which does not contain the material concerned.

The wavelength dependency of the extinction coefficient k varies depending on the material. For example, even when k of a certain material is small in a visible light region, k of the same material is large in an ultraviolet region. Taking this point into consideration, it is necessary to select the wavelength of a laser beam for irradiating a mixed material. The wavelength of a laser beam used is not restricted, and any of a deep-ultraviolet laser light, a visible laser light, an infrared laser light, etc. may be used. Especially, a red semiconductor laser beam and a blue semiconductor laser beam are preferred since they are inexpensive and irradiation of multiple pulsed light beam can be performed. Examples of the light source used may include a visible light laser, an $F_2$ laser, an ArF laser, a KrF laser, etc. Among them, a visible light semiconductor laser is preferred since it can be obtained with low cost and can be used easily.

Measurement of an extinction coefficient k and a refractive index n can be carried out using a spectroscopic ellipsometer. The extinction coefficient k, together with the refractive index n, varies in accordance with the wavelength of light. For example, in the case of ZnS—SiO2 (the molar ratio: 80:20), with respect to a 405 nm laser light (blue), n is about 2.33 and k is about $1 \times 10^{-3}$, with respect to a 350 nm laser light (ultraviolet), n is about 2.33 and k is about $1 \times 10^{-2}$, and with respect to a 680 nm laser light (red), n is about 2.16 and k is about $1 \times 10^{-8}$. Addition of the material C to the minute structure allows the refractive index n and the extinction coefficient k to be adjusted.

Examples of the material A' other than the material A may be the material for raising the optical absorption ability, such as FeS and GeS2. Two or more kinds of the material A' may be used in combination. Among them, ZnS is preferred since it is easily mixed with the material B and can be obtained with low cost as a sputtering target. ZnS is almost transparent in a visible light region, and addition of the material C to the minute structure will allow adjustment of transmittance to visible light of the minute structure.

An example of the minute structure formed of a mixed material containing ZnS (material A'), SiO2 (material B) and a metal or semiconductor (material C) as an example of the minute structure of the invention will be explained.

$SiO_2$ has little etching resistance to hydrofluoric acid and it reacts in accordance with the formula: $SiO_2 + 6HF \rightarrow H_2SiF_6 + H_2O$. The layer formed of the mixed material is etched in a hydrofluoric acid, and it absorbs visible laser light. The etching resistance to hydrofluoric acid of the heated mixed material improves, and it remains non-etched and a minute structure is left.

Specifically, if the mixed material absorbs a visible laser light having more than a given output power and it is heated, a kind of crystallization of ZnS and SiO2 arises and the etching resistance to hydrofluoric acid improves. If the percentage of content of ZnS in the mixed material at this time is less than 60 mol %, the etching resistance to hydrofluoric acid may be inadequate.

SiO2 is required in order to etch the mixed material. However, if the percentage of content of SiO2 in the mixed material is less than 10 mol %, it shows some etching resistance to hydrofluoric acid even when it does not absorb visible laser light. If the percentage of content of SiO2 in the mixed material exceeds 30 mol %, a minute structure may not be left. ZnS—SiO2 penetrates a visible light. If the mixed material absorbs a visible light and does not contain a material C for generating heat, heating may be inadequate even when it is irradiated by a visible laser. If an organic material is used as the material C, heating may be inadequate. This may be because addition of the organic material in this case does not allow the extinction coefficient k to increase.

For this reason, it is preferred that the material C is a semiconductor material or a metallic material. Although the layer which is formed of a mixed material can be formed by the sputtering method, it may use for and carry out the weld slag of the mixed target other than simultaneous weld slag. A mixed target is producible material A' and by mixing the powder of material B and material C, and making it sinter.

It is preferred that the material C contains either of the zinc compound and the sulfur compound different from the material A'. When ZnS is used as the material A', either the sulfur or zinc contained in the material A' is contained in the material C which makes the configuration of the end of the minute structure smooth. Examples of the material C may include ZnTe, ZnSe, MnS, etc. although these are not restrictive but they can receive supply as a sputtering target. Two or more kinds of them may be used in combination.

Examples of the material C may include Al, Ag, Au, Cu, Zn, Pt, Sb, Te, Ge, Si, Bi, Mn, W, Nb, Co, Sr, Fe, In, Sn, Ni, Mo, Mg, Ca, etc., and two or more kinds of them may be used in combination. Examples of such material C may include any of alloys, such as InSb, AgInSbTe, GeSbTe, ZnMgTe, CsZnTe, SbZn, and the compounds, such as ZnMgSSe, ZnCrO4, ZnZrO3, ZnWO4, ZnTiO3, Zn3N2, ZnF2, ZnSnO3, and ZnMoO4. Such materials can be easily obtained as a sputtering target, and can adjust the refractive index of minute structure.

It is preferred that the material C contains a fluorescent material. The position of the minute structure can be checked by detecting the fluorescence which is emitted from the minute structure when it is irradiated by an ultraviolet light or visible light. For this reason, a specific part can be detected using fluorescence detection of a fluorescent semiconductor quantum dot, and the use as an information recording medium is possible. As a fluorescent material, CdSe, CdTe, etc. are mentioned and two or more kinds may be used together. Such a fluorescent material has a high fluorescent characteristic, and it can obtain it easily.

When it is irradiated by a laser beam, the material C may oxidize. The grade in which the material C oxidizes is based on the irradiation conditions (pulsed light output, pulse width) of a laser beam, the kind of material C, the composition of material A', material B, and material C, etc.

However, if material A' is used on a Si substrate, an electric furnace is used after carrying out multitarget sputtering of material B and the material C, and for 30 minutes heat curing (annealing) is carried out at hundreds of times, the peak of the oxide of material C will be seen in an oblique incidence X-ray diffraction experiment.

For example, when a 200 nm thick film of ZnS, SiO2 and Zn is formed on a Si substrate, the peak of ZnO is not seen, but the peak of ZnO is seen when annealing is performed for 30 minutes at 500 degrees C. It is conceivable that at least a part of Zn (material C) was oxidized and this was set to ZnO.

Similarly, in the case of ZnS, SiO2 and Mn, the peak of Mn3O4 is not seen before annealing, but as for after annealing, the peak of Mn3O4 is seen. When it is irradiated by a laser beam at this time, it is not clear what extent the irradiation portion of the laser beam is heated to, and by what speed it is cooled. However, the material C in a predetermined quantity may be oxidized also in the minute structure etched by a hydrofluoric acid. For this reason, in the following embodiments, although it is illustrated as the composition of minute structure is the same as before laser beam irradiation, there is also a case in which the minute structure contains the oxide of material C. Thus, if the material C in the predetermined quantity is oxidized, the hardness of the minute structure can be raised. Specifically, the hardness of the minute structure measured using the minute probe becomes higher than the hardness of the thin film before forming minute structure. At this time, optical properties, such as transmittance and a refractive index, also change with oxidization of material C. Although the configuration of the minute structure of the invention is not restrictive, it may be a convex configuration which has a curved surface such as a hemispherical surface. If the microfabrication of such minute structure is carried out using an X-ray or optical lithography, it would be expensive. The manufacture of the minute structure is attained with low cost using the heat lithography, and it is applicable to an optical element or a master mold of nano-imprinting. An optical element is obtained by forming distribution of physical characteristics or chemical properties in the minute structure.

An end of a minute structure of a convex configuration which has a curved surface becomes smooth and the minute structure has a curved surface. However, a sharp edge or a flat side surface may arise depending on the manufacturing conditions. In three dimensions, the area which has a curved surface exists from the configuration of the minute structure following the heat distribution of the laser beam mainly irradiate the layer which is formed of a mixed material.

Since the area where the laser beam is not irradiated by performing wet etching by a hydrofluoric acid is removed, minute structure serves as a convex configuration. For this reason, if it transfers using photo-curing type resin etc., the pattern of concave shape will be formed in the transferred substrate.

The minute structure of the invention may be in a configuration in which a convex structure which has a curved surface, such as a hemispherical surface, is formed on a cylinder structure. Since such minute structure has the two-step structure, the gap between the convex structures having adjoining curved surfaces can be maintained and it is possible to separate recording marks clearly in the information recording medium using fluorescence. The optical nonreflection film and photonic crystal reflecting such form can also be designed, and a refractive index can be adjusted. In the photolithography in which a sensitization part carries out a chemical change, the minute structure of such form is unproducible.

The minute structure of the invention may be in a cylindrical configuration. If microfabrication is carried out using an X-ray or optical lithography, the manufacture of the structure would be expensive. However, the manufacture of the structure can be attained with low cost using the heat lithography, and it is applicable also to an optical element or a master mold of nano-imprinting. In addition, an optical nonreflection film and photonic crystal which reflects such configuration can also be designed, and the refractive index can be adjusted. If the photolithography in which the sensitization part shows a chemical change is used, it is difficult to produce the minute structure having such configuration.

In the invention, the diameter of the minute structure can be changed from a light spot size to the size of about ¼ of the spot size by changing the pulsed light output and pulse width (irradiation time). For example, when a laser beam with the wavelength of 405 nm is focused using an objective lens with the NA of 0.85, the diameter of the minute structure can be changed to any in a range of 80-400 nm.

The minute structure of the invention may be in any one of a convex configuration having a curved surface, a configuration in which a convex structure having a curved surface is formed on a cylinder structure, and a cylindrical configuration in which the cross section is formed continuously. Such linear minute structure can be formed by irradiating continuously the layer formed of a mixed material, and can be applied to a diffraction grating, a DNA chip, etc.

The smoothness of the end of the minute structure can be estimated by the line edge roughness (LER) of the linear minute structure which is formed by carrying out continuous irradiation of a laser beam. In a case in which the minute structure is used as a resist and a substrate is etched. In such a case, the minute structure of the invention has characteristics different from those of a macromolecule resist used in electron-beam lithography. In the macromolecule resist, the macromolecule itself has a size of several nanometers as the pattern becomes minute, the LER of the resist is also set to several nanometers.

On the other hand, LER can be set to 1 nm or less in the minute structure of the invention. In recent years, the term "LER" is being modified to the "LWR" (line width roughness) in the International Technology Roadmap for Semiconductor (ITRS). Although the measurement criteria of LER is not defined strictly, the LER according to the invention is determined such that the measurement line length is set to 2 micrometers, the measurement gap is set to 10 nm, and the LER is determined from $3\sigma$ of a straight line by the minimum square method.

The minute structure of the invention is applicable to an information recording medium, a master substrate, an optical element, a magnetic recording medium, a DNA chip, a biosensor, a DNA computer, a DNA memory, a biomolecule integrated device, etc.

The method of manufacturing the minute structure of the invention includes a step of forming on a substrate a layer which is formed of material A' and a mixed material containing material B and material C, a step of irradiating locally the layer formed of the mixed material by a laser beam, and a step of performing etching of the layer formed of the mixed material and irradiated by the laser beam. For this reason, a minute structure with a smooth end can be produced through a wet or dry etching of the mixed material which is locally heated and has the etching resistance changed.

A structure in which the minute structures of the invention are formed can be manufactured. Although heat may be locally applied instead of irradiating a laser beam locally, since a laser beam excels in respect of directivity and stability, it is preferred to use a laser beam in view of the production accuracy.

The patterning method of the substrate of the invention includes a step of forming on a substrate a minute structure containing material A', material B and material C, and a step which performing etching of the substrate using the minute structure as a mask. At this time, the minute structure used as a mask may be removed if needed. Thus, the substrate in which a pattern is formed is applicable to a master substrate, an optical element, a DNA chip, a light emitting device, a photoelectric transducer, etc.

Although the structure of the invention has the minute structures of the invention on the substrate, it is preferred that the structure of the invention has the area (called periodic area) in which the minute structures are arranged periodically. The optical filter and optical switch using the photonic band gap which reflects the light of a specific wavelength band by the periodic area can be obtained.

It is preferred that, in the periodic area, the transmittance to the light of a predetermined wavelength band is higher than that in a case where the minute structures are not arranged.

Thereby, the optical nonreflection film by the moth-eye structure in which nonreflection characteristics are shown to the light of a predetermined wavelength band can be obtained.

If the structure of the invention includes an area (called a non-period area) in which the minute structures are not arranged, an information recording medium using distinction of the periodic area and the non-period area, and an optical waveguide which includes the non-period area in the periodic area and uses the photonic band gap which reflects the light of a specific wavelength band by the periodic area can be obtained. In the minute structure of the invention used for an information recording medium, a fluorescent material is contained in the material C.

The pattern formed on the substrate by using the patterning method of the substrate of the invention may be transferred and reproduced, and the minute structure formed on the substrate may be transferred and reproduced. When reproducing, the pattern and the minute structure can be transferred into the material containing resin as the main ingredients through the nano imprinting technology. Such method can be used when manufacturing a master substrate, an optical element, a DNA chip, a light emitting device, a photoelectric transducer, an optical lens, etc.

The master substrate of the invention is manufactured using the structure which includes the area in which the minute structures of the invention are arranged periodically on the substrate. For this reason, the manufacture cost of the master substrate of the invention can be lower than the master substrate using the conventional optical lithography, and the recording pattern can be made clear. Such master substrate can be used when manufacturing an optical information recording medium, etc.

The optical element of the invention is manufactured using the structure which includes the area in which the minute structures of the invention are arranged periodically on the substrate. Examples of the optical element may include a diffraction grating, a polarization separator element, an optical filter, an optical switch, an optical nonreflection film, and an optical waveguide.

Figure 31:
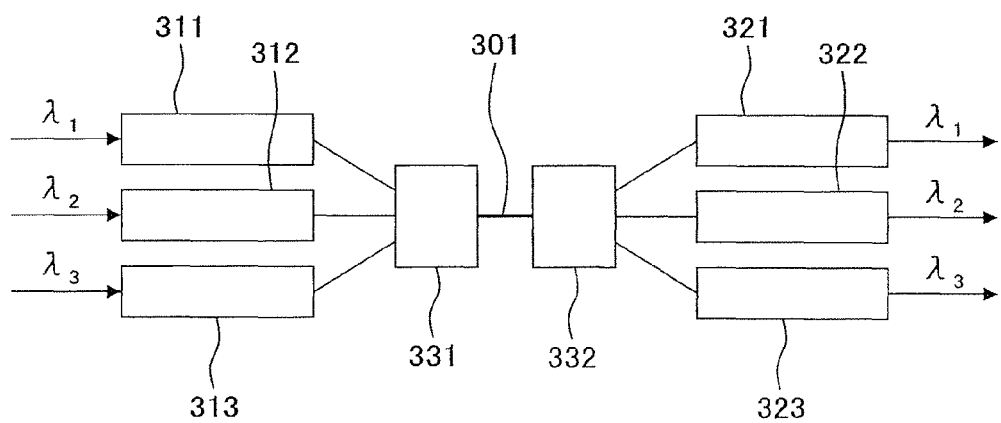
FIG. 31 is a diagram for explaining wavelength division multiplex communication.

The optical element of the invention is applicable to a known optical communication device, such as a wavelength multiplexing device, used for wavelength multiple telecommunications. As shown in FIG. 31, in the wavelength multiple telecommunication which communicates the light signals of several different wavelengths ($\lambda 1$, $\lambda 2$, and $\lambda 3$) using one optical fiber 301, a set of transmitters 311, 312, and 313 and a set of receivers 321, 322, and 323 are used for each of the multiple wavelengths. In order to make the transmission path broad bandwidth, an optical composition circuit 331 and an optical splitter circuit 332 are used. At this time, the optical composition circuit 331 and the optical splitter circuit 332 can be formed by combining many optical switches.

In the DNA chip of the invention, the DNA fragment is fixed onto the substrate. The substrate of the DNA chip of the invention is manufactured using the structure in which the minute structures of the invention are arranged on the substrate. At this time, the minute structure has a large specific surface area, the detection efficiency becomes high, and the size of the whole chip can be made small.

In the light emitting device of the invention, the first electrode, the luminescent layer, and the second electrode are sequentially deposited on the substrate in this order. The light emitting device of the invention is manufactured using the structure including the area in which the minute structures of the invention are arranged periodically, or the structure in which the minute structures of the invention are arranged periodically on the substrate.

At this time, the first electrode, luminescent layer, and the second electrode may be deposited on either of the surface on which the minute structures of the invention are not arranged and the surface on which the minute structures of the invention are arranged. According to the uneven structure containing the minute structures, the light extraction efficiency of the light emitting device is improved, and the luminous efficiency can be raised.

In the photoelectric transducer of the invention, the first electrode, the photoelectric conversion layer, and the second electrode are sequentially deposited on the substrate in this order. The substrate of the photoelectric transducer of the invention is manufactured using the structure minute structure of the invention has the area arranged periodically, or the substrate is manufactured on the substrate using the structure with which the minute structure of the invention has the area arranged periodically. A photoelectric transducer with high photoelectric conversion efficiency is obtained by the uneven structure in which the photoelectric transducer contains the minute structures.

The optical lens of the invention is manufactured using the structure which includes the minute structure of the invention, or the structure in which the minute structures of the invention are arranged on the substrate. Thereby, a reliable minute optical lens is obtained.

Embodiment 1

Figure 1B:
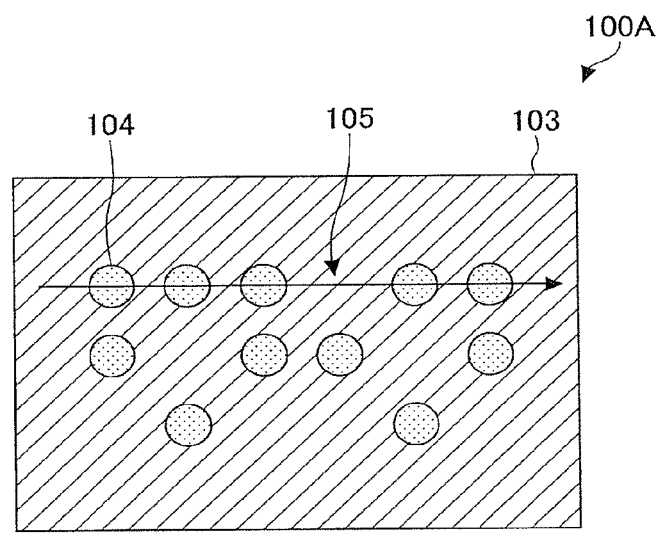

FIG. 1A and FIG. 1B show the composition of an information recording medium 100A of the embodiment 1 of the invention. FIG. 1A is a cross-sectional view of the information recording medium and FIG. 1B is a top view of the information recording medium.

In the information recording medium 100A, a 50 nm-thick dielectric layer 102 of ZnS—SiO2 (the molar ratio: 8:2), a 10 nm-thick light absorption layer 103 of AgInSbTe, and minute structures 104 are formed on a silicon substrate 101 with a thickness of 1 mm and a size of 10 cm by 10 cm.

The minute structures 104 are arranged as shown in FIG. 1B, and information is determined by the existence of minute structure 104. Specifically, when the recording medium 100A is irradiated by a laser beam, a fluorescent light is emitted by the minute structure 104, and no fluorescent is emitted from the area 105 where no minute structure 104 is arranged, so that this recording medium 100A may function as an information recording medium.

Each minute structure 104 is in a hemispherical configuration, the diameter of its bottom is about 150 nm, and the height is about 30 nm. The minute structures 104 are arranged with the period of 200 nm (mark pitch), i.e., arranged at intervals of 50 nm.

Each minute structure 104 contains ZnS, SiO2 and CdTe (the molar ratio: 77:20:3), and shows the behavior which is similar to that of fluorescent quantum dots. Information is read from the recording medium by scanning a fluorescence detection optical head in the direction indicated by the arrow in FIG. 1B. In the fluorescence detection optical head, the emitted fluorescent light is focused by a lens and passes through an optical fiber and an optical filter, so that the fluorescence is detected by amplifying it using a photomultiplier tube. Through the optical head, the optical filter and the processing method of a light signal, detection of the fluorescence is possible even if it is weak.

FIG. 2A through FIG. 2D show the method of manufacturing the information recording medium 100A.

First, a dielectric layer 102, a light absorption layer 103, and a mixed material layer 106 are deposited in this order on a silicon substrate 101 by using a sputtering apparatus CFS-8EP-55 (from Shibaura Mechatronics Co.) (refer to FIG. 2A). The mixed material layer 106 includes ZnS, SiO2 and CdTe (the molar ratio: 77:20:3) and the thickness is 160 nm.

Figure 2A:
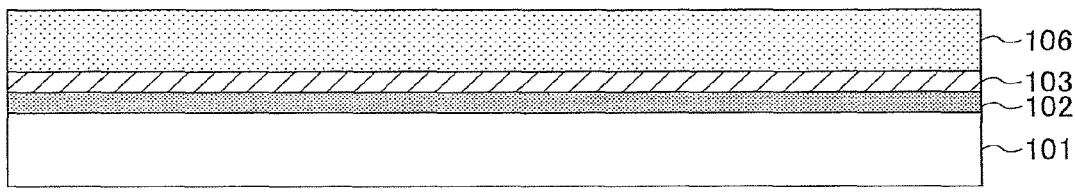
FIG. 2A, FIG. 2B, FIG. 2C, and FIG. 2D are cross-sectional views for explaining the method of manufacturing the information recording medium of the embodiment 1.
Figure 2B:
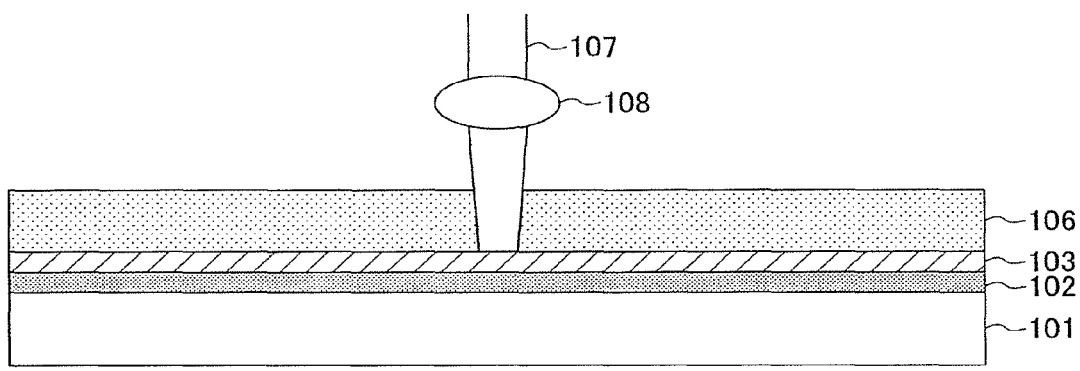
Figure 2C:
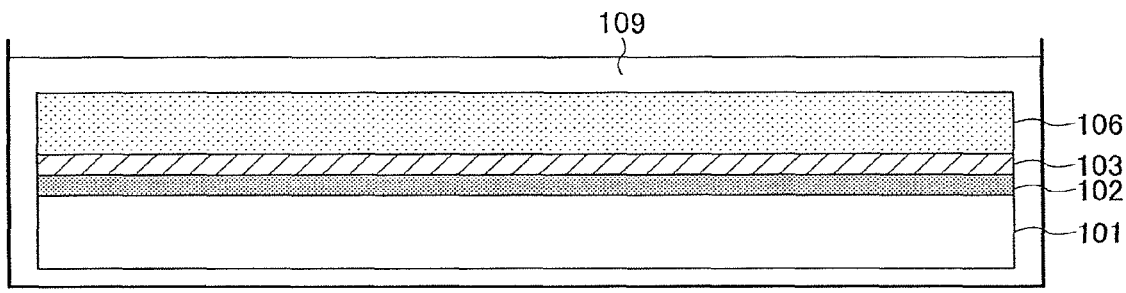
Figure 2D:
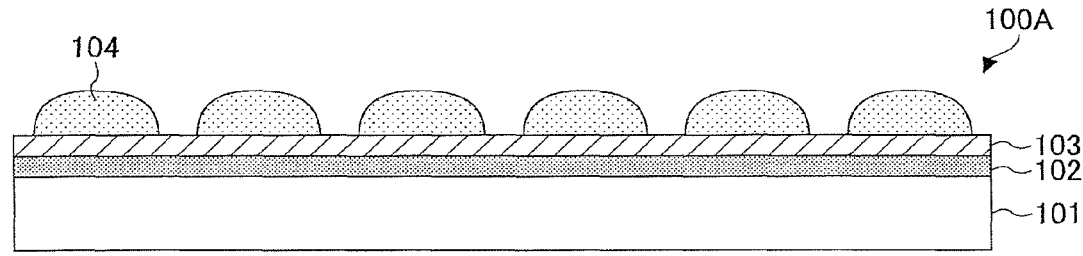

Next, vacuum attraction of the obtained silicon substrate 101 to the XY stage is performed and the pulsed irradiation of the silicon substrate 101 by a laser beam 107 with the wavelength of 405 nm from a semiconductor laser is carried out in a period of 200 nm through an objective lens 108 with the NA of 0.85 (refer to FIG. 2B). The portions of the substrate which are irradiated by the laser beam 107 at this time are predetermined by the program. And etching is performed for 10 seconds using a hydrofluoric acid 109 of 2% by weight (refer to FIG. 2C). Then, it is observed using the scanning electron microscope that the minute structures 104 are formed at the irradiation portions by the laser beam 107 (refer to FIG. 2D). It appears that the etching resistance to hydrofluoric acid of the mixed material layer 106 improves due to a kind of sintering effect and the irradiation portions by the laser beam 107 remain non-etched and a hemispherical pattern is left.

Accordingly, the minute structures 104 can be easily produced by using heat lithography. Since the percentage of content of CdTe in the mixed material layer 106 is 3% by weight, the information recording medium 100A using fluorescence detection can be produced without affecting the production of minute structure 104. Since the recorded areas and the non-recorded areas are discriminated by the existence of minute structure 104, the obtained information recording medium 100A can be used as a ROM (Read Only Memory). Since the mixed material layer 106 contains ZnS and SiO2, a change of the etching resistance can be used and the refractive index can be adjusted.

Embodiment 2

Figure 3A:
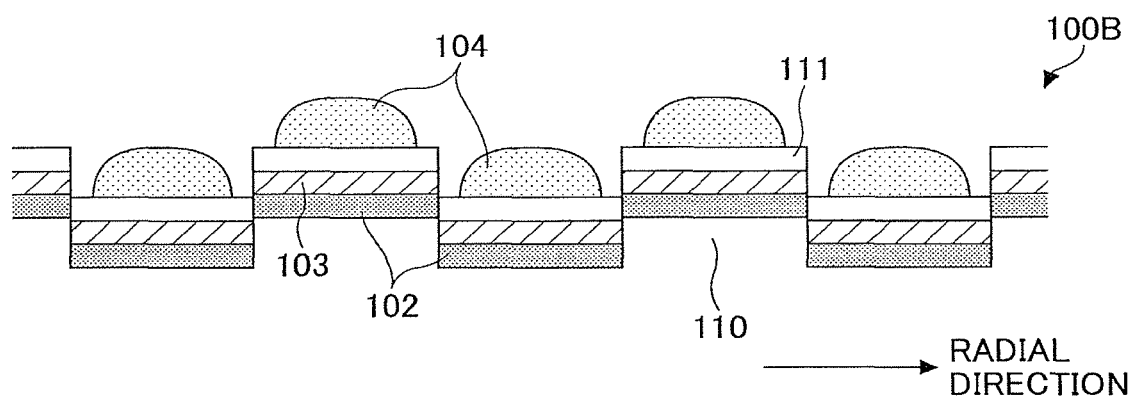
FIG. 3A and FIG. 3B are diagrams showing the composition of an information recording medium of the embodiment 2.
Figure 3B:
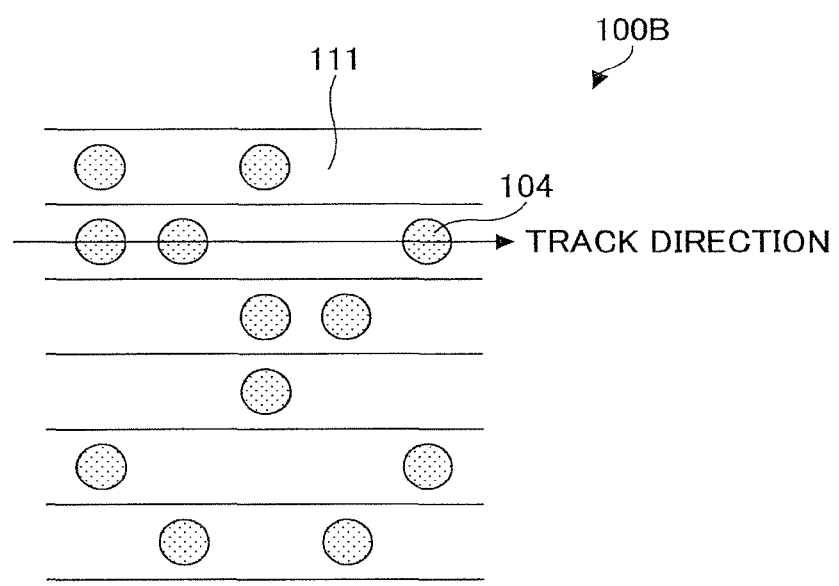
Figure 4A:
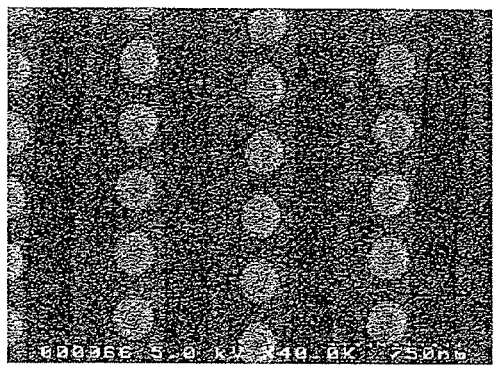
FIG. 4A and FIG. 4B are diagrams showing scanning electron microscope photographs of the minute structure (4.5 mW pulsed light output).
Figure 4B:
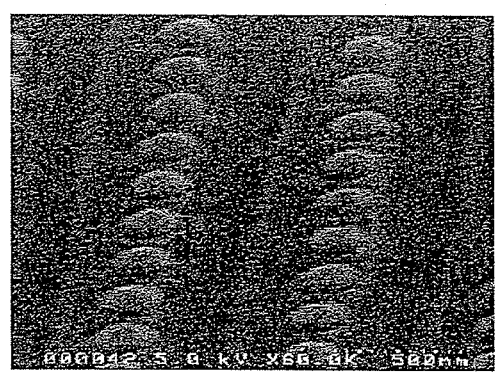
Figure 5A:
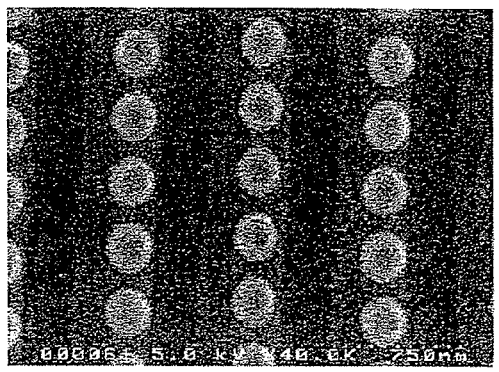
FIG. 5A and FIG. 5B are diagrams showing scanning electron microscope photographs of the minute structure (5.0 mW pulsed light output).
Figure 5B:
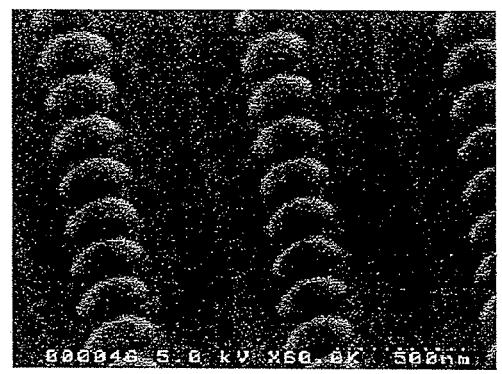
Figure 6A:
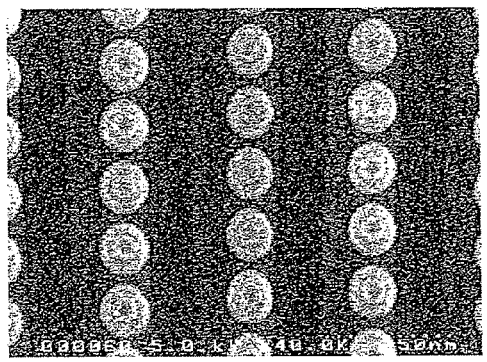
FIG. 6A and FIG. 6B are diagrams showing scanning electron microscope photographs of the minute structure (5.5 mW pulsed light output).
Figure 6B:
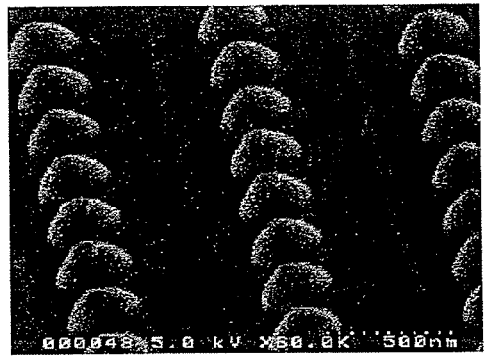
Figure 7A:
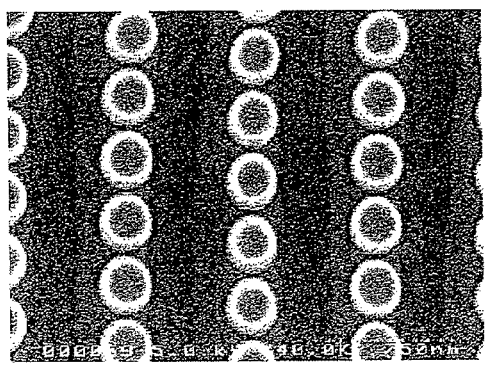
FIG. 7A and FIG. 7B are diagrams showing scanning electron microscope photographs of the minute structure (6.0 mW pulsed light output).
Figure 7B:
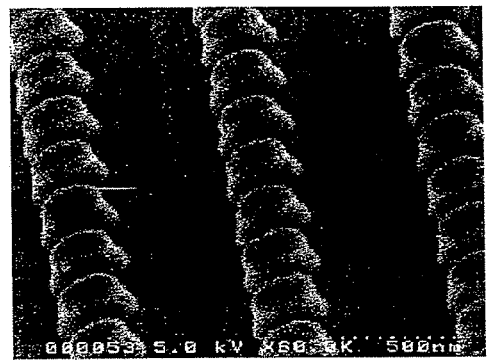
Figure 8A:
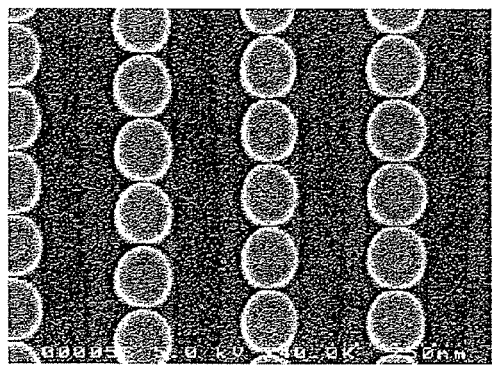
FIG. 8A and FIG. 8B are diagrams showing scanning electron microscope photographs of the minute structure (6.4 mW pulsed light output).
Figure 8B:
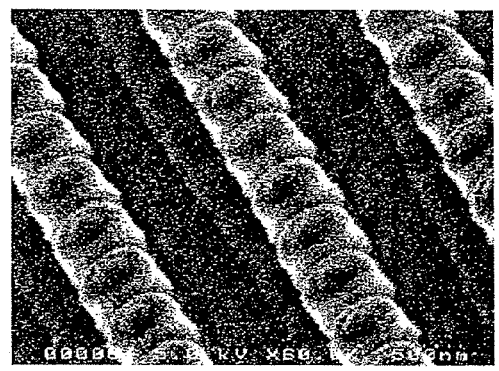
Figure 9A:
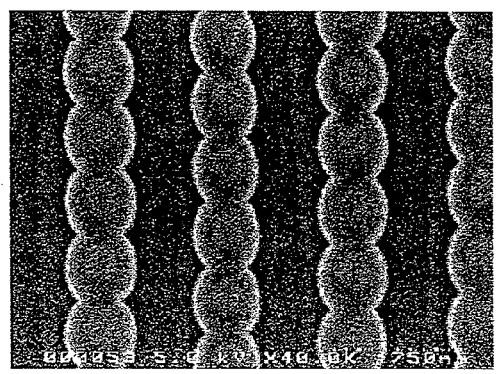
FIG. 9A and FIG. 9B are diagrams showing scanning electron microscope photographs of the minute structure (7.0 mW pulsed light output).
Figure 9B:
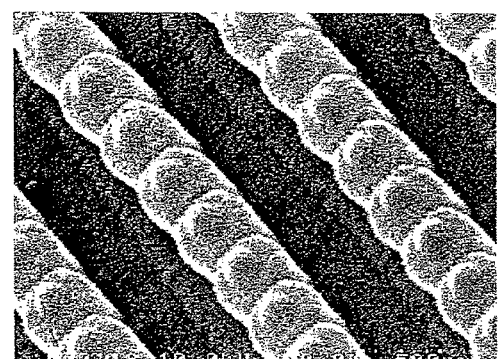

FIG. 3A and FIG. 3B show the composition of an information recording medium 100B of the embodiment 2 of the invention. FIG. 3A is a cross-sectional view of the information recording medium and FIG. 3B is a top view of the information recording medium.

In the information recording medium 100B, a 50 nm-thick dielectric layer 102 of ZnS—SiO2 (the molar ratio: 8:2), a 10 nm-thick light absorption layer 103 of Ge (germanium), a 20 nm-thick ZnS layer 111, and minute structures 104 are formed on a polycarbonate substrate 110. The polycarbonate substrate 110 is a disc-like plate for optical disk with a diameter of 12 cm and a height of 20 nm, and it has lands and grooves in a period of 440 nm (track pitch).

The minute structures 104 are arranged as shown in FIG. 3B, and information is determined by the existence of minute structure 104. Specifically, when the recording medium 100B is irradiated by a laser beam, a fluorescent light is emitted from the minute structure 104, and no fluorescent light is emitted from the area where no minute structure 104 is arranged.

Each minute structure 104 is in a hemispherical configuration, the diameter of its bottom is about 150 nm, and the height is in a range of 30-160 nm. The minute structures 104 are arranged with the period of 400 nm (mark pitch).

Each minute structure 104 includes ZnS, SiO2 and CdTe (the molar ratio: 77:20:3), and shows the behavior which is similar to that of fluorescent quantum dots. Information is read from the recording medium by scanning a fluorescence detection optical head in the direction indicated by the arrow in FIG. 3B. In the fluorescence detection optical head, the emitted fluorescent light is focused by a lens and passes through an optical fiber and an optical filter, so that the fluorescence is detected by amplifying it with a photomultiplier tube. Through the optical head, the optical filter, and the processing method of a light signal, detection of the fluorescence is possible even if it is weak.

Next, the method of manufacturing the information recording medium 100B will be explained.

First, a dielectric layer 102, a light absorption layer 103, a ZnS layer 111, and a mixed material layer are deposited in this order on a polycarbonate substrate 110 by using a sputtering apparatus CFS-8EP-55 (from Shibaura Mechatronics Co.). The mixed material layer includes ZnS, SiO2 and CdTe (the molar ratio: 77:20:3), and the thickness is about 160 nm.

Next, while the obtained polycarbonate substrate 110 is rotated at the linear velocity of 4.5 m/second, focusing and tracking is performed using the surface record type disc tester LM330 (from Shibasoku Co.). The pulsed irradiation of the polycarbonate substrate 110 by a laser beam with the wavelength of 405 nm is performed in a period of 400 nm through an objective lens with the NA of 0.85 (5.0 mW pulsed light output). The portions of the substrate irradiated by the laser beam are predetermined by the program. And etching is performed for 10 seconds using a hydrofluoric acid of 2% by weight. Then, it is observed using the scanning electron microscope that the minute structures 104 are formed at the irradiation portions by the laser beam. It appears that the etching resistance to hydrofluoric acid of the mixed material layer improves due to a kind of sintering effect and the irradiation portions by the laser beam remain non-etched and a hemispherical pattern is formed.

Accordingly, the minute structures 104 can be easily produced by using heat lithography. Since the percentage of content of CdTe in the mixed material layer is 3% by weight, the information recording medium 100B using fluorescence detection can be produced without affecting the production of the minute structures 104. Since the recorded areas and the non-recorded areas are discriminated by the existence of minute structure 104, the information recording medium 100B can be used as a ROM (Read Only Memory). Since the mixed material layer contains ZnS and SiO2, a change of the etching resistance can be used and the refractive index can be adjusted.

Since the laser beam irradiation can be performed while performing focusing and tracking when the substrate on which the lands and grooves for optical disk are formed is used, the minute structures 104 can be speedily produced with good accuracy.

Embodiment 3

The pulsed light output dependency of the minute structure was investigated. The pulsed light output was varied in a range of 1.5-7 mW. The method of manufacturing the minute structure was the same as that of the embodiment 2. As the material of minute structure, ZnS—SiO2 (the molar ratio: 8:2) was used.

FIG. 4A through FIG. 9B show the scanning electron microscope photographs of the produced minute structures. The observation is performed using a field-emission scanning electron microscope FE-SEM 5-4100 (from Hitachi Ltd.).

In FIG. 4A through FIG. 9B, both the SEM photographs taken from the top surface direction and the SEM photographs taken from the slanting direction are shown. As is apparent from these SEM photographs, the configuration of minute structure including the height and the width is varied in accordance with a change of the pulsed light output.

In the embodiment 3, even when the minute structure is formed in any of the shown configurations, it can be used as an information recording medium.

Figure 10:
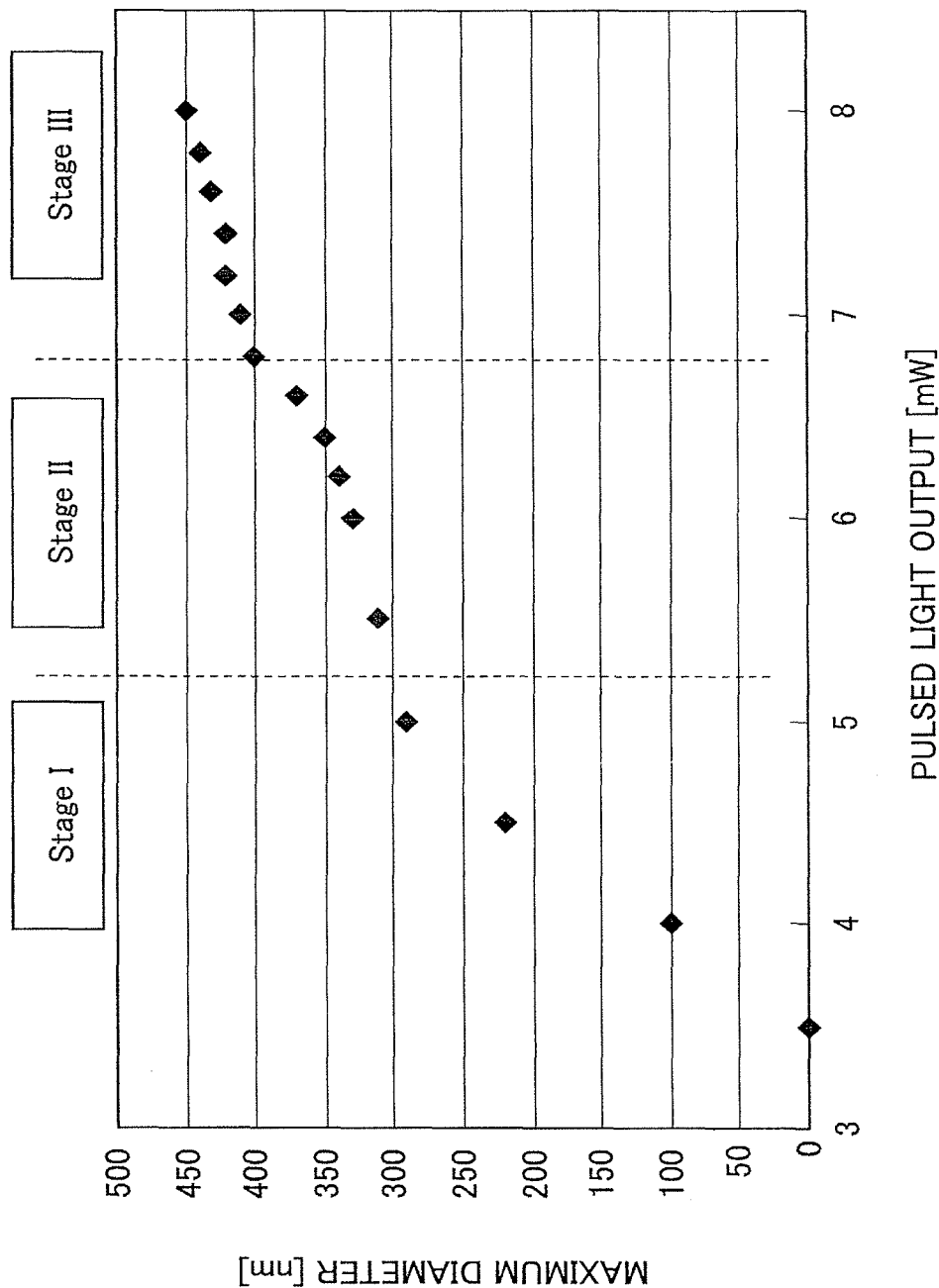
FIG. 10 is a diagram for explaining the relationship between the pulsed light output and the maximum diameter of the minute structure.

FIG. 10 shows the relationship between the pulsed light output and the maximum diameter of the minute structure. As is apparent from FIG. 10, the maximum diameter of minute structure does not show the linearity to the pulsed light output. The configuration of the minute structure formed on the polycarbonate substrate on which the unevenness is formed is mainly classified into the configurations of Stages I-IV according to the value of the pulsed light output (refer to FIG. 11A-11D) as follows.

Stage I (3.5-5.2 mW pulsed-light output): the minute structure 104 is in an aspheric configuration but it is in a hemispherical configuration. The maximum diameter of the minute structure 104 increases in accordance with the increase in the pulsed light output (refer to FIG. 11A).

Stage II (5.2-6.8 mW pulsed-light output): the minute structure 104 includes cylinder structures 104a and a hemispherical structure 104b formed in the center of the upper cylinder structure 104a. The cylinder structures 104a include two upper and lower cylinder structures. The lower cylinder structure increases in size in accordance with the increase in the pulsed light output (refer to FIG. 11B).

Stage III (6.8-8.0 mW pulsed light output): the minute structure 104 includes cylinder structures 104a and a hemispherical structure 104b formed in the center of the upper cylinder structure 104a. The cylinder structures 104a include two upper and lower cylinder structures. The upper cylinder structure is larger in size than the lower cylinder structure (refer to FIG. 11C).

Stage IV (over 8 mW pulsed light output): the minute structure 104 is in a cylindrical configuration (refer to FIG. 11D).

In Stage I as shown in FIG. 4A through FIG. 5B, the minute structure 104 is in a hemispherical configuration (refer to FIG. 11A). In Stage II and Stage III as shown in FIG. 6A through FIG. 9B, the minute structure 104 includes the cylinder structures 104a and the hemispherical structure 104b. In Stage II, the minute structure 104 has the maximum diameter at the lower one of the cylinder structures 104a (refer to FIG. 11B). On the other hand, in Stage III, the minute structure 104 has the maximum diameter at the upper one of the cylinder structures 104a (refer to FIG. 11C). In Stage IV, the minute structure 104 has an opening formed in the center thereof and it is in a cylindrical configuration (refer to FIG. 11D).

The reason why the etching resistance of the mixed material layer improves by irradiation of a laser beam is not strictly clear. It appears that the mixed material layer is optically almost transparent and the light absorption layer absorbs the laser beam and it is heated, so that the mixed material layer is closely packed due to the sintering effect.

The heat distribution by the light from the light absorption layer which absorbs the laser beam is Gaussian distribution. And when a flat substrate is used, the configuration of the minute structure is fundamentally hemispherical. However, in a case where a substrate for optical disk having unevenness is used, the spatial heat distribution becomes somewhat complicated in a three-dimensional manner, and therefore the configuration of the minute structure is as shown in Stages I-IV.

Heat mainly occurs at the center of free space, and etching resistance of Stage I improves in the part used as the high temperature of the mixed material layer. In Stage II, since the thickness of a mixed material layer is limited, heat radiation stops becoming concentric circle-like, and the part near a light absorption layer becomes high temperature easily. In Stage III, some factors, like unevenness of a polycarbonate substrate and the upper part serves as an air space influence, and rather than the lower part, the upper part of a mixed material layer has bad heat dissipation, and is conjectured to become high temperature easily. In Stage IV, evaporation of the light absorption layer is considered to be a key factor, and an opening is formed in the center of the cylindrical minute structure.

Each of the minute structures of Stages I-IV is a structure suitable for any of an information recording medium, a photonic crystal, an optical nonreflection film, an optical switch, an optical filter, a plasmonic crystal, etc. Since the configuration and the refractive index of the minute structure affect the optical properties, it is necessary to adjust the size and the refractive index for each configuration.

In the embodiment 3, the minute structure is produced from the relationship of the observation resolution of the scanning electron microscope using ZnS—SiO2. In high-density information recording media, narrow-pitch tracks and reduction of recording marks are important, and the minute structure of the embodiment 3 can be made into the size of several tens of nanometers in diameter. If the pitch intervals of lands and grooves, the material of the light absorption layer, the thickness, and the composition ratio of ZnS and SiO2 are changed, the configuration and the pulsed light output characteristic of the minute structure are also changed slightly. The minute structure can be produced even when the material other than ZnS—SiO2 is used or another substance is mixed with ZnS—SiO2 or the composition ratio is changed.

The minute structure can be easily produced using heat lithography as mentioned above. When the mixed material layer contains ZnS and SiO2, an etching resistance change can be used, and also the refractive index can be adjusted.

Since laser beam irradiation is performed while performing focusing and tracking when the substrate in which the lands and grooves for optical disk are formed is used, the minute structures can be speedily produced with good accuracy.

Embodiment 4

Figure 12A:
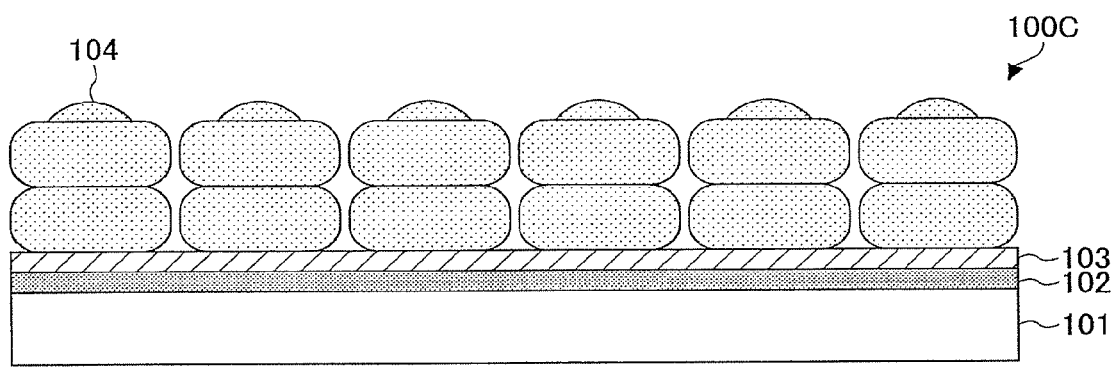
FIG. 12A and FIG. 12B are diagrams showing the composition of an optical nonreflection film of the embodiment 4.
Figure 12B:
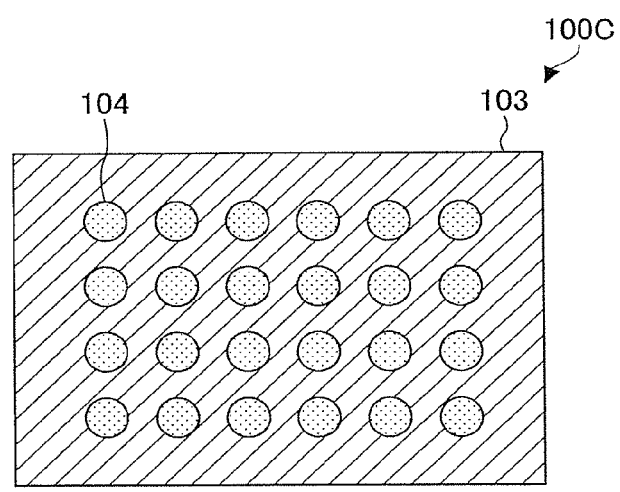

FIG. 12A and FIG. 12B show the composition of an optical nonreflection film 100C of the embodiment 4 of the invention. What is different from the embodiment 1 is that the mixed material layer used is formed of ZnS—ZnO—SiO2 (the molar ratio: 6:2:2), and others are the same as in the embodiment 1.

FIG. 12A is a cross-sectional view of the optical nonreflection film and FIG. 12B is a top view of the optical nonreflection film.

Since the minute structures 104 having the configuration of Stage II-III of FIG. 11 are arranged in a period of 200 nm, optical nonreflection film 100C controlled the Fresnel reflection of the light of a specified wavelength region (350-600 nm), and showed the nonreflection characteristics by the moth-eye structure.

The minute structure 104 is easily producible using heat lithography as mentioned above. When the mixed material layer contains ZnS and SiO2, a change of the etching resistance can be used, and also the refractive index can be adjusted.

Any of the configurations of Stages I-IV of FIG. 11 is applicable to the optical nonreflection film regardless of the configuration of the minute structure. However, according to a difference in the configuration of the minute structure, it is necessary to adjust the height of minute structure, the refractive index, and the period suitably. Although the refractive index of the material affects it, an optical nonreflection film can be formed using a reversal structure of the moth-eye structure. And multilayers may be formed with the optical nonreflection film.

Embodiment 5

Figure 13A:
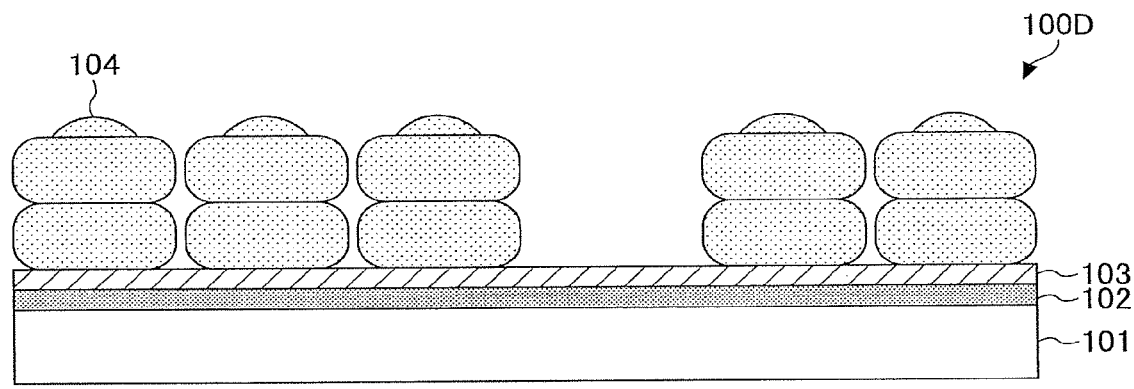
FIG. 13A and FIG. 13B are diagrams showing the composition of an optical waveguide of the embodiment 5.
Figure 13B:
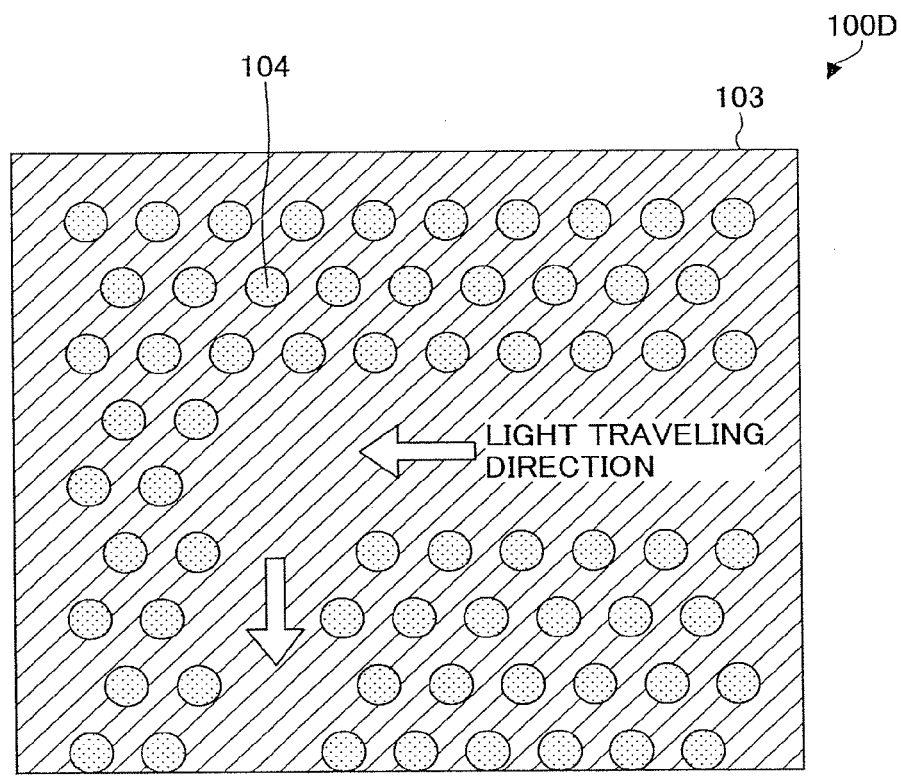

The optical waveguide shown in FIG. 13 was produced in the same manner as in the embodiment 1 except that the mixed material layer formed of ZnS—ZnO—SiO2 (the molar ratio: 6:2:2) is used. FIG. 13A and FIG. 13B are a cross-sectional view and a top view of the optical waveguide, respectively. In the area in which optical waveguide 100D reflects light, the minute structures 104 having the configuration of Stage II-III of FIG. 11 are arranged in a period of 300 nm, and minute structure 104 is not arranged at the propagation portion of light.

Since this reflects the light of the specified wavelength region (400-600 nm) resulting from the average refractive index and periodic gap of a periodical structure by a photonic band gap, as shown in FIG. 13B, light travels.

In the optical waveguide by a photonic crystal, in order to be dependent on the degree of incident angle, the wavelength of light to reflect needs to adjust the degree of incident angle, and needs to enter the light of the wavelength corresponding to a photonic band gap wavelength band.

The minute structure is easily producible using heat lithography as mentioned above. When a mixed material layer contains ZnS and SiO2, an etching resistance change can be used, and also a refractive index can be adjusted.

The optical waveguide using a photonic band gap is applicable to an optical filter, an optical switch, laser, etc. Although do not reflect light and it is penetrated in the wavelength band near the photonic band gap, the optical property which exceeded the limits of resolution, such as the collimating effect and the lens effect, with the unique character of the photonic crystal is seen theoretically and in phenomenon. Such effect is also acquired using the minute structure of the invention.

The optical waveguide is not based on the configuration of the minute structure, but the minute structures having the configurations of Stages I-IV of FIG. 11A-11D may be arranged. The difference in the configuration of the minute structure needs to adjust the height of minute structure, a refractive index, and a period suitably.

Although the characteristics differ in the configuration of the minute structure also in the reversal structure of the periodical structure of minute structure, the photonic band effect is acquired. For this reason, as a photonic crystal, both the periodical structure of minute structure and its reversal structure can be used.

Embodiment 6

Figure 14A:
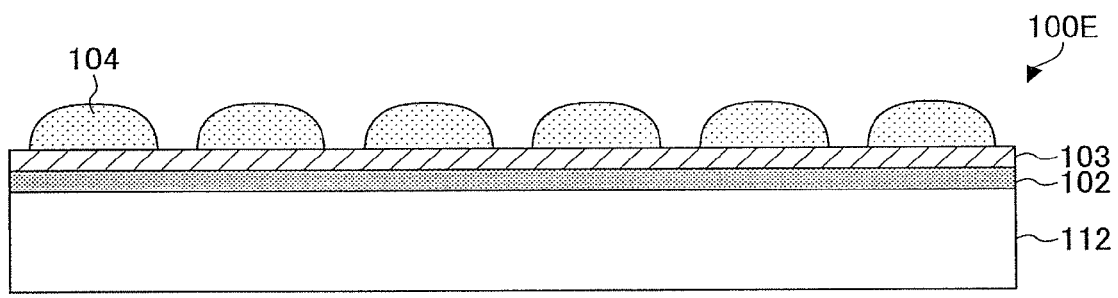
FIG. 14A and FIG. 14B are diagrams showing the composition of an optical filter of the embodiment 6.
Figure 14B:
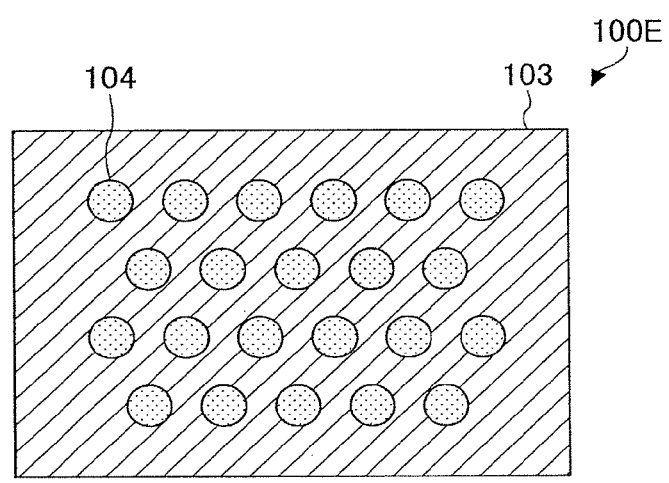

The optical filter shown in FIG. 14A-14B was produced in the same manner as in the embodiment 1 except that the mixed material layer formed of ZnS—SrS—SiO2 (the molar ratio: 7:1:2) was used and the quartz substrate 112 of a size of 10 cm by 10 cm was used. FIG. 14A and FIG. 14B are a cross-sectional view and a top view of the optical filter, respectively.

The minute structure 104 in optical filter 100E is hemispherical, is 150 nm in diameter at the bottom, and 30 nm in height, and is arranged in a period of 200 nm (mark pitch). For this reason, when a laser beam is irradiated, optical filter 100E reflects the light of a specified wavelength region (300-500 nm) as an effect of subwavelength structure according to the degree of incident angle.

If light with a wavelength of 405 nm is entered into the field in which minute structure 104 is formed at this time, changing an angle, incident light will be reflected at an angle of specification.

The minute structure 104 is easily producible using heat lithography as mentioned above. When the mixed material layer contains ZnS, SrS, and SiO2, an etching resistance change can be used, and also a refractive index can be adjusted.

Not only subwavelength structure but the effect of a photonic crystal is produced from the periodical structure of minute structure 104. This functions as the optical filter which reflects the light of a specified wavelength region, or an optical switch. The incident angle and the wavelength of catoptric light depend for subwavelength structure or the photonic crystal of each other. When the optical filter and the optical switch use the same phenomenon and do not want to make the light of a specific wavelength band penetrated completely, they are operated as an optical filter. It becomes an optical switch to use as an optical element which controlled ON and OFF of the penetration of light.

In the embodiments 1 to 6, the material in particular used as a light absorption layer is not limited, but Si besides AgInSbTe and Ge, a group III-V semiconductor, a 4 Yuan mixed crystal compound, etc. are mentioned. The method of applying heat other than the method of irradiating a laser beam locally as heat lithography is also possible. However, it excels in respect of directivity and stability, and since the production accuracy of minute structure is high, it is preferred to glare a laser beam.

Embodiment 7

Figure 15:
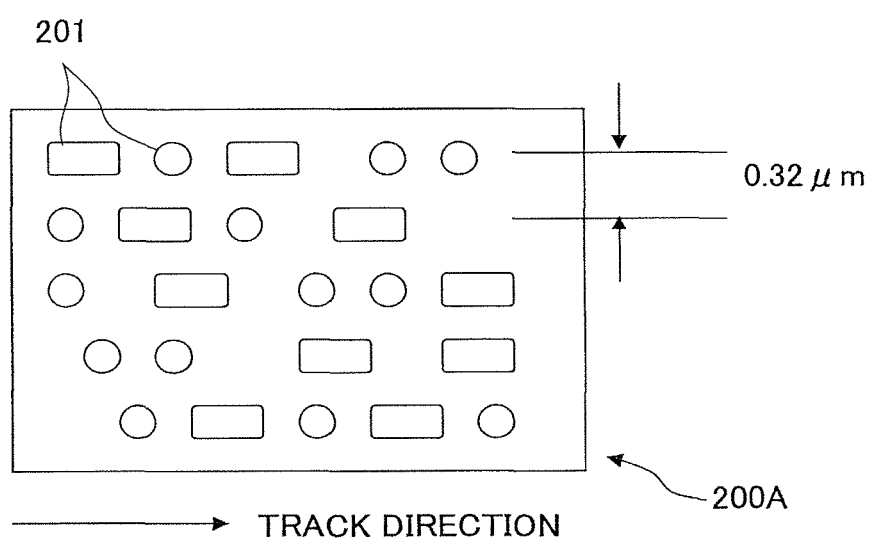
FIG. 15 is a diagram showing the composition of a master substrate of the embodiment 7.

The master substrate shown in FIG. 15 was produced. The master substrate 200A is an object with a capacity of 25 GB for BD-ROM (Blu-ray Disc-Read Only Memory), it has the area where pattern 201a of the recording pits arranged periodically, and a track pitch is 0.32 micrometer. The material of the master substrate 200A is quartz, and can manufacture a stamper and an optical information recording medium (such as movie recorded contents) according to an injection molding transferring process based on the master substrate 200A.

The method of manufacturing the master substrate 200A is shown in FIG. 16A-16F. First, a mixed material layer 202 with a thickness of 40 nm which becomes flat disc-like quartz substrate 201 from ZnS, SiO2 and ZnTe (the molar ratio: 70:20:10) was formed through RF sputtering using a sputtering apparatus CFS-8EP (from Shibaura Mechatronics Co.) (refer to FIG. 16A).

Figure 16A:
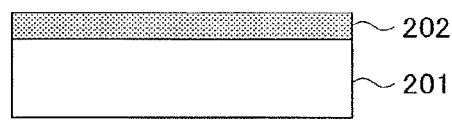
FIG. 16A, FIG. 16B, FIG. 16C, FIG. 16D, FIG. 16E and FIG. 16F are cross-sectional diagrams for explaining the method of manufacturing the master substrate of FIG. 15.
Figure 16B:
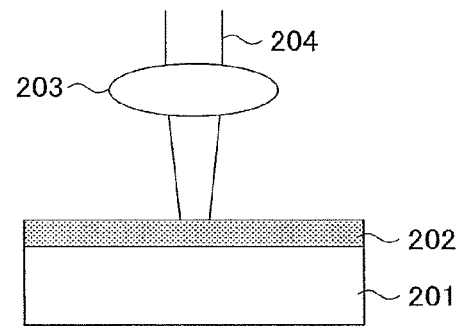
Figure 16C:
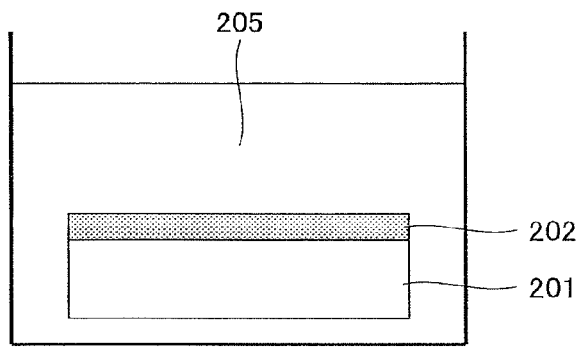

Next, the focus of the blue laser light 204 whose wavelength by which NA of laser beam irradiation equipment was focused with objective lens 203 of 0.85 is 405 nm was carried out to the surface of mixed material layer 202, and the predetermined area was irradiated with 5 mW pulsed light output (refer to FIG. 16B). It enabled it to form a pattern using the strategy which is formed of information on ROM at this time.

Then, it was immersed in a hydrofluoric acid 205 for 10 seconds 2% by weight (refer to FIG. 16C), and was made to dry. As a result, almost hemispherical minute structure 206 which is formed of ZnS, SiO2 and ZnTe (the molar ratio: 70:20:10) was formed on quartz substrate 201 (refer to FIG. 16D).

Then, it installed in RIE (Reactive Ion Etching) equipment, and etching by CF4 gas was performed. As a result, quartz substrate 201 used minute structure 206 as the mask, and was etched (refer to FIG. 16E).

Figure 16D:
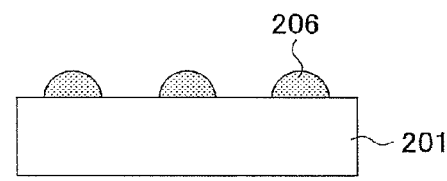
Figure 16E:
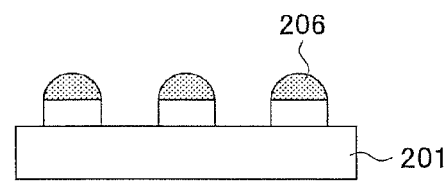
Figure 16F:
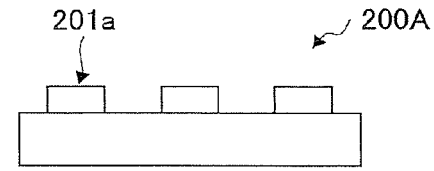

Removal of the minute structure 206 formed pattern 201a reflecting the configuration of the mask (refer to FIG. 16F).

The height of pattern 201a which is formed of quartz was about 40 nm as a result of measurement by AFM (atomic force microscope). Although point-like pattern 201a is formed, if continuous irradiation of the blue laser light 204 is carried out, a linear pattern (groove) is formed and a stamper for the object for R substrates (Recordable substrate) or RW substrates (Rewritable substrate) can also be produced.

On the other hand, it is uncertain whether the minute structure can be formed or not, and this depends on the composition ratio of ZnS, SiO2 and ZnTe. When the evaluation about the relationship between the composition ratio and the propriety of pattern formation was carried out, the result shown in Table 1 was obtained.

TABLE 1

| | Composition Ratio (mol %) | | | Formation of |
| --- | --- | --- | --- | --- |
| | ZnTe | ZnS | SiO$_2$ | Pattern |
| Sample 1 | 10 | 70 | 20 | yes |
| Sample 2 | 5 | 65 | 30 | no |
| Sample 3 | 10 | 50 | 30 | no |
| Sample 4 | 10 | 85 | 5 | no |
| Sample 5 | 15 | 68 | 17 | yes |
| Sample 6 | 32 | 60 | 8 | no |
| Sample 7 | 22 | 65 | 13 | yes |

As is apparent from Table 1, the pattern was able to be formed in the cases of the samples 1, 5, and 7, and no pattern was able to be formed in the cases of the samples 2, 3, 4, and 6. In order to check the relationship between the composition ratio and the propriety of pattern formation, evaluation of the samples 1-7 was carried out. When the etching resistance to hydrofluoric acid of each sample, before and after the irradiation of a blue laser light with the wavelength of 405 nm focused by the objective lens with the NA of 0.85 was given at 1-8 mW pulsed light output, was evaluated, the result shown in Table 2 was obtained.

TABLE 2

| | Etching Resistance Before Irradiation | Etching Resistance After Irradiation |
| --- | --- | --- |
| Sample 1 | no | yes |
| Sample 2 | no | no |
| Sample 3 | no | no |
| Sample 4 | yes | yes |
| Sample 5 | no | yes |
| Sample 6 | yes | yes |
| Sample 7 | no | yes |

As is apparent from Table 2, a pattern can be formed in a case in which the sample before the laser beam irradiation was applied had no etching resistance and the sample after the laser beam irradiation was applied had some etching resistance. When the samples 1, 3, and 4 are reviewed, in order for the sample to have no etching resistance before the laser beam irradiation, SiO2 is needed, and it is estimated that the percentage of content of SiO2 needed is more than 10 mol %.

On the other hand, when it has a too large percentage of content of SiO2 after the laser beam irradiation, as in the sample 3, there is no etching resistance. Since there are many components (ZnS and SiO2) which penetrate a laser beam like sample 2 when there are few rates of ZnTe, absorbing of a laser beam becomes inadequate. In order that ZnTe may raise optical absorption ability, it is required, but if there are too many rates like sample 7, the rate of ZnS will become inadequate and systematization by generation of heat accompanying absorption of a laser beam will not be promoted. The composition ratio of samples 1, 5, and 7 in which the pattern is formed is also taken into consideration, and, as for the rate of ZnS, the rate of more than 60 mol % and ZnTe is presumed less than 30 mol %.

Moreover, when Ag was used instead of ZnTe and the evaluation was carried out similarly, the results shown in Table 3 and Table 4 were obtained.

TABLE 3

| | Composition Ratio (mol %) | | | Formation of |
| --- | --- | --- | --- | --- |
| | Ag | ZnS | SiO$_2$ | Pattern |
| Sample 8 | 10 | 72 | 18 | yes |
| Sample 9 | 40 | 50 | 10 | no |
| Sample 10 | 40 | 40 | 20 | no |
| Sample 11 | 15 | 80 | 5 | no |
| Sample 12 | 15 | 70 | 15 | yes |
| Sample 13 | 32 | 60 | 8 | no |
| Sample 14 | 10 | 65 | 25 | yes |
| Sample 15 | 10 | 81 | 9 | no |
| Sample 16 | 10 | 80 | 10 | yes |
| Sample 17 | 9 | 81 | 10 | no |
| Sample 18 | 10 | 50 | 30 | yes |
| Sample 19 | 10 | 49 | 31 | no |
| Sample 20 | 9 | 50 | 31 | no |

TABLE 4

| | Etching Resistance Before Irradiation | Etching Resistance After Irradiation |
| --- | --- | --- |
| Sample 8 | no | yes |
| Sample 9 | yes | yes |
| Sample 10 | no | no |
| Sample 11 | yes | yes |
| Sample 12 | no | yes |
| Sample 13 | yes | yes |
| Sample 14 | no | yes |
| Sample 15 | yes | yes |
| Sample 16 | no | yes |
| Sample 17 | no | no |
| Sample 18 | no | yes |
| Sample 19 | no | no |
| Sample 20 | no | no |

As is apparent from Table 3 and Table 4, in samples 8-14, even if Ag is used instead of ZnTe, it can be said that the relation between the composition ratio of ZnS, SiO2 and Ag and the propriety of pattern formation is the same. On the other hand, in sample 16, the pattern formation was possible, but the pattern of sample 8 was clearer. Pattern formation was not completed in sample 15 and sample 17 although sample 15 and sample 17 has near composition ratios as sample 16.

In sample 15, there is etching resistance before it is irradiated by the laser beam as shown in Table 4, and pattern formation is impossible, and it is shown that the ratio of SiO2 of 9 mol % is inadequate. On the other hand, in sample 17, there is no etching resistance before it is irradiated by the laser beam, but the percentage of Ag is 9 mol %, and it is conceivable that the dose of laser beam is inadequate and a pattern was not able to be formed. It is conceivable that in this case, a pattern can be formed if it is irradiated by a higher output laser beam.

Since the calorific value accompanying absorption of the laser beam will change if the material added as material C is changed, the irradiation conditions (pulsed light output, pulse width) of the laser beam required for pattern formation are also changed. The same thing can be said about material A'. The ratio of SiO2 at which pattern formation is possible is more than 10 mol % when etching using a hydrofluoric acid is performed, and the same thing can be said for in the case where SiO is contained. As is apparent from samples 18-20, the ratio of SiO2 at which pattern formation is possible is less than 30 mol %. In sample 18, the percentage of content of SiO2 is 30 mol %, a pattern is formed, but the pattern is not clear. In samples 19 and 20, the percentage of content of SiO2 is 31 mol %, and the minute structure does not remain mostly.

Even if the pulsed light output of the laser beam is increased, the ratio of material C is decreased and the ratio of material A' is increased, the ratio of SiO2 at which pattern formation is possible is less than 30 mol %. In order to form a clear pattern, it is preferred that SiO2 is moderately contained in a range of 10-30 mol %.

When forming a mixed material layer by the sputtering method, one sputtering target which is formed of mixed materials may be used, or a sputtering target may be prepared for each material and co-sputtering may be performed. There are the case where an oxygen deficiency in SiO2 arises and SiOx (x=1-2) is produced, and the case where the surface roughness of the mixed material layer differs, according to the method of sputtering, but the quality of the film of the mixed material layer does not change greatly.

It is conceivable that when the mixed material layer is irradiated by a laser beam and the materials are mixed within the mixed material layer.

The extinction coefficient k of ZnS—SiO2 (the molar ratio: 80:20) to the blue laser whose wavelength is 405 nm is about $1 \times 10^{-3}$. On the other hand, the extinction coefficient k of the mixed material layer of the sample 5 is about $1 \times 10^{-1}$.

Thus, the blue laser absorption ability can be raised by adding ZnTe to the mixed material layer. Since the calorific value in the mixed material layer is based on the pulsed light output of the laser beam, when it is irradiated by the commercial red or blue semiconductor laser beam, the extinction coefficient k of about $1 \times 10^{-1}$ is enough for the mixed material layer.

Although the transmittance in the visible light region of 40 nm-thick ZnS—SiO2 (the molar ratios: 50:50-90:10) is about 100%, if ZnTe or Ag is added, the transmittance falls and its optical absorption ability improves as the ratio of ZnTe or Ag increases. However, the composition of the mixed material layer is important for production of minute structure ZnS more than 60 mol % and SiO2 10-30 mol % and ZnTe, or Ag less than 30 mol % containing is preferred.

Unless it fulfills such conditions, the almost hemispherical minute structure which has a smooth end by etching may not be formed. Since the percentage of content of SiO2 in the mixed material layer is 10% by weight or more, it etches in a hydrofluoric acid, but almost hemispherical minute structure remains because irradiation of the laser beam is received and the etching resistance to hydrofluoric acid is improved. Since the same element as ZnS is included as material C when ZnTe is used, as compared with the case where Ag is used, the end of minute structure becomes still smoother.

Figure 17:
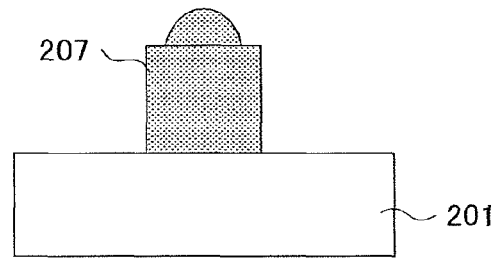
FIG. 17 is a cross-sectional diagram showing another example of the minute structure of the embodiment 7.

In the embodiment 7, since minute structure 206 is almost hemispherical, master substrate 200A can be manufactured. If the pulsed light output of blue laser light 204 shall be 7 mW instead of minute structure 206 shown in FIG. 16D, as shown in FIG. 17, minute structure 207 of the form by which hemispherical structure is formed on a generally cylinder structure will be formed.

In order to etch into quartz substrate 201 finally, the configuration of the minute structure affects the pattern shape of recording pits. At this time, there is the feature that the direction which uses minute structure 207 as a mask and etches it is etched almost perpendicularly as compared with the case where minute structure 206 is used.

Embodiment 8

Figure 18A:
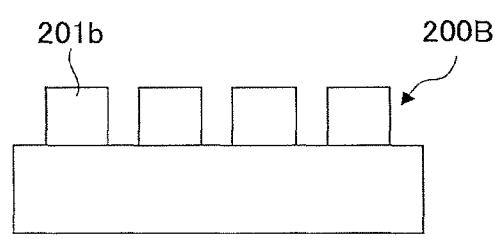
FIG. 18A and FIG. 18B are diagrams showing the composition of an optical nonreflection film of the embodiment 8.
Figure 18B:
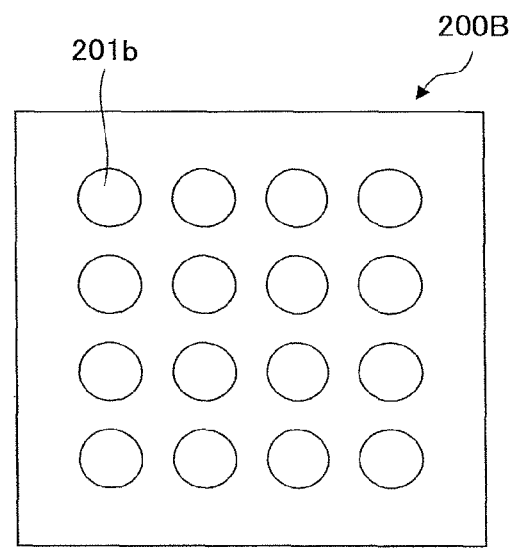

The optical nonreflection film shown in FIG. 18 was produced. FIG. 18A and FIG. 18B are a cross-sectional view and a top view of the optical nonreflection film, respectively. The optical nonreflection film 200B is made of quartz and includes cylindrical patterns 201b each with a diameter of about 150 nm and a height of about 250 nm arranged in a period of 200 nm.

As compared with quartz substrate 201 of the same thickness, optical nonreflection film 200B raises the transmittance to the light whose wavelength is in a range of 400-600 nm, and is close brought to 100%. This is for periodical structure's turning into the moth-eye structure, controlling reflection, and making light penetrate.

The method of manufacturing the optical nonreflection film 200B is the same as that of the embodiment 7 except that it is irradiated by the blue laser light 204 in a period of 200 nm. After producing with a wafer, dicing divides optical nonreflection film 200B into several millimeter angle, and it is obtained by washing in order to remove impurities.

As shown in FIG. 16D, the minute structure 206 was formed on quartz substrate 201 as an optical nonreflection film. Since the material of minute structure 206 differs from quartz, the effect as an optical nonreflection film may fade, or exfoliation may arise at a dicing process and the yield may become low. From this, a pattern may be transferred and reproduced, after etching to quartz substrate 201 if needed. At this time, the configuration of the pattern formed in the surface of quartz substrate 201 turns into form near minute structure 206 which serves as a mask fundamentally.

However, since the etching rate to CF4 of minute structure 206 is small enough, an aspect ratio can also produce high-shaped pattern 201b. When reproducing, a pattern can be transferred into the material which makes resin the main ingredients using nano imprint technology, such as a heat nano imprint, an optical nano imprint, and soft lithography.

Embodiment 9

Figure 19A:
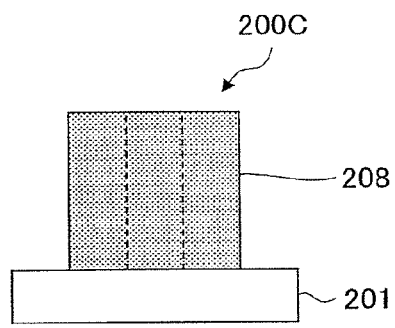
FIG. 19A and FIG. 19B are diagrams showing the composition of an optical nonreflection film of the embodiment 9.
Figure 19B:
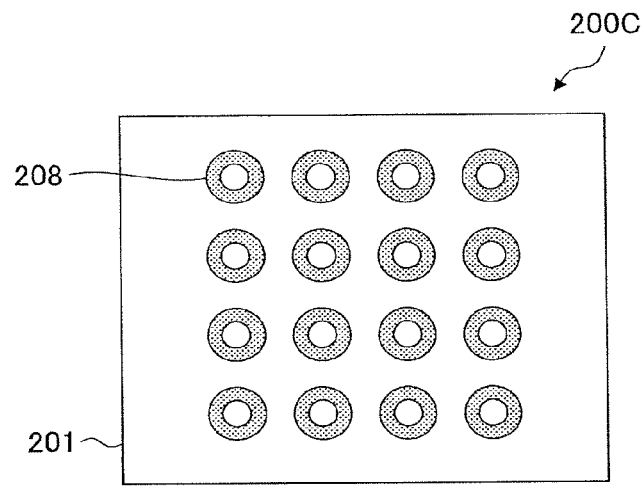

The optical nonreflection film shown in FIG. 19A-19B was produced. FIG. 19A and FIG. 19B are a cross-sectional view and a top view of the optical nonreflection film, respectively. In the optical nonreflection film 200C, the minute structures 208 are arranged in a period of 400 nm on the quartz substrate 201. The materials of minute structure 208 are ZnS, SiO2 and ZnTe—ZnO (the molar ratio: 64:18:10:8). The minute structures 208 are mostly in a cylindrical configuration, the outer diameter is about 300 nm and the inside diameter is about 90 nm, and the height is about 50 nm.

As compared with the quartz substrate of the same thickness, the optical nonreflection film 200C raises the transmittance to the light whose wavelength is in a range of 400-600 nm, and is close brought to 100%. This is for the periodical structure by minute structure 208 turning into the moth-eye structure, controlling reflection, and making light penetrate.

Figure 20:
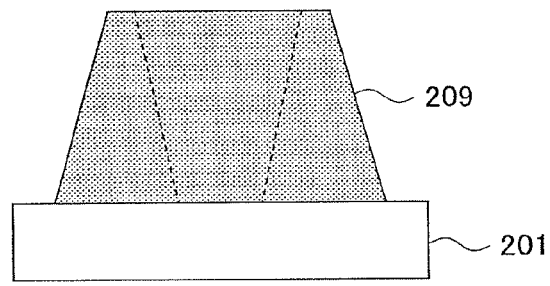
FIG. 20 is a cross-sectional diagram showing another example of the optical nonreflection film of the embodiment 9.

The method of manufacturing the optical nonreflection film 200C is the same as that of the embodiment 7 (with FIG. 16E-16F ignored) except that it is irradiated by the blue laser light 204 with the pulsed light output of 9 mW in a period of 400 nm. Since ZnS, SiO2, ZnTe and ZnO (the molar ratio: 64:18:10:8) have high transmittance, it needs to enlarge the pulsed light output of blue laser light 204. If the pulsed light output of blue laser light 204 is changed to 8 mW, as shown in FIG. 20, the minute structure 209 in a cylindrical configuration with the hollow part and the enlarged bottom will be formed.

Embodiment 10

Figure 21:
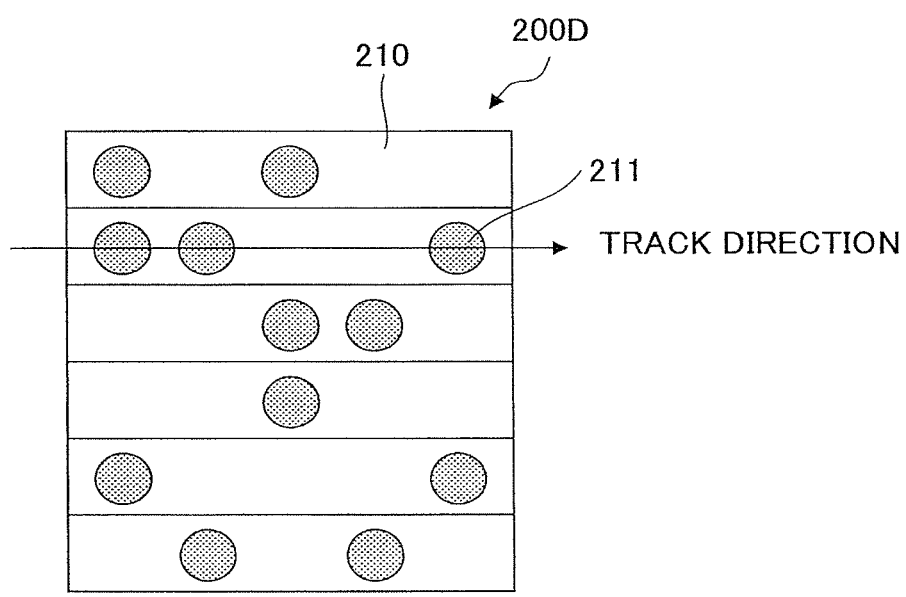
FIG. 21 is a diagram showing the composition of an information recording medium of the embodiment 10.

The information recording medium shown in FIG. 21 was produced. The minute structures 211 are arranged in a period of 160 nm on the disc-like polycarbonate substrate 210 with a diameter of 12 cm, and the information recording medium 200D has repetition unevenness of lands and grooves. Each minute structure 211 has a diameter of about 90 nm at the bottom and a height of about 30 nm, and is in an almost hemispherical configuration. In the information recording medium 200D, information is determined by the existence of minute structure 211.

When the information recording medium 200D is irradiated by a laser beam, the minute structure 211 emits fluorescent light, and no fluorescent light is emitted from the area where no minute structure 211 is arranged. For this reason, when a fluorescence detection optical head is scanned, information can be read out from the recording medium according to the detection of fluorescence.

The materials of minute structure 211 are ZnS, SiO2 and CdTe (the molar ratio: 77:20:3), and the minute structure 211 has the same effect as fluorescent quantum dots. When reading information, the emitted fluorescent light is focused by using the lens of the optical head, and fluorescence is detected by amplifying it with a photomultiplier tube via an optical fiber and an optical filter. Thereby, it can be detected even when the fluorescent light is weak.

The method of manufacturing the information recording medium 200D is the same as that of the embodiment 7 (with FIG. 16E-16F being ignored) except that it is irradiated by the blue laser light 204 with the pulsed light output 8 mW. Although it is produced on the disc-like polycarbonate substrate 210 in the embodiment 10, it may be produced on a rectangular substrate using an XY stage. In this case, vacuum attraction to the XY stage is performed, and pulsed irradiation of the laser beam is performed.

Embodiment 11

Figure 22A:
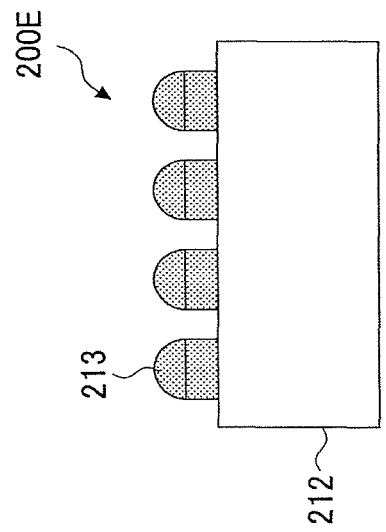
FIG. 22A and FIG. 22B are diagrams showing the composition of an optical waveguide of the embodiment 11.
Figure 22B:
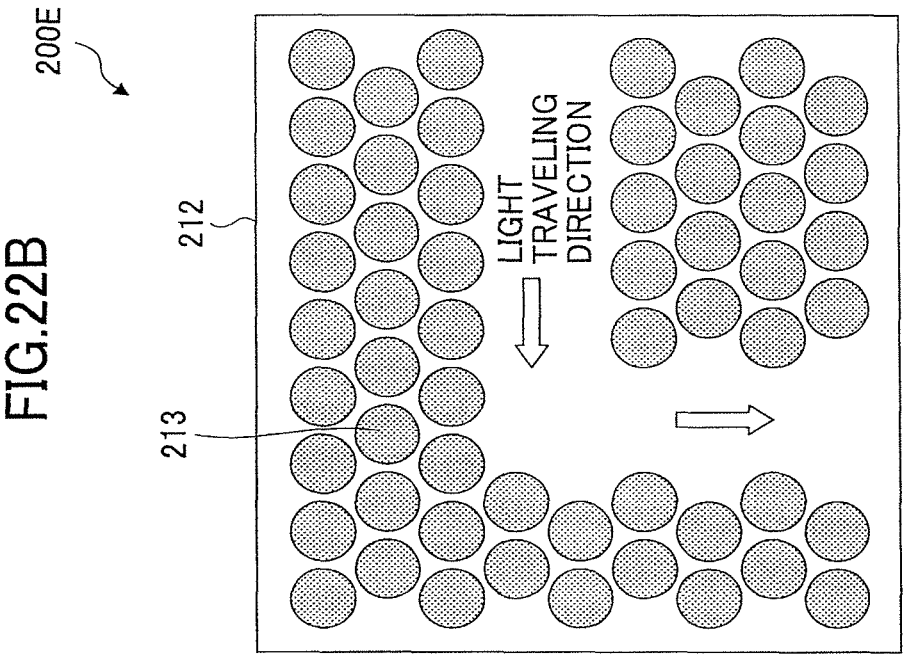

The optical waveguide shown in FIG. 22A and FIG. 22B was produced. FIG. 22A and FIG. 22B are a cross-sectional view and a top view of the optical waveguide, respectively. The optical waveguide 200E has the periodic area where the minute structures 213 are arranged in a period of 400 nm on the silicon substrate 212, and the light with the wavelength of 780 nm is reflected by the photonic band gap caused by the average refractive index of the periodic area, and the gap of the minute structures 213. No minute structure 213 is formed in the portion where the light travels.

In the hemispherical structure formed on the cylinder structure, the diameter of its bottom is about 200 nm, and the height is about 50 nm. The materials of the minute structure 213 are ZnS, SiO2 and ZnO (the molar ratio: 65:20:15).

The method of manufacturing the optical waveguide 200E is the same as that of the embodiment 7 (with FIG. 16E-16F being ignored) except that it is irradiated by the blue laser light 206 with the pulsed light output 7 mW.

The photonic crystal using a photonic band gap is applicable to optical elements other than optical waveguide, such as an optical filter and an optical switch. Although do not reflect light and it is penetrated in the wavelength band near the photonic band gap, the optical property beyond the limits of resolution, such as the collimating effect and the lens effect, is seen theoretically and in phenomenalism with the unique character of the photonic crystal. Such effect is also acquired by the optical element of quartz substrate.

Embodiment 12

Figure 23:
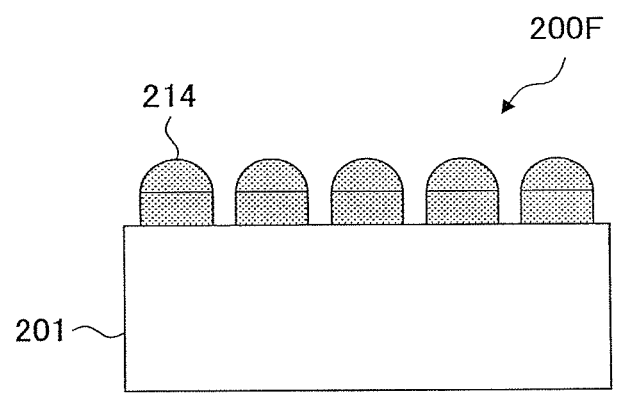
FIG. 23 is a cross-sectional diagram showing the composition of an optical filter of the embodiment 12.

The optical filter shown in FIG. 23 was produced. The optical filter 200F uses subwavelength structure, and the minute structures 214 are arranged in a period of 300 nm on the quartz substrate 201.

In the hemispherical structure formed on the cylinder structure, the diameter of its bottom is about 200 nm, and the height is about 50 nm. The materials of the minute structure 214 are ZnS, SiO2 and Au (the molar ratio: 72:18:10).

The method of manufacturing the optical filter 200F is the same as that of the embodiment 7 (with FIG. 16E-16F being ignored) except that it is irradiated by the blue laser light 204 with the pulsed light output 8 mW.

Figure 24:
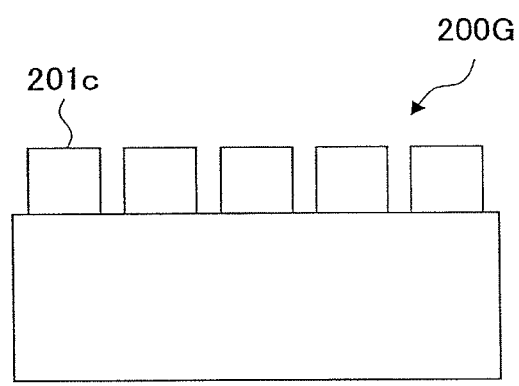
FIG. 24 is a cross-sectional diagram showing another example of the optical filter of the embodiment 12.

Alternatively, as shown in FIG. 24, an optical filter 200G of quartz may be formed through the process of FIG. 16E-16F. The optical filter 200G has the patterns 201c arranged in a period that is the same as that of the optical filter 200F.

When they are irradiated by a laser beam, the optical filters 200F and 200G reflect the light with a specified wavelength due to the photonic band gap, and the filters function as an optical switch. For example, if the light with the wavelength of 405 nm is incident to the optical filters 200F and 200G while the incidence angle is changed, the light is reflected at a specific incidence angle.

Even if the section formed periodically the linear minute structure which is a rectangle mostly by carrying out continuous irradiation of the blue laser light 204 instead of minute structure 214, the effect as an optical switch was acquired. When linear minute structure was formed, the effect as an optical switch was mutually acquired also as a structure of the shape of perpendicular meshes of a net. LER was also smaller than the value of the resist in photo lithography, and was set to 1 nm or less.

The optical filter functions according to subwavelength structure and the photonic band gap effect as the optical filter which reflects the light of a specified wavelength, or an optical switch. The incident angle and the wavelength of catoptric light depend for subwavelength structure or the photonic crystal of each other. The same phenomenon is used and an optical filter and an optical switch function as an optical filter to penetrate the light of a specified wavelength completely. It becomes an optical switch to use as an optical element which controlled ON and OFF of the penetration of light.

Embodiment 13

FIG. 25A through FIG. 25D show the scanning electron microscope photographs of the minute structure of the embodiment 13. The minute structure is formed on the polycarbonate substrate in which a track pitch has a land groove which is 400 nm (line width of 200 nm, raceway groove width of 200 nm), and the materials are ZnS, SiO2 and Ag (the molar ratio: 72:18:10).

The method of manufacturing the minute structure is the same as that of the embodiment 7 except having changed the pulsed light output of blue laser light 204 using the sputtering target which is formed of ZnS, SiO2 and Ag (the molar ratio: 72:18:10).

Figure 25A:
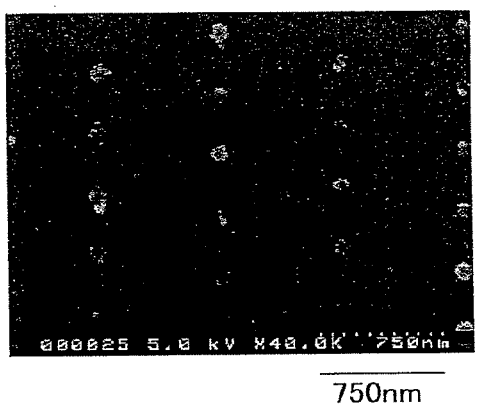
FIG. 25A, FIG. 25B, FIG. 25C and FIG. 25D are diagrams showing scanning electron microscope photographs of the minute structure of the embodiment 13.
Figure 25B:
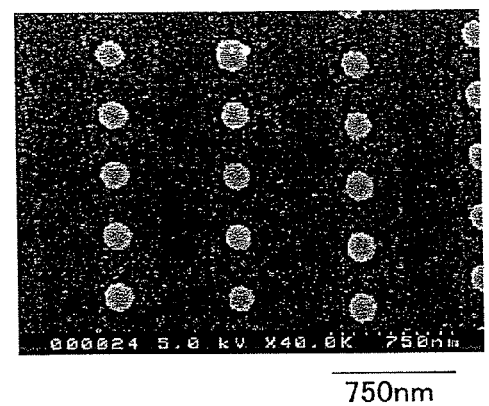
Figure 25C:
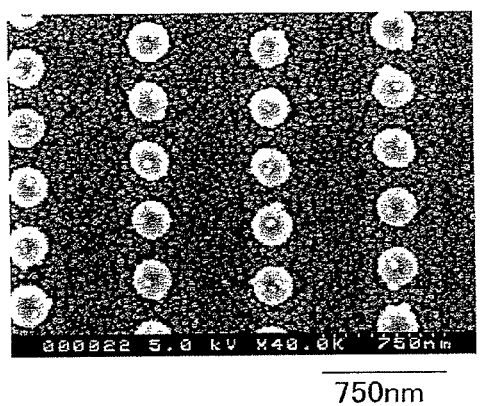
Figure 25D:
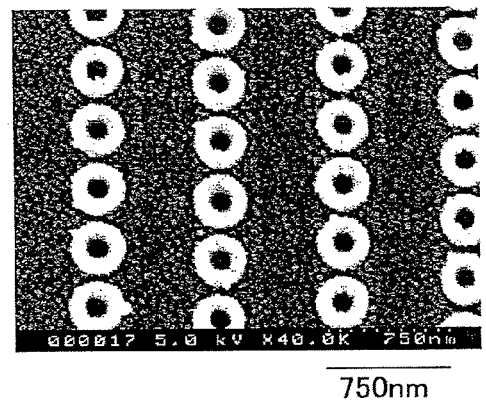

The pulsed light outputs of FIG. 25A, FIG. 25B, FIG. 25C, and FIG. 25D are 6.5 mW, 7.0 mW, 8.0 mW, and 9.0 mW, respectively. The minute structure in FIG. 25A or FIG. 25B is in a hemispherical configuration, the minute structure in FIG. 25C is in a configuration in which a hemispherical structure is formed on the cylinder structure, and the minute structure in FIG. 25D is in a cylindrical configuration. The configuration of the minute structure can be evaluated by using a transmission electron microscope or an atomic force microscope, other than a scanning electron microscope.

Figure 26:
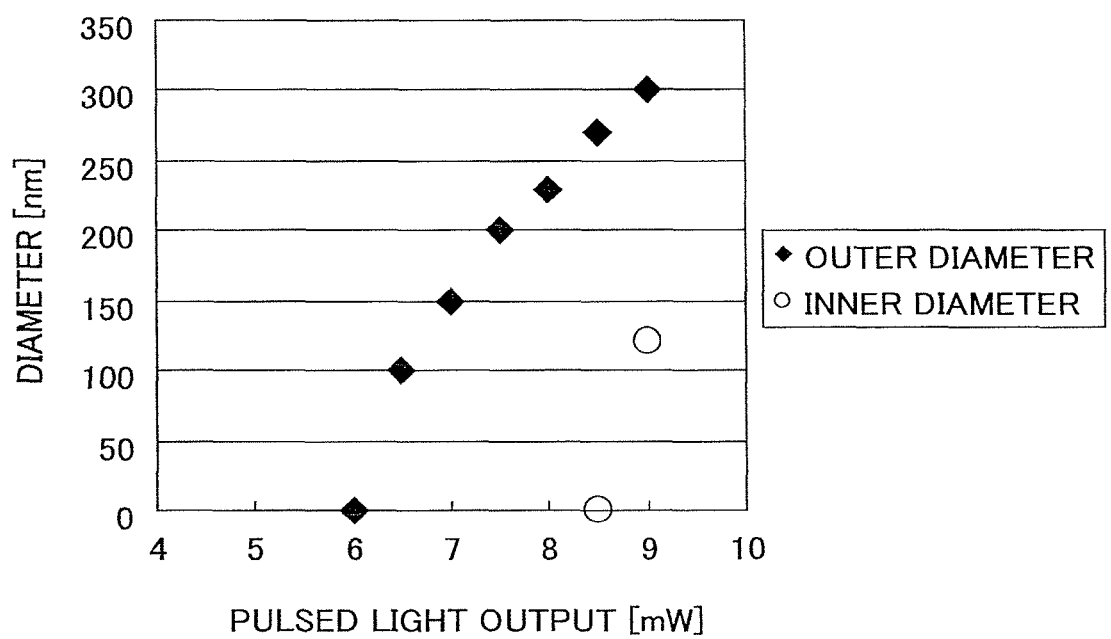
FIG. 26 is a diagram for explaining the relationship between the pulsed light output and the outer diameter or the inner diameter of the minute structure.

FIG. 26 shows the relationship between the pulsed light output and the outer diameter or the inside diameter of the minute structure. As shown in FIG. 26, the pulsed light output increases as the outer diameter of the minute structure increases, and a hollow portion (opening) arises in the center of the minute structure at 9 mW. The size of the minute structure may be changed with the pulse width at the time of laser beam irradiation (irradiation time). The pulse width in this case is in a range of 10 to 15 nanoseconds. Although the size of the minute structure to the pulsed light output is changed in accordance with the composition ratio, materials, etc., the same pulsed light output dependency can be seen also when materials other than Ag are used.

Figure 27A:
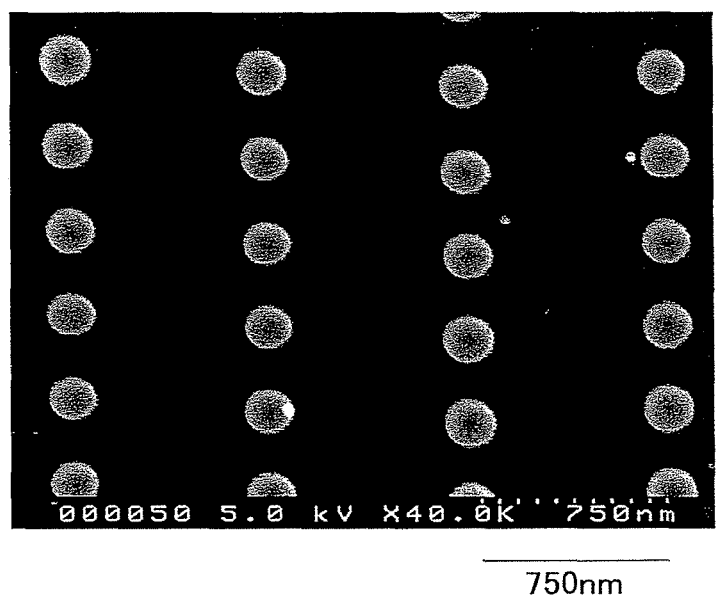
FIG. 27A and FIG. 27B are diagrams showing scanning electron microscope photographs of another example of the minute structure of the embodiment 13.
Figure 27B:
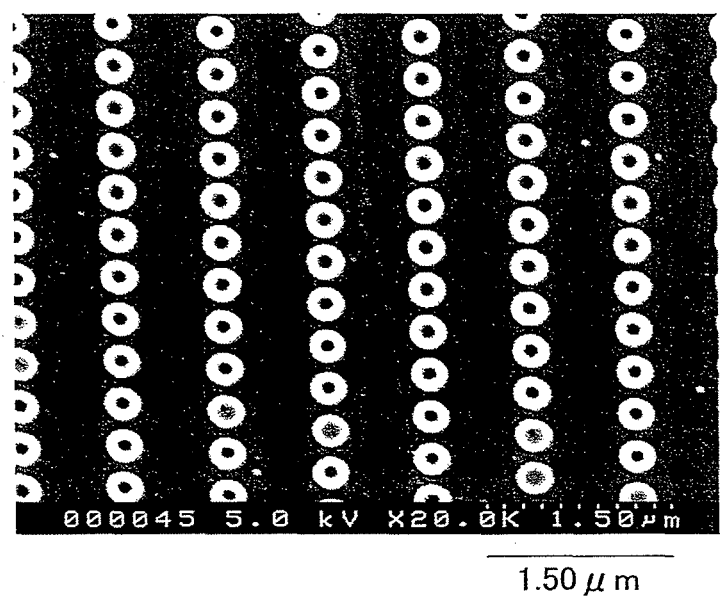

FIG. 27A and FIG. 27B show the scanning electron microscope photographs of another example of the minute structure of the embodiment 13. This minute structure is formed on the polycarbonate substrate in which the track pitch of lands and grooves is 400 nm (the line width: 200 nm, the groove width: 200 nm) and the materials used are ZnS, SiO2 and ZnTe (the molar ratio: 68:17:15).

The method of manufacturing the minute structure is the same as that of the embodiment 7 except that the pulsed light output of blue laser light 204 is changed and the two sputtering targets of ZnTe and ZnS—SiO2 (the molar ratio: 80:20) are used. The composition of the film formed by the sputtering method was checked by the element analysis. The pulsed light output of FIG. 27A was 6.0 mW and the pulsed light output of FIG. 27B was 7.0 mW.

Figure 28:
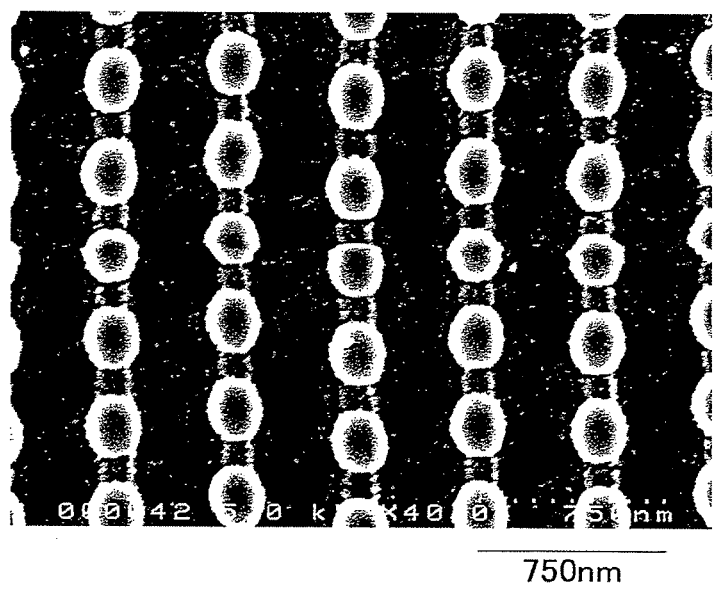
FIG. 28 is a diagram showing a scanning electron microscope photograph of another example of the minute structure of the embodiment 13.

FIG. 28 shows the scanning electron microscope photograph of another example of the minute structure of the embodiment 13. This minute structure is formed on the polycarbonate substrate in which the track pitch of lands and grooves is 400 nm (the line width: 200 nm, the groove width: 200 nm), and the materials-used are ZnS, SiO2 and Au (the molar ratio: 72:18:10).

The method of manufacturing the minute structure is the same as that of the embodiment 7 except that the pulsed light output of blue laser light 204 was 3.0 mW and the two sputtering targets of Au and ZnS—SiO2 (the molar ratio: 80:20) was used.

When the minute structures of FIG. 25A-25D, FIGS. 27A-27B, and FIG. 28 are compared, it turns out that the end of the minute structure of FIGS. 27A-27B is the smoothest. When the linear minute structures were produced by using the same materials as the minute structures of FIG. 25A-25D, FIGS. 27A-27B, and FIG. 28 and carrying out continuous irradiation of the laser beam and the respective LER were compared, the case where the same materials as the minute structure of FIG. 27 were used was the smallest. This is because Zn is contained in the material A' and the material C as the common element.

The minute structures were able to be produced in the cases where any of Al, Cu, Pt, Sb, Te, Ge, Si, Bi, Mn, W, Co, Nb and these alloys, for example, InSb, AgInSbTe, GeSbTe, etc. is used as the material C. Similarly, the minute structures were able to be produced in the cases where any of ZnMgTe, CsZnTe, ZnMgSSe, SbZn, ZnCrO4, ZnZrO3, ZnWO4, ZnTiO3, Zn3N2, ZnF2, ZnSnO3, ZnMoO4, GeS2, CoS, SnS, etc. is used. In a case where a material with a relatively large transmittance to blue laser beam, like ZnO, is used as the material Cr, if the materials used are ZnS, SiO2, ZnTe and ZnO (64:18:10:8), the minute structure with a smooth end was able to be produced. Also when any of ZnSe, MnS, and SrS is used as the material C, the minute structure with a smooth end was able to be produced.

Embodiment 14

The optical nonreflection film 200B shown in FIG. 18A and FIG. 18B was produced. The optical nonreflection film 200B is formed of quartz, and cylindrical patterns 201b with a diameter of about 150 nm and a height of about 250 nm are arranged in a period of 200 nm. When compared with the quartz substrate of the same thickness, the optical nonreflection film 200B increases the transmittance to the light whose wavelength is in a range of 400-600 nm, and the increased transmittance is nearly 100%. This is because the periodical structure turns into the moth-eye structure, avoiding reflection and allowing light penetration.

The method of manufacturing the optical nonreflection film 200B is the same as that of the embodiment 7 except that the irradiation of blue laser light 204 is performed in a period of 200 nm, the mixed material layer 202 of FeS—SiO2 (the molar ratio: 80:20) is formed and the two sputtering targets of FeS and SiO2 are used. After the optical nonreflection film 200B is formed using a wafer, it is divided into pieces of several millimeters by dicing of the wafer, and the optical nonreflection film 200B is obtained by washing to remove impurities.

ZnS, CaS, and SrS are almost transparent in a visible light region and have a small optical absorption ability. In contrast, FeS has a comparatively large optical absorption ability among these sulfur compounds. FeS—SiO2 (the molar ratio: 80:20) absorbs a laser beam with an emission wavelength in a visible light region. For this reason, FeS functions as a material for raising the optical absorption ability.

As shown in FIG. 16D, an optical nonreflection film in which the minute structures 206 are formed on the quartz substrate 201 can be also used. Since the material of the minute structures 206 differs from quartz, there may be a case in which the optical nonreflection film effect is weak or exfoliation arises at the time of dicing process and the yield becomes low. To avoid this, pattern transferring may be performed after etching is performed to the surface of the quartz substrate 201 if needed. At this time, the configuration of the pattern formed on the surface of the quartz substrate 201 is fundamentally similar to that of the minute structure 206 used as a mask. However, since the etching rate to CF4 of the minute structure 206 is small enough, a pattern in the configuration with a high aspect ratio can be formed.

When reproducing is performed, the pattern may be transferred into the material containing a resin as the main ingredient, by using nanoimprinting technology, such as thermal nanoimprinting, optical nanoimprinting, or soft lithography.

Embodiment 15

FIG. 29A through FIG. 29D show the scanning electron microscope photographs of the minute structure of the embodiment 15. Such minute structure is formed on the polycarbonate substrate in which the track pitch of lands and grooves is 400 nm (the line width: 200 nm, the groove width: 200 nm) and the material used is FeS—SiO2 (the molar ratio: 80:20). The method of manufacturing the minute structure is the same as that of the embodiment 7 except that the mixed material layer 202 of FeS—SiO2 (the molar ratio: 80:20) is formed, the two sputtering targets of FeS and SiO2 are used, and the pulsed light output of blue laser light 204 is charged. The pulsed light outputs of FIG. 29A, FIG. 29B, FIG. 29C, and FIG. 29D are 1.5 mW, 2.0 mW, 3.0 mW, and 4.5 mW, respectively.

Figure 29A:
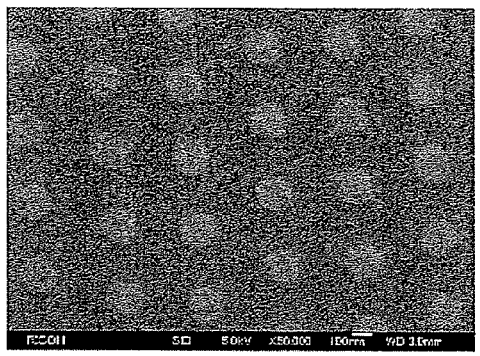
FIG. 29A, FIG. 29B, FIG. 29C and FIG. 29D are diagrams showing scanning electron microscope photographs of the minute structure of the embodiment 15.
Figure 29B:
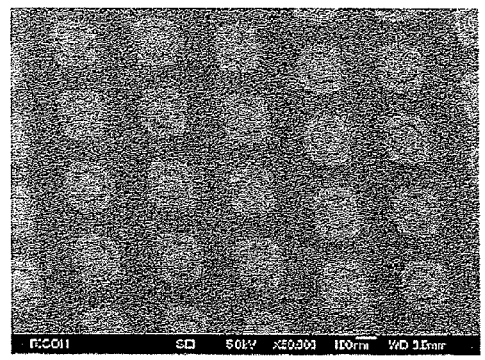
Figure 29C:
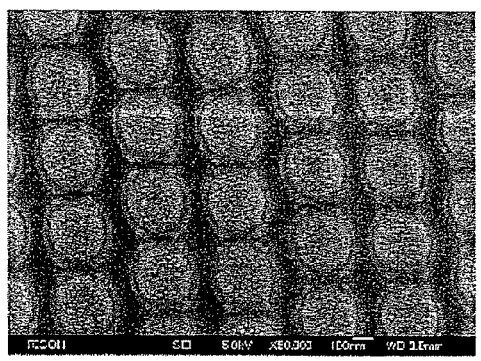
Figure 29D:
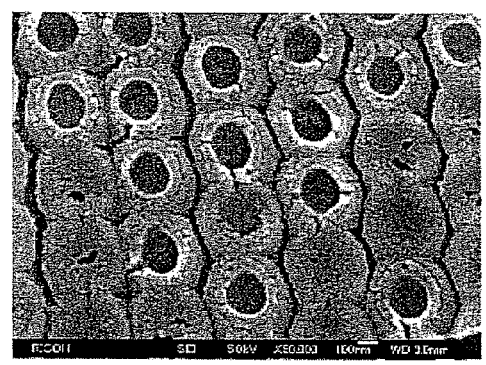

The minute structure in FIG. 29A is in a hemispherical configuration, the minute structure in FIG. 29B or FIG. 29C is in a configuration in which a hemispherical structure is formed on a cylinder structure, and the minute structure in FIG. 29D is in a cylindrical configuration. The size of minute structure varies depending on the pulse width or the pulsed light output of the laser beam.

Figure 30A:
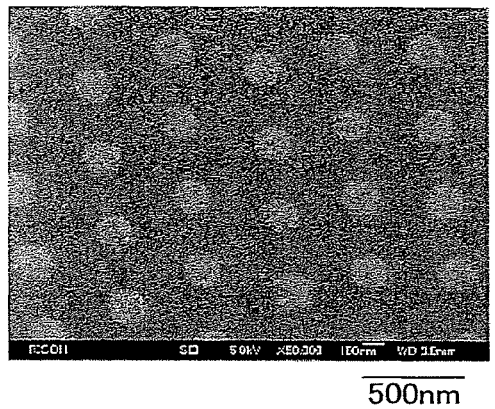
FIG. 30A and FIG. 30B are diagrams showing scanning electron microscope photographs of another example of the minute structure of the embodiment 15.
Figure 30B:
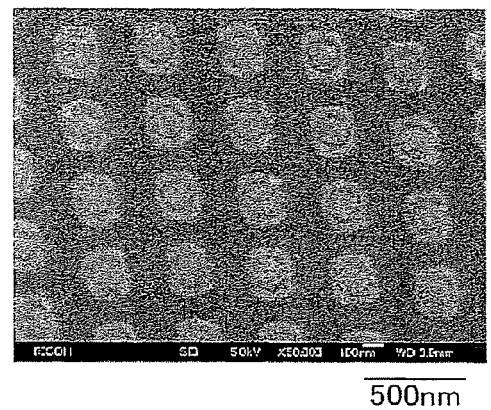

FIG. 30A and FIG. 30B show the scanning electron microscope photographs of another example of the minute structure of the embodiment 15. Such minute structure is formed on the polycarbonate substrate in which the track pitch of lands and grooves is 400 nm (the line width: 200 nm, the groove width: 200 nm), and the material used is FeS—SiO2 (the molar ratio: 76:24).

The method of manufacturing the minute structure is the same as that of the embodiment 7 except that the mixed material layer 202 of FeS—SiO2 (the molar ratio: 76:24) is formed, the two sputtering targets of FeS and SiO2 are used, and the pulsed light output of blue laser light 204 is changed. The pulsed light output of FIG. 30A and FIG. 30B are 1.1 mW and 1.4 mW, respectively.

The minute structure 206 is formed through the irradiation of blue laser light 204, the immersion in a hydrofluoric acid 205 and the etching. In the area irradiated by blue laser light 204, FeS and SiO2 may be systematized and the etching resistance to hydrofluoric acid 205 may improve.

Embodiment 16

The minute structure 208 which is constructed as shown in FIG. 19 is formed on the quartz substrate 201. The materials of the minute structure 208 are ZnS, SiO2 and Au (the molar ratio: 72:18:10). At this time, a slide glass may be used instead of the quartz substrate 201.

The method of manufacturing the minute structure 208 is the same as that of the embodiment 9 except that the pulsed light output is 8 mW. Next, a DNA chip is produced as follows. By using an ink jet system, 10,000 or more kinds of DNA fragments are arrayed and fixed as minute spots on the quartz substrate 201 on which the minute structure 208 was formed. The ink jet method is advantageous for controlling of the discharge amount from an ejection hole.

The DNA chip is made to react (hybridization) with the sample DNA in which labeling of the discovery gene of the cell is performed with fluorescent coloring matters Cy3 (green) and Cy5 (red). As a result of the reaction of mutually complementary DNAs, the minute spots having corresponding DNAs are colored. The color of such minute spots is read out using a high-resolution DNA chip analysis device, and the function data of the sample DNA is obtained from DNA on the DNA chip.

Volume production of DNA chips is possible as follows. A flat, disc-like quartz substrate 201 as in the embodiment 7 is rotated, the DNS chips are formed on a wafer with a large area, and the wafer is cut into DNA chips by dicing. For example, the DNA chips with a size of about 4 mm squares can be produced with low cost. DNA chips may be produced using an XY stage.

In order to raise the detection efficiency of DNA, it is important how the DNA fragments be arrayed and fixed as the minute spots. The minute structure in the embodiment 16 is arranged with a large specific surface area. At this time, the DNA chip of the embodiment 16 can be manufactured with low cost when compared with the DNA chip manufactured using photolithography, etc. The minute structure in a cylindrical configuration as shown in FIG. 19A-19B is present uniquely to heat lithography, and its specific surface area is comparatively large.

DNA chips may be manufactured using materials and manufacturing methods other than the embodiment 16. At this time, a certain oxygen deficiency may arise in SiO2. A material for raising the optical absorption ability, such as a metal or an alloy, may be used as the material C. When a fluorescent material, such as CdTe or CdSe, is selected as the material C, fluorescence detection may be used. When a metal, such as Au, is used as the material C, the plasmon effect is expectable.

Embodiment 17

Figure 32:
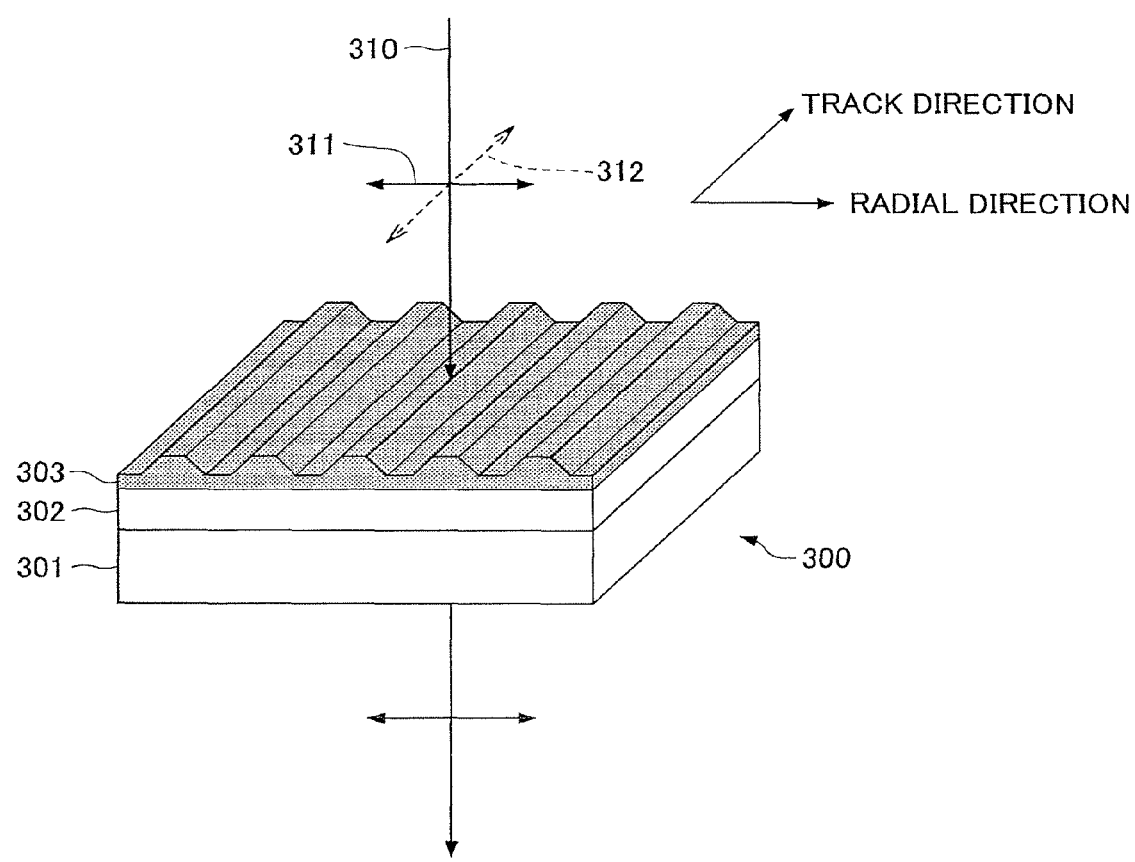
FIG. 32 is a perspective view showing the composition of a polarization separator element of the embodiment 17.

FIG. 32 shows the composition of a polarization separator element 300 of the embodiment 17. The polarization separator element 300 includes a ZnS layer 302 which is formed on a polycarbonate substrate 301, and linear minute structures 303 which are periodically arranged on the ZnS layer 302. The polarization separator element 300 has the function to separate a light 310, having a wavelength specified according to the characteristics (a period, a refractive index) of the polarization separator element 300, into P polarized light 311 and S polarized light 312. The light of P polarized wave is a polarization component in which the plane of vibration of the electric field vector is parallel to a plane of incidence, and the light of S polarized wave is a polarization component in which the plane of vibration of the electric field vector is perpendicular to a plane of incidence.

FIG. 33A through FIG. 33D are diagrams for explaining the method of manufacturing the polarization separator element 300 of the embodiment 17. First, a 0.6 mm thick polycarbonate substrate 301 in which the unevenness (lands and grooves) with a height of 20 nm and a pitch of 200 nm is formed in the shape of a concentric circle is produced through the known optical disc manufacturing process using a master substrate and a stamper and injection molding. Next, a 10 nm thick ZnS layer 302, and a 200 nm thick mixed material layer 304 of ZnS, SiO2 and Zn (the molar ratio: 64:13:33) are deposited on the polycarbonate substrate 301 in this order through RF sputtering using a sputtering apparatus CFS-8EP-55 (from Shibaura Mechatronics Co.) (refer to FIG. 33A).

A blue laser light 306 with a wavelength of 405 nm from a laser beam irradiation apparatus (from Shibasoku Co.) which is condensed by an objective lens 305 with NA of 0.85 is focused on the surface of the mixed material layer 304 in which tracking is carried out. The laser light is continuously applied at 3.5 mW optical output to the polycarbonate substrate 301 which is rotated (refer to FIG. 33B).

Figure 33A:
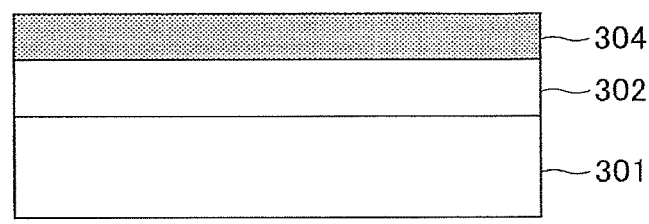
FIG. 33A, FIG. 33B, FIG. 33C and FIG. 33D are cross-sectional diagrams for explaining the method of manufacturing the polarization separator element of the embodiment 17.
Figure 33B:
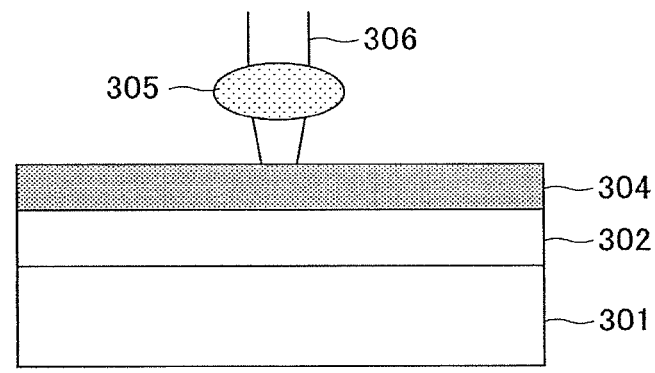
Figure 33C:
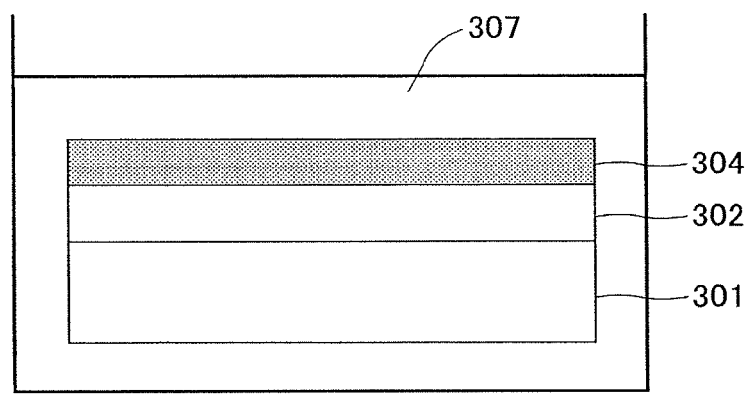

Then, the polycarbonate substrate 301 is immersed in a hydrofluoric acid 307 of 2% by weight for 10 seconds and etching is performed (refer to FIG. 33C). After rinsing it with pure water and drying it up, the polarization separator element 300 in which the minute structures 303 are arranged periodically is obtained (refer to FIG. 33D).

The mixed material layer 304 adequately irradiated by the laser beam 306 remains non-etched and it turns into the minute structure 303. In the embodiment 17, a part of the mixed material layer 304 formed as the land (convex) remains, and a part of the mixed material layer 304 formed as the groove (concave) is removed. For this reason, adjoining minute structures 303 are interconnected.

Figure 34A:
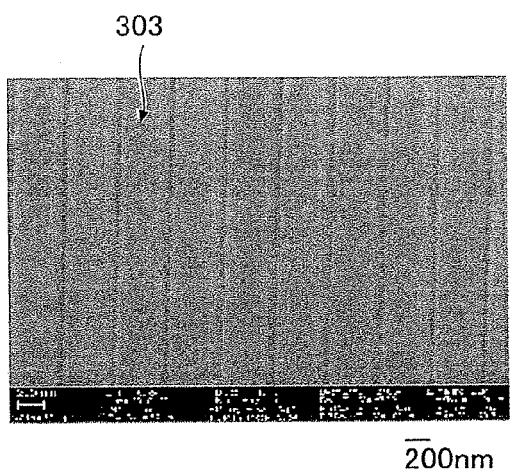
FIG. 34A and FIG. 34B are diagrams showing scanning electron microscope photographs of the polarization separator element (3.5 mW pulsed light output) of the embodiment 17.
Figure 34B:
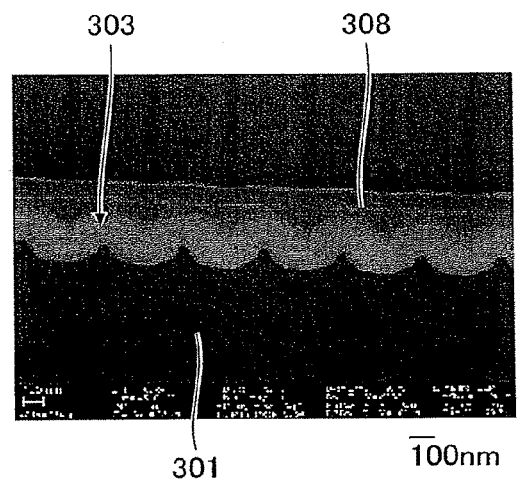

FIG. 34A and FIG. 34B show the scanning electron microscope photographs of the polarization separator element 300 of the embodiment 17. FIG. 34A is a top view of the polarization separator element and FIG. 34B is a perspective view of the polarization separator element when a cross-section of the polarization separator element 300 is formed using a focused ion beam (FIB). In order to form a cross-section, a carbon protection layer 308 is deposited on the upper part of the minute structure 303 in FIG. 34B.

As is apparent from FIG. 34A-34B, the linear minute structures 303 are arranged periodically in the polarization separator element 300. The polarization separator element in which the linear patterns are formed in this way is called a wire grid polarizer.

Figure 35:
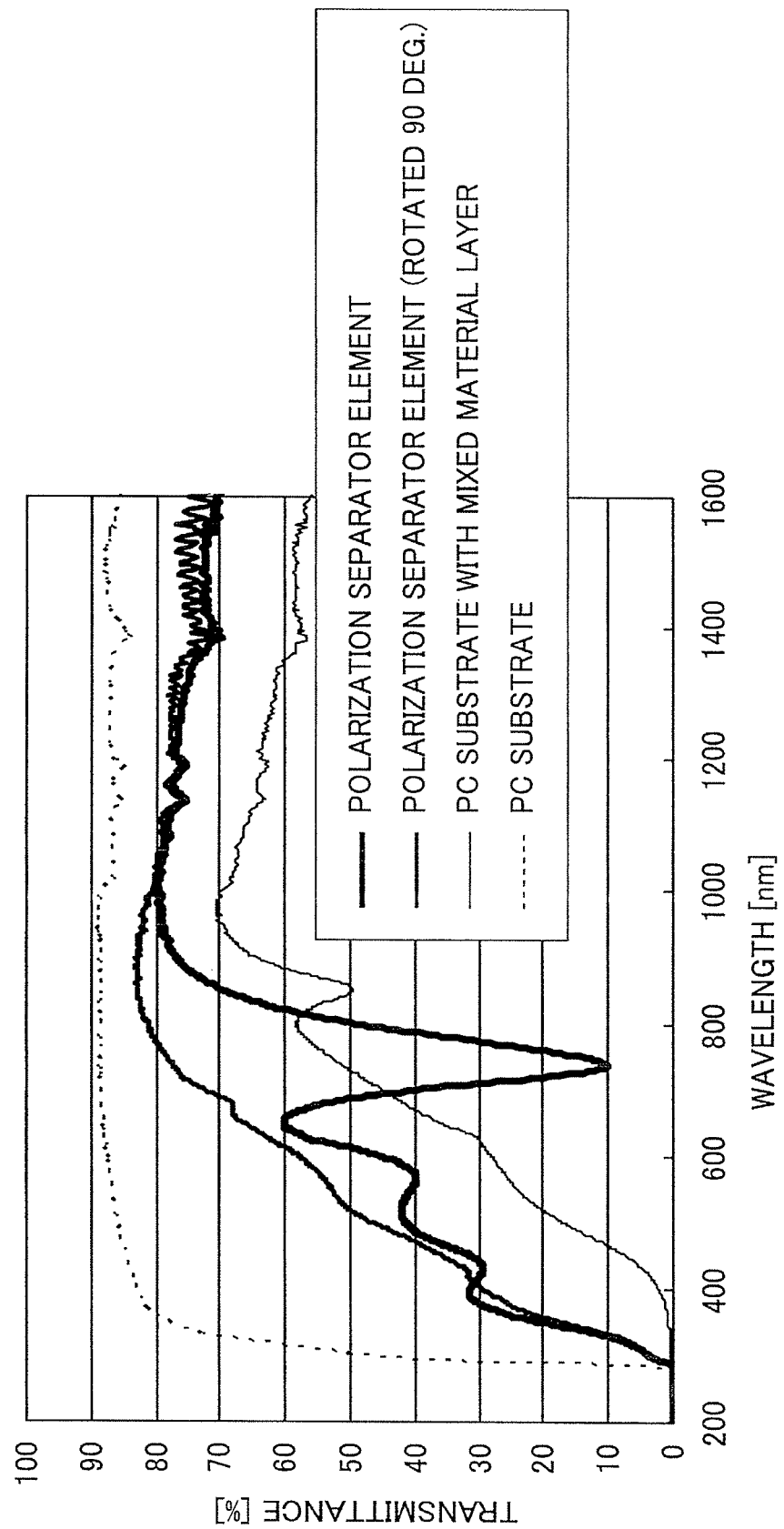
FIG. 35 is a diagram showing the wavelength dependency of the transmittance to S polarized light of the polarization separator element of the embodiment 17.

By entering S polarized light into the polarization separator element 300 (see FIG. 33A) in which the polycarbonate substrate 301, the ZnS layer 302, and the mixed material layer 304 are formed, the wavelength dependency of the transmittance to S polarized light was measured as shown in FIG. 35. Similarly, by entering S polarized light into the polarization separator element 300 which is rotated by 90 degrees, and using a high-speed spectroscopic ellipsometer M-2000DI (from J. A. Woollam Japan) as a measuring device, the measurement spot diameter is about 3 mm and the measurement is done in the mode of transmittance measurement using linear polarization.

At this time, the polarization separator element 300 is larger in size than the measurement spot diameter.

As is apparent from FIG. 35, the center wavelength in the case of the polarization separator element 300 which is not rotated by 90 degrees is about 747 nm and dip is seen. In the case of the polarization separator element 300 which is rotated by 90 degrees, dip is not seen. Therefore, the polarization separator element 300 has a polarization separation function in a wavelength zone of 650-840 nm around the center wavelength of about 747 nm.

Next, a polarization separator element 300 is produced in the same manner as the above example except that the continuous optical output of laser beam 304 is changed to 3.0 mW and 2.5 mW.

Figure 36A:
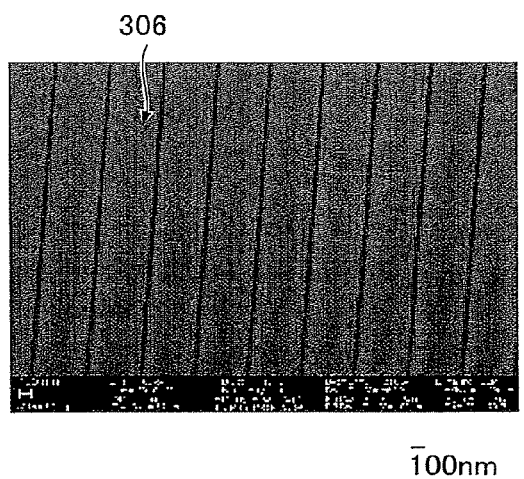
FIG. 36A and FIG. 36B are diagrams showing scanning electron microscope photographs of the polarization separator element (2.5 mW pulsed light output) of the embodiment 17.
Figure 36B:
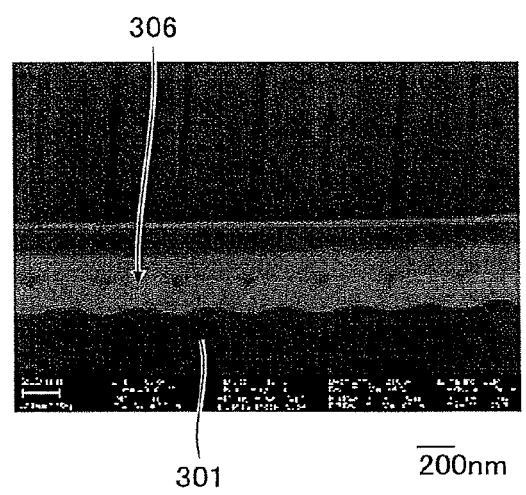

FIG. 36A and FIG. 36B show the scanning electron microscope photographs of the polarization separator element 300 when the continuous optical output is set to 2.5 mW. FIG. 36A is a top view of the polarization separator element and FIG. 36B is a perspective view of the polarization separator element when a cross-section of the polarization separator element 300 is formed using a focused ion beam (FIB). In order to form a cross-section, a carbon 308 is deposited on the upper part of the minute structure 303 in FIG. 36B.

Figure 37:
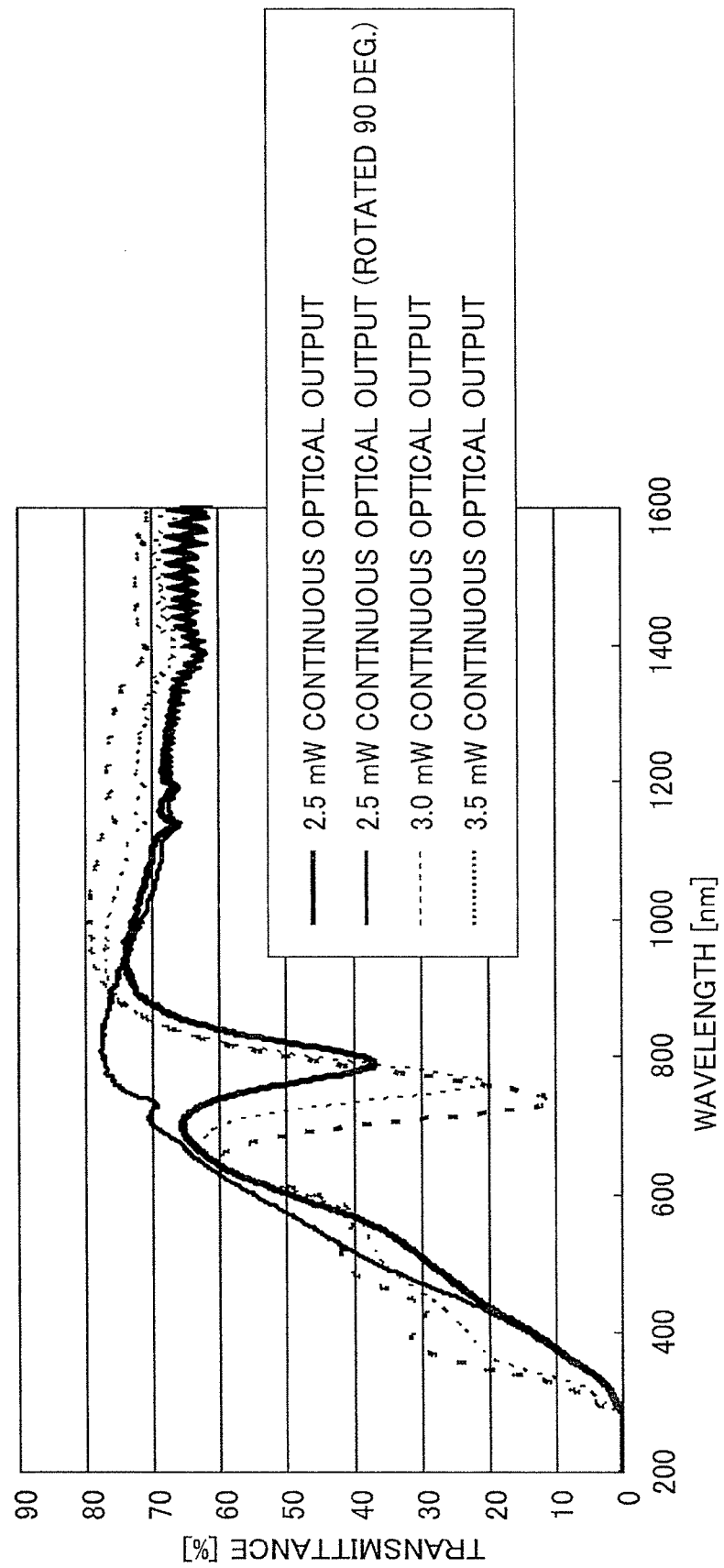
FIG. 37 is a diagram showing the wavelength dependency of the transmittance to S polarized light of the polarization separator element of the embodiment 17.

FIG. 37 shows the wavelength dependency of the transmittance to S polarized light of the polarization separator element 300. As is apparent from FIG. 37, in the case of the polarization separator element 300 which is rotated by 90 degrees and the continuous optical output is set to 2.5 mW, dip is not seen similar to the above example. In the case of the polarization separator element 300 which is not rotated by 90 degrees, dip is seen in any of the cases in which the continuous optical output is set to 3.5 mW, 3.0 mW, and 2.5 mW, and the depth of dip is large when the continuous optical output is set to a large value, and it is shifted to the low wavelength side.

The etching rate of ZnS, SiO2 and Zn (the molar ratio: 64:13:33) to hydrofluoric acid of 2% by weight is measured. In the non annealing case, the etching rate is about 5.26 nm/second. In the case in which annealing is performed using an electric furnace (air atmosphere) for 30 minutes at 500 degrees C., the etching rate is about 0.17 nm/second. This result shows that the etching rate ratio (the ratio of the non-annealing case to the annealing case) by the performance of annealing is about 33, and etching resistance improves rapidly by annealing.

As for the laser beam irradiation and the annealing, the final temperature and the highest temperature attainment time are different but they are consistent in that heat is supplied. For this reason, in the embodiment 17, supply of heat by laser beam 306 is mentioned as one of the factors to which pattern formation of the mixed material layer 304 is carried out by being immersed in a hydrofluoric acid 307 and etching after irradiating laser beam 306.

Also when the same experiment is conducted using ZnS—SiO2 (the molar ratio: 80:20), the almost same etch selectivity is obtained, and crystallization of ZnS is conjectured that such an etching resistance change originates greatly.

When the thin film which is formed of ZnS, SiO2 and Zn was annealed for 30 minutes at 500 degrees C. among the atmosphere, the transmittance in the visible light region increased and the diffraction X-ray peak of ZnO was seen from X-ray diffraction. That is, oxidization of Zn is checked. For this reason, it is surmised also in mixed material layer 304 laser beam 306 was irradiated that Zn has oxidized.

Namely, if the mixed material layer 304 is irradiated 306, Zn which has optical absorption ability will absorb laser beam 306, and it oxidizes and the transmittance in the visible light region of the minute structure 306 increases. At this time, since it is transparent in the visible light region, when ZnS and SiO2 glare laser beam 306, pattern formation of the transparent material is carried out.

The light transmittance of the sample in which the 100-nm-thick ZnS layer was formed on the glass substrate whose light transmittance is 93% was about 20%, about 60%, and about 90% in wavelengths in 300 nm, 405 nm, and 550 nm, respectively.

On the other hand, the light transmittance of SiO2 exceeds 90% in a 200-1700 nm wavelength zone. At this time, pattern formation of ZnS—SiO2 (the molar ratio: 80:20) can also be carried out by irradiating the light which ZnS—SiO2 (the molar ratio: 80:20) absorbs, for example, the DUV (deep ultraviolet) laser beam whose wavelength is 266 nm, and the EUV (extreme ultraviolet) laser beam whose wavelength is 13.5 nm.

However, the equipment becomes expensive and irradiation time is also required, so that the wavelength of the laser beam to glare becomes short. In the embodiment 17, since the optical absorption ability of a mixed material layer is raised and the vacuum is not needed, minute structure is producible by irradiating the semiconductor laser beam whose visible regions, for example, a wavelength, are 405 nm, 650 nm, and 780 nm. Such a polarization separator element 300 can be used also as a diffraction grating.

Embodiment 18

Figure 38:
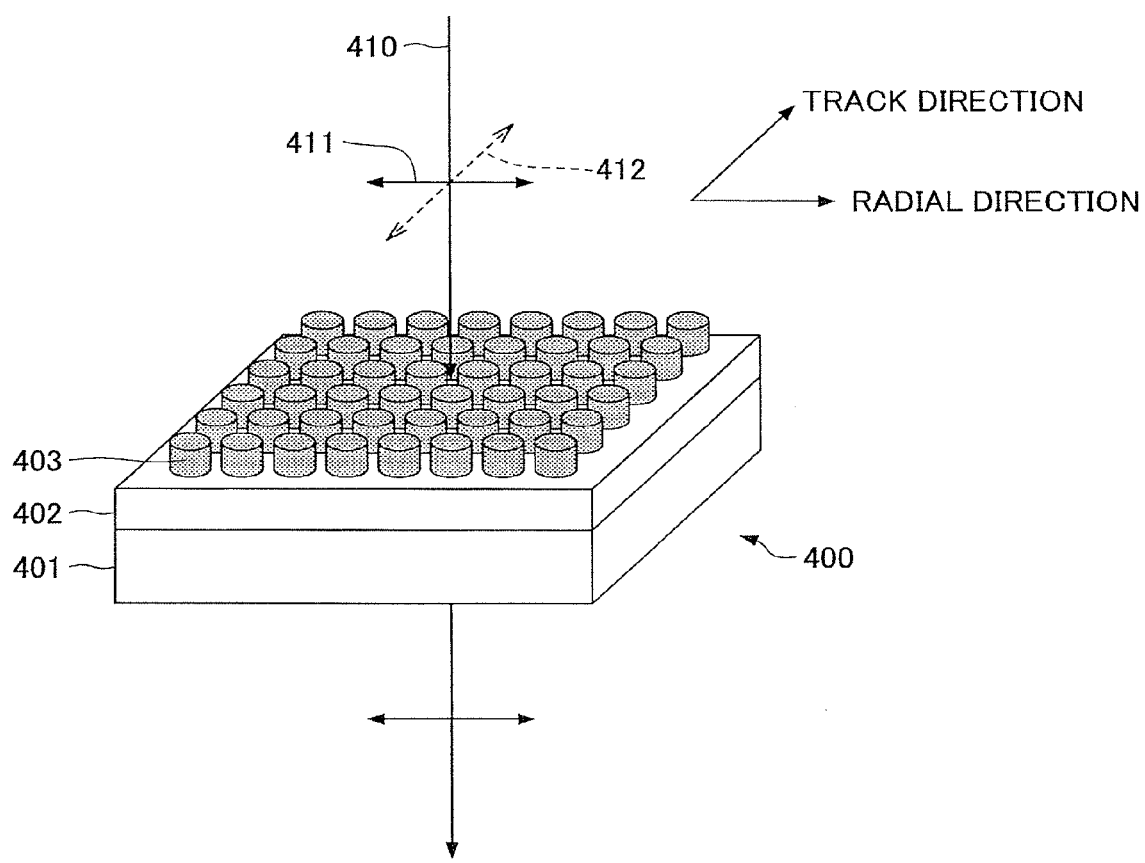
FIG. 38 is a perspective view showing the composition of an optical filter of the embodiment 18.
Figure 39A:
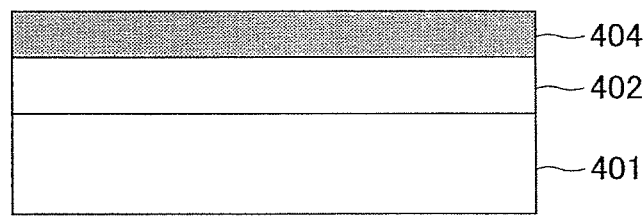
FIG. 39A, FIG. 39B, FIG. 39C and FIG. 39D are cross-sectional diagrams for explaining the method of manufacturing the optical filter of the embodiment 18.
Figure 39B:
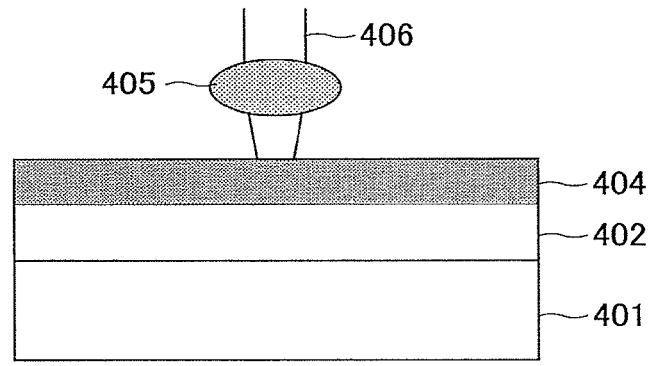
Figure 39C:
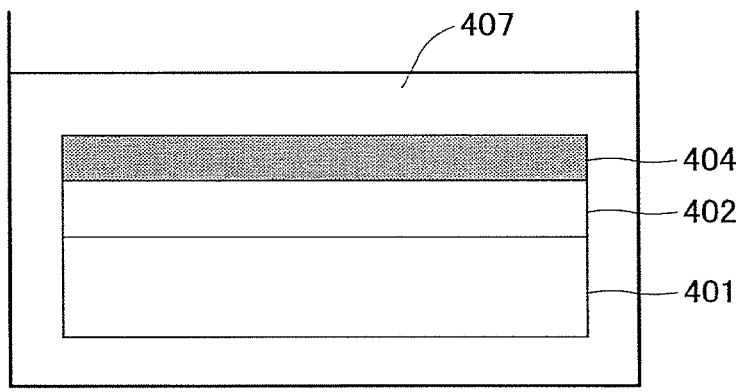
Figure 39D:
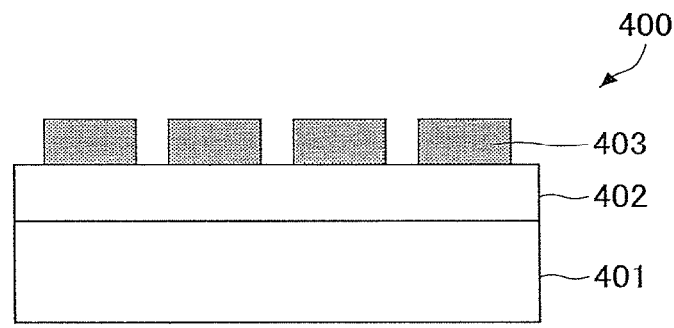

The optical filter shown in FIG. 38 was produced. As for optical filter 400, ZnS layer 402 is formed on polycarbonate substrate 401, and minute point-like structure 403 is periodically formed on it. For this reason, it has the function to reflect P polarized light 411 or S polarized light 412 to light 410 of a specified wavelength according to the characteristics (a period, a refractive index) of optical filter 400.

The method of manufacturing the optical filter 400 is shown in FIG. 39A-39D. First, 20 nm in height and unevenness (land groove) of pitch 400 nm manufactured polycarbonate substrate 401 with a thickness of 0.6 mm formed in the shape of a concentric circle according to the process of the common optical disc of having used master substrate and a stamper, and an injection molding.

Next, a mixed material layer 404 with a thickness of 200 nm which is formed of 10-nm-thick ZnS layer 402, and ZnS, SiO2 and Zn (the molar ratio: 64:13:33) on polycarbonate substrate 401 in order It formed by RF sputtering using a sputtering apparatus CFS-8EP-55 (from Shibaura Mechatronics Co.) (refer to FIG. 39A).

A blue laser light 406 whose wavelength by which NA of laser beam irradiation equipment (made by Shibasoku Co.) was focused with objective lens 405 of 0.85 is 405 nm. The focus was carried out to the surface of mixed material layer 404 by which tracking was carried out, and pulsed light irradiation was performed on it with 10 mW pulsed light output to polycarbonate substrate 401 to rotate (refer to FIG. 39B).

Figure 33D:
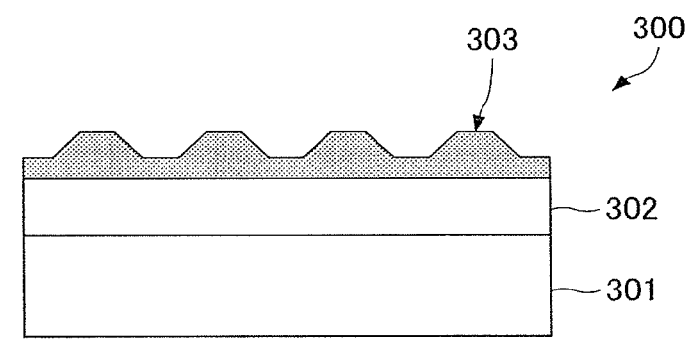

Then, after being immersed in a hydrofluoric acid 407 for 10 seconds 2% by weight and etching (refer to FIG. 39C), it was made to wash and dry with pure water, and minute structure 403 obtained optical filter 400 arranged periodically (refer to FIG. 33D). At this time, mixed material layer 404 laser beam 406 was fully irradiated remains, and it becomes minute structure 403. The gap of minute structure 403 in the track direction is about 400 nm.

The scanning electron microscope photographs of the optical filter 400 are shown in FIG. 40A and FIG. 40B. The photographs of FIG. 40A and FIG. 40B are taken from the top surface direction and the slanting direction, respectively.

Figure 41:
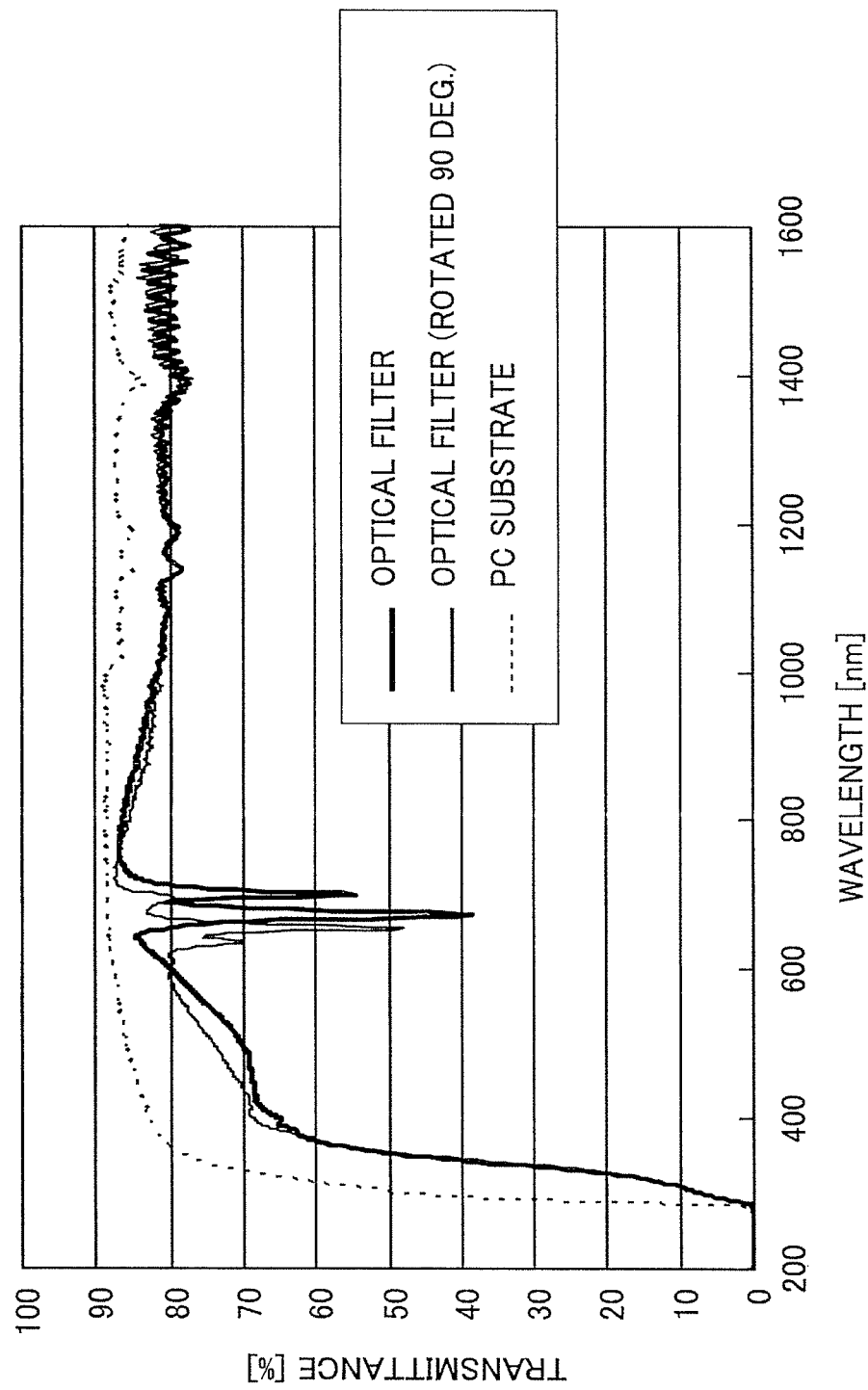
FIG. 41 is a diagram showing the wavelength dependency of the transmittance to S polarized light of the optical filter of the embodiment 18.

By entering S polarized light 412 in the optical filter 400 and the polycarbonate substrate 401, the wavelength dependency to S polarized light was measured as shown in FIG. 41. Similarly, by entering S polarized light 412 in the optical filter 400 which was rotated 90 degrees, the wavelength dependency to S polarized light was measured. In the measurement, a high-speed spectroscopic ellipsometer M-2000DI (from J. A. Woollam Japan) was used as a measuring device, the measurement spot diameter was about 3 mm, and the measurement was performed in the mode of transmittance measurement using linear polarization.

When it is optical filter 400 which 674 nm and 701 nm are made into a center wavelength in the case of optical filter 400 which is not rotated 90 degrees, and narrow dip of line width is comparatively looked at, and was rotated 90 degrees from FIG. 41, it turns out that dip is seen by making 655 nm into a center wavelength. Therefore, optical filter 400 has a function which filters polarization of a specific wavelength zone. At this time, reflection factor measurement shows that the light corresponding to a dip wavelength which is not penetrated is reflected.

Next, except having changed the pulsed light output of laser beam 406, when optical filter 400 was produced like the above, the tendency for the depth of dip of the one where a pulsed light output is larger to become deep was seen. Pattern formation of the transparent material is carried out by irradiating laser beam 406 as in the embodiment 17 also in this case.

Embodiment 19

Figure 42A:
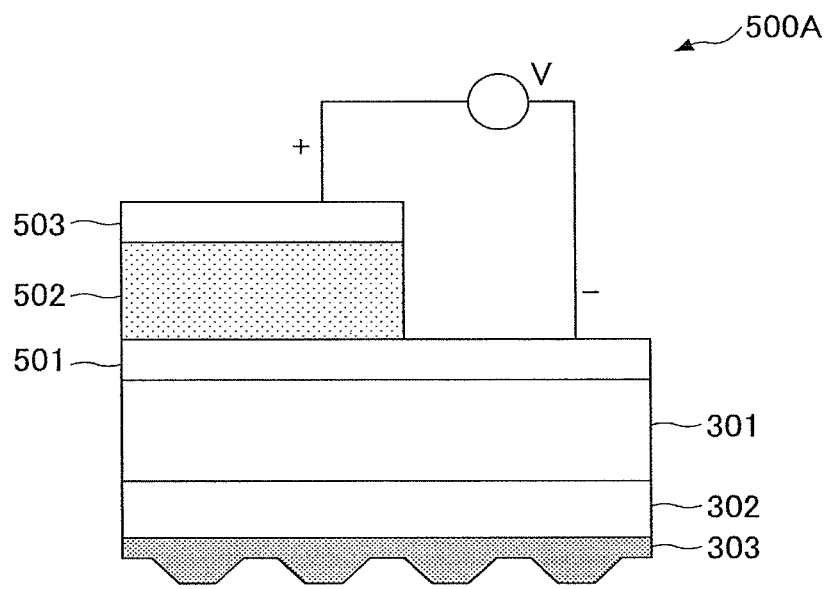
FIG. 42A and FIG. 42B are cross-sectional diagrams showing the composition of an inorganic EL element of the embodiment 19.
Figure 42B:
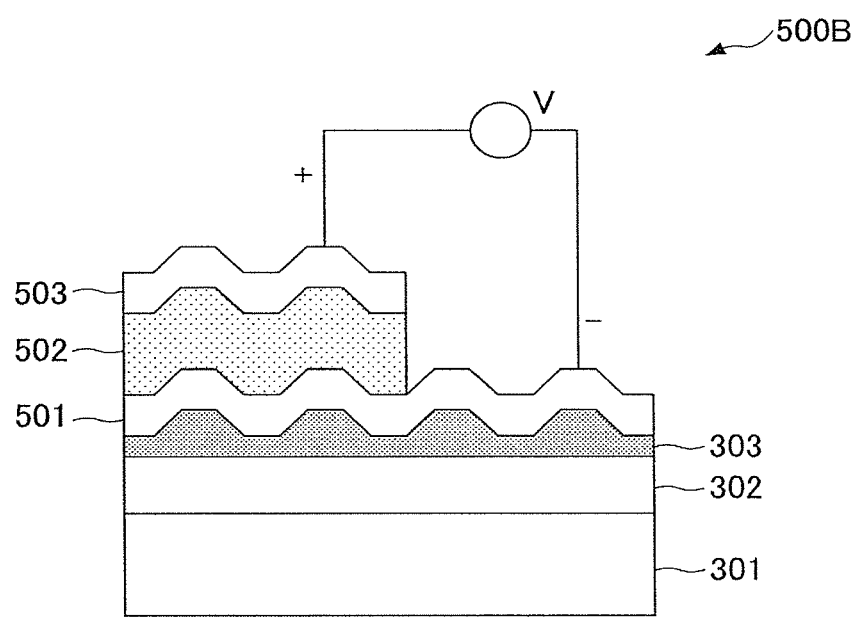

As an example of a light emitting device, inorganic electroluminescence (EL) elements 500A and 500B shown in FIG. 42A and FIG. 42B were produced. In an EL element, luminescence occurs by the recombination of a positive hole and an electron. Although a flat substrate is usually used in an EL element, if the substrate in which the uneven pattern is formed is used, the incident light of under a critical angle will be penetrated according to the acid resisting effect, and the incident light exceeding the critical angle which cannot be taken out can usually be taken out as diffracted light. As a result, the optical extraction efficiency is increased to about 1.5 times.

The inorganic EL element 500A includes the polarization separator element 300 (diffraction grating) in which the ZnS layer 302 is formed on the polycarbonate substrate 301, and linear minute structures 303 are periodically formed on the ZnS layer 302. On the surface of the polycarbonate substrate 301 where no minute structure 303 is formed, the cathode 501 which is formed of ITO (Indium tin oxide), the luminescent layer 502 which is formed of ZnS—Mn (the percentage of content of Mn is several percents by weight), and the anode plate 503 which is formed of Al are laminated sequentially in this order.

Similar to the inorganic EL element 500A, the inorganic EL element 500B has a diffraction grating, and the cathode 501, the luminescent layer 502, and the anode plate 503 are laminated on the minute structures 303 sequentially in this order.

In this embodiment, each minute structure 303 has a high transmittance in the visible light region, and it is suitable as a material which constitutes an EL element.

If a direct current voltage or alternating voltage is applied between the cathode 501 and the anode plate 503, a yellow-orange luminescence (the center wavelength: 585 nm) is seen and, in each case of the inorganic EL elements 500A and 500B, the luminous efficiency (optical extraction efficiency) is increased from that in the case where no minute structure 303 is formed.

In the embodiment 19, ZnS—Mn was used for the luminescent layer 502, but the invention is not limited to this embodiment. Alternatively, any other luminescent materials, such as CaSSe—Eu, CaS—Eu, SrS, Cu, SrS—Ce, BaAl2S4-Eu, BaZnS3-Mn, and ZnMgO, may be used.

Moreover, an organic EL device may be formed by using organic luminescent materials, such as a phenylene-vinylene base and an arylene base, for the luminescent layer 502, and using supply of a direct current voltage.

Embodiment 20

Figure 43:
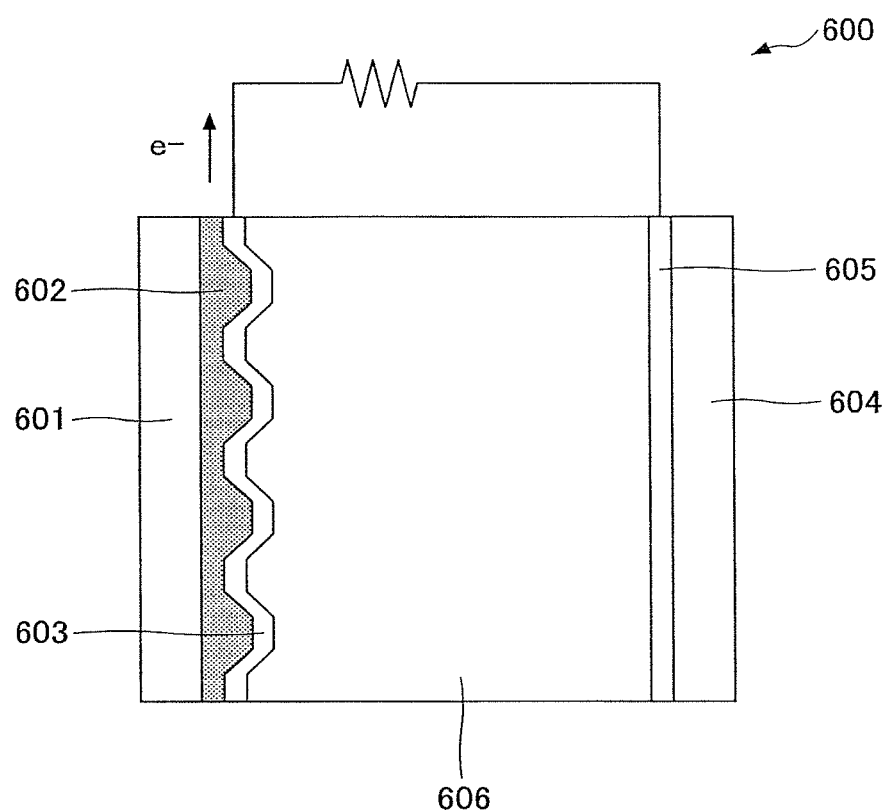
FIG. 43 is a cross-sectional diagram showing the composition of a dye-sensitized solar cell of the embodiment 20.

As an example of a photoelectric transducer, the dye-sensitized solar cell 600 shown in FIG. 43 was produced. A photoelectric transducer has a photoelectric conversion layer which absorbs light and transforms it into electricity. The amount of light absorbed increased as the thickness of the photoelectric conversion layer increases. The photoelectric conversion layer formed of a Si semiconductor or an organic semiconductor has a photovoltaic effect. If the p-n junction part or the Schottky junction part is irradiated by an excited light, the resulting electrons and positive holes are separated from each other by the electric field of the interface, and a potential difference is generated therebetween.

Usually, a flat substrate is used for a photoelectric transducer. If the substrate in which the uneven pattern is formed is used, the multipath reflection within the photoelectric conversion layer is increased and the photon inclusion effect is raised. As a result, the photoelectric conversion efficiency is increased by 3% to 5%.

Similar to the embodiment 17, in the dye-sensitized solar cell 600, the linear minute structures 602 are formed on the flat glass substrate 601, and the cathode 603 is further formed on the minute structures 602.

The photoelectric conversion layer 606 is interposed between the anode plate 605, formed on the glass substrate 604, and the cathode 603. Coloring matter, titania, an electrolyte, and a redox pair are contained in the photoelectric conversion layer 606.

As the coloring matter, RuL2(NCS)2 (L=4,4'-dicarboxy-2,2'-bipyridine) which is a ruthenium complex is used in this embodiment. However, the invention is not limited to this embodiment. Alternatively, another coloring matter, such as a porphyrin base or a cyanine base, may be used instead.

As the titania, its particulates whose particle diameter is about 10-30 nm are used in this embodiment. X Line diffraction to the titania particulates showed that they are mostly of anatase type. The titania may be formed by the sputtering method. If amorphous is contained and the photoelectric conversion efficiency is decreased. To avoid this, it is preferred to use particulates with a high degree of crystallinity.

As the electrolyte and the redox pair, the electrolytic solution Iodolyte TG 50 for low-output cells (from Solaronix Co.) (in which 0.5M of lithium iodide (LiI) and 0.05M of metal iodine (I2) are added to polyethylene glycol of molecular weight 220) is used in this embodiment. However, the invention is not limited to this embodiment. As the electrolyte, anions, such as lithium ion, and cations, such as chloride ion, may be used. As the redox pair, any of an iodine-iodine compound, a bromine-bromine compound, etc. may be used.

In the photoelectric conversion layer 606, the coloring matter absorbs light to emit electrons, and the titania (TiO2) of the semiconductor receives the electrons to transfer them to the cathode 603. The holes (h+) remaining in the coloring matter oxidize iodide ions (I−), and tri-iodide ions (I3−) are formed. The I3− are reduced by the anode plate 605. Electricity is generated by repeating the above cycles.

As the cathode 603 and the anode plate 605, ITO (indium tin oxide, 5% of tin oxide, 95% of indium oxide) is used in this embodiment. However, the invention is not limited to this embodiment. Alternatively, an FTO film in which fluorine is doped to tin oxide may be used.

The minute structures 602 may be produced on a polycarbonate substrate, etc. other than the glass substrates 601 of quartz. However, in a photoelectric transducer, the temperature is increased to about 500 degrees C. when forming ITO, and the glass substrate 701 having good heat resistance is usually used. The minute structures 602 in this embodiment contains ZnO.

The minute structures 602 are applicable also to solar cells other than the dye sensitizing type solar cells, such as Si thin film solar cell, a CIGS solar cell (Cu(In1-x, Gax)Se2), and a solar cell using a copper-indium-gallium-selenium base material.

Embodiment 21

The aspheric optical lens shown in FIG. 44A and FIG. 44B was produced. FIG. 44A is a perspective view of the aspheric optical lens and FIG. 44B is a cross-sectional view of the aspheric optical lens. The maximum diameter is about 2 micrometers, the height is about 2.5 micrometers, the aspheric optical lens 700 is in a configuration near a super-half sphere, and its maximum diameter is slightly larger than the lens diameter of the surface in contact with the quartz substrate 701.

The transmittance to the light with the wavelength of 660 nm is about 90%, and the aspheric optical lens 700 has a sufficiently available transmittance in a visible light region.

The aspheric surface optical lens 700 may be produced in the same manner as in the embodiment 18 except that the flat quartz substrate 701 is used instead of the polycarbonate substrate 401, and the laser beam whose wavelength is 780 nm is used instead of the blue laser light 506 whose wavelength is 405 nm.

From the results of powder X-ray diffraction, it turned out that the aspheric optical lens 700 has a very weak peak of Zn and an intense peak of ZnO. It appears that Zn is mostly oxidized and ZnO is formed. Thereby, the transmittance in the visible light region of the aspheric optical lens 700 increases.

From the results of annealing experiments of a thin film, it was estimated that the refractive index of the aspheric surface optical lens 700 is about 2.2. The aspheric optical lens 700 has a refractive index higher than that of quartz and contains an inorganic material, and the reliability is high. The aspheric surface optical lens 700 is able to be produced on the quartz substrate 701 and easily divided into pieces.

The configuration of the aspheric optical lens 700 is not restrictive. And by changing the pulsed light intensity of laser beam 506 or the thickness of the mixed material layer 504, it is possible to arrange the aspheric optical lens 700 in a hemispherical configuration.

Next, a description will be given of embodiments of the write-once information recording medium of the invention with reference to the accompanying drawings.

Figure 45B:
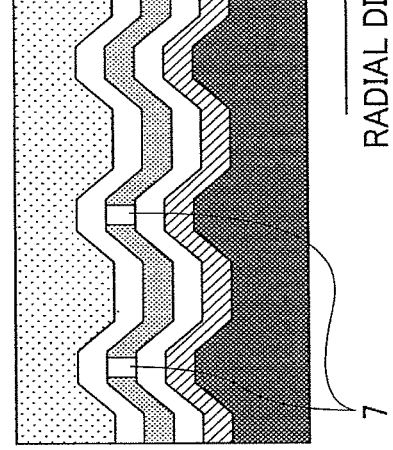
FIG. 45A and FIG. 45B are diagrams showing the composition of an optical information recording medium in an embodiment of the invention.
Figure 45A:
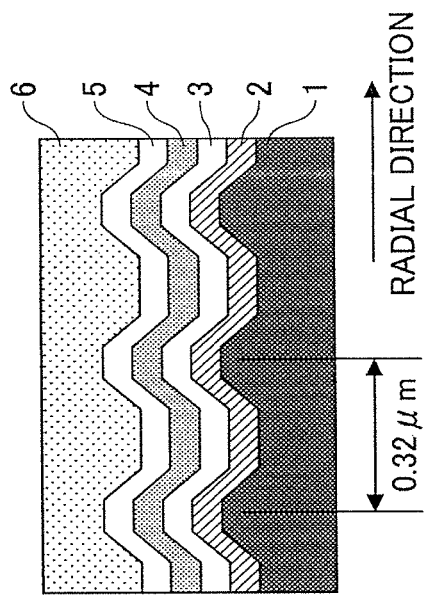

The cross-sectional structure of the write-once optical recording medium of the embodiment 1 (an example of the write-once information recording medium of the invention) is shown in FIG. 45A and FIG. 45B. FIG. 45A shows the state of the write-once optical recording medium before recording by irradiation of a laser beam, and FIG. 45B shows the state of the write-once optical recording medium after recording by the irradiation of the laser beam. The illustration of FIG. 45A and FIG. 45B is a schematic diagram, and does not correspond to the actual thickness or dimensions.

In the write-once optical recording medium of the embodiment 1, the track pitch was 0.32 micrometers and the CNR (Carrier to Noise Ratio) was 45 dB with the period of recording marks being 300 nm. The substrate 1 is a polycarbonate substrate which has a repetition unevenness of lands and grooves with the track pitch of 0.32 micrometers. On the substrate 1, the reflection layer 2 of Ag with the thickness of 40 nm, the lower dielectric layer 3 of ZnS—SiO2 (the molar ratio: 80:20) with the thickness of 50 nm, the recording layer 4 of ZnS, SiO2 and ZnTe (the molar ratio: 70:20:10) with the thickness of 15 nm, the upper dielectric layer 5 of ZnS—SiO2 (the molar ratio: 80:20) with the thickness of 40 nm, and the protection layer 6 of an acrylic resin of light transmission type with the thickness of 100 micrometers are sequentially deposited in this order.

If the recording layer 4 of the write-once optical recording medium of the embodiment 1 is irradiated by a laser beam using the optical pickup, recording marks 7 which are formed by cavities can be formed in the recording layer 4 as shown in FIG. 45B, so that information is recorded in the recording layer 4.

The write-once optical recording medium of the embodiment 1 was manufactured as follows. That is, the substrate 1 of polycarbonate which has repetition unevenness with the track pitch 0.32 micrometers of lands and grooves was produced through injection molding using a stamper. Next, the reflection layer 2 (Ag, the thickness: 40 nm), the lower dielectric layer 3 (ZnS—SiO2, the molar ratio: 80:20, the thickness:

50 nm), the recording layer 4 (ZnS, SiO2 and ZnTe, the molar ratio: 70:20:10, the thickness: 15 nm), and the upper dielectric layer 5 (ZnS—SiO2, the molar ratio: 80:20, the thickness: 40 nm) were sequentially deposited in this order on the substrate 1 through sputtering using a sputtering apparatus CFS-8EP-55 (from Shibaura Mechatronics Co.).

Then, the spin coating of the acrylic resin was carried out on the dielectric layer 5, the hardening by UV irradiation was performed, and the protection layer 6 (of light transmission type, the thickness: 100 micrometers) was formed.

Figure 48B:
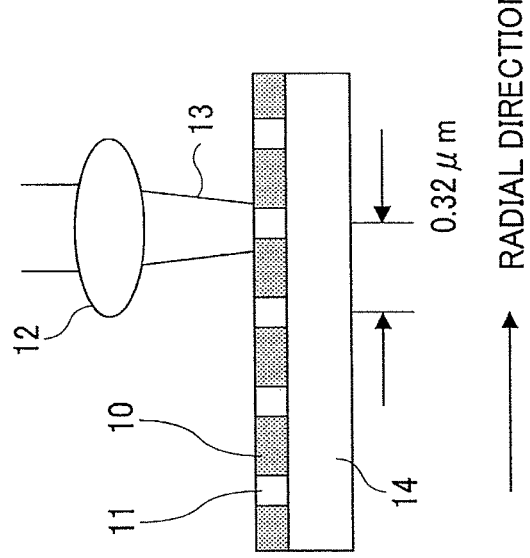
FIG. 48A and FIG. 48B are diagrams showing the composition of a master substrate in an embodiment of the invention.

Recording and reproduction of the write-once information recording medium of the embodiment 1 are performed as follows. Namely, a blue laser beam (the wavelength: 405 nm) is focused by the objective lens 12 (lens NA: 0.85) of the laser beam irradiation apparatus having the optical pickup as shown in FIG. 48B, on the surface of the recording layer 4. The focusing is carried out from the protection layer 6 side, the laser beam is multi-pulse modulated in accordance with the predetermined recording strategy (the emission-waveform control of the laser beam at the time of recording), and random data is recorded in the recording layer 4.

Similarly, the information is reproduced from the recording medium using the optical pickup by continuous irradiation of the laser beam (the wavelength: 405 nm) and the reproduction signal is observed. In this manner, the information based on the random data recorded in the recording layer 4 of the write-once optical recording medium of the embodiment 1 is reproduced, and the function and performance of the write-once optical recording medium of the embodiment 1 is checked.

The cavity and the expansion are observed in the area where the recording marks are formed in the recording layer 4 of the write-once optical recording medium after recording when the surface configuration is checked using the atomic force microscope (AFM).

The expansion contains minute cavities inside it. Each of the cavity and the expansion arises after the recording is performed by irradiating the recording layer 4 by the laser beam, and due to the existence of the cavity and the expansion, the reflection factor of the recording layer 4 is changed before and after the recording. And it was confirmed that the information based on the above-mentioned random data is recorded in the recording layer 4 and that this information is reproducible.

The following experiments were conducted in order to observe the cavity and the expansion existing in the recording marks formed in the recording layer 4 of the write-once optical recording medium of the embodiment 1.

Namely, the sample being observed is formed as follows. The recording layer 4 of ZnS, SiO2 and ZnTe (the molar ratio: 70:20:10, the thickness: 40 nm) is formed on the substrate 1 of polycarbonate by sputtering using a sputtering apparatus CFS-8EP-55 (from Shibaura Mechatronics Co.). And the pulsed laser irradiation (the wavelength: 405 nm, the objective lens NA: 0.85) is performed to the recording layer 4 of this sample. The pulses laser irradiation is performed at intervals of 400 nm, and the linear velocity is 4.5 m/sec.

The scanning electron microscope (SEM) photographs of the recording marks formed in the surface (the recording layer 4) of the sample at this time are shown in FIG. 46A and FIG. 46B. In the state of the write-once optical recording medium, the protection layer 6 is laminated on the recording layer 4, and observation of the surface state of the recording layer 4 is difficult. In the experiments, the above-mentioned sample is prepared and the recording marks which are formed in the recording layer 4 are observed.

FIG. 46A shows a SEM photograph when the irradiation intensity of the laser beam is 6 mW, and FIG. 46B shows a SEM photograph when the irradiation intensity of the laser beam is 7 mW.

In the case of FIG. 46B, the holes 9 with the diameter of about 80 nm are formed at almost all the laser beam radiation portions. In the case of FIG. 46A, the laser irradiation portions 8 are in an expansion state, and the cavities are formed inside the laser irradiation portions 8. These states were similarly observed by the AFM measurement or the transmission electron microscope (TEM).

It is estimated that the expansion (state) and cavity have contributed to the reflection factor change in the write-once information recording medium of the invention. Although the spot diameter of the laser beam is about 400 nm, the write-once information recording medium of the invention is advantage in that holes with the diameter of 80 nm that is sufficiently smaller than the spot diameter can be formed.

The mixed inorganic material which constitutes the recording layer 4 in the write-once information recording medium of the embodiment 1 contains ZnS (zinc sulfide) as a sulfur compound of the material A, contains SiO2 (silicon dioxide) as a silicon oxide of the material B, and contains ZnTe (zinc telluride) as the material C. The light transmittance of ZnS—SiO2 (the molar ratios: 50:50-90:10) with the thickness of 15 nm which is the same as the thickness of the recording layer 4 in the write-once information recording medium of the embodiment 1 is about 100%. That is, the ZnS—SiO2 is equivalent to the mixed inorganic material, constituting the recording layer 4, from which the ZnTe which is the material C is excluded. This shows that the light transmittance in the visible light region of the ZnS—SiO2 falls by adding ZnTe which is the material C thereto.

Specifically, when the light transmittance in the visible light region is compared between the layer formed of ZnS—SiO2 (material A and material B) and the layer formed of ZnS, SiO2 and ZnTe (the mixed inorganic material: material A, material B, and material C) with respect to the same thickness, it turned out that the whole transmittance falls (which falls to 60% from 100%) as the content ratio of ZnTe increases, but the optical absorption ability increases (the extinction coefficient k increases from the order of $10^{-1}$ to the order of $10^{-3}$). The optical absorption ability was measured using the spectroscopic ellipsometer.

The extinction coefficient k of the ZnS—SiO2 (the molar ratio: 80:20) is about $1 \times 10^{-3}$ on the wavelength of 405 nm. On the other hand, the extinction coefficient k of the recording layer 4 formed with the mixed inorganic material is about $1 \times 10^{-1}$ on the wavelength of 405 nm. Therefore, in the embodiment 1, as a result of adding the material C to the recording layer, it turned out that the extinction coefficient k can be made to about $1 \times 10^{-1}$, and it is possible to make the absorption of a blue semiconductor laser beam easy. The extinction coefficient k was measured using the spectroscopic ellipsometer (from J. A. Woollam Japan, VASE).

In the write-once information recording medium of the embodiment 1 shown in FIG. 45A and FIG. 45B, the recording layer 4 is inserted between the lower dielectric layer 3 and the upper dielectric layer 5. In contrast, in the write-once information recording medium of the embodiment 2 shown in FIG. 47A and FIG. 47B, the lower dielectric layer 3 and the upper dielectric layer 5 do not exist, but the recording layer 4 is formed on the substrate 1, and the protection layer 6 is directly formed on the recording layer 4. The thickness of the recording layer 4 in the embodiment 1 was 15 nm, but the thickness of the recording layer 4 in the embodiment 2 is changed to 40 nm.

Figure 47B:
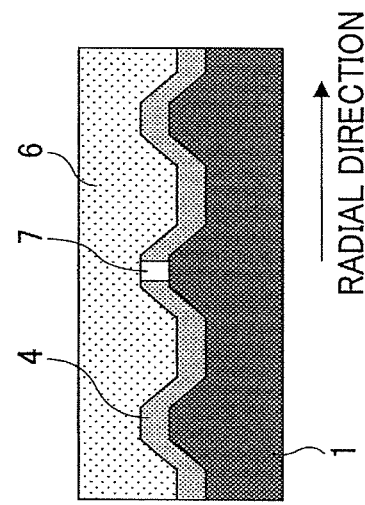
FIG. 47A and FIG. 47B are diagrams showing the composition of an optical information recording medium in an embodiment of the invention.
Figure 47A:
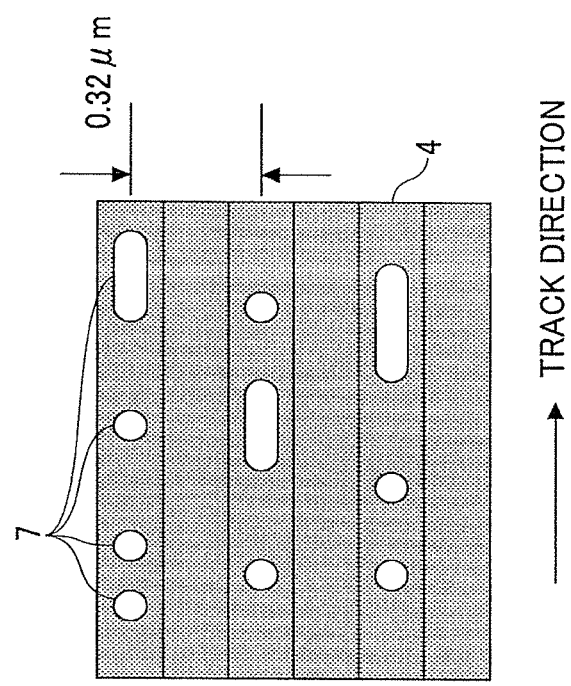

FIG. 47A is a plan view of the write-once information recording medium of the embodiment 2, and FIG. 47B is a cross-sectional diagram of the write-once information recording medium of the embodiment 2.

The write-once information recording medium of the embodiment 1 has the composition in which the recording layer 4 is interposed between the lower dielectric layer 3 and the upper dielectric layer 5, and is excellent in reliability compared with the write-once information recording medium of the embodiment 2. Similar to that of the write-once information recording medium of the embodiment 1, the write-once information recording medium of the embodiment 2 is checked as to whether recording and reproduction of the information based on the random data in the recording layer 4 can be performed. As a result of the checking, it turned out that the recording and reproduction can be performed similar to the write-once information recording medium of the embodiment 1.

Figure 48A:
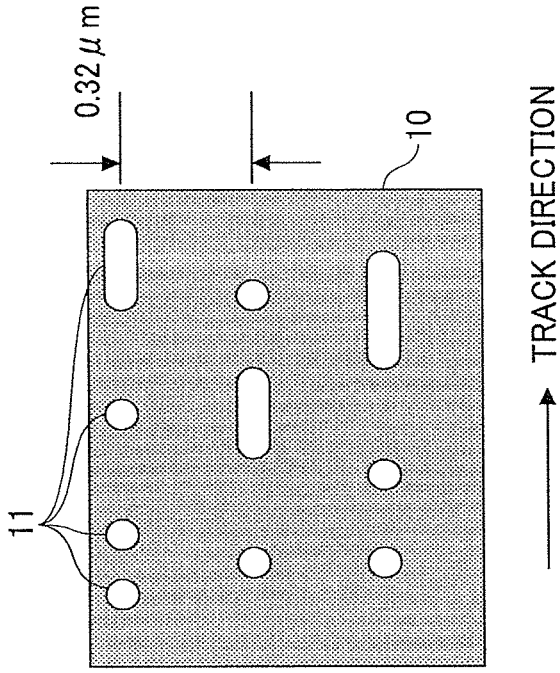

In the embodiment 3, the master substrate for optical information recording media (disk) was produced. The plan view of the master substrate produced in the embodiment 3 is shown in FIG. 48A. As shown in FIG. 48A, the recording pits 11 are formed on the thin film 10. The track pitch is 0.32 micrometer and the shortest pit size is 150 nm. The substrate used is the quartz substrate.

If the master substrate of quartz obtained in the embodiment 3 is used, a stamper for optical disc injection molding and an optical information recording medium can be produced.

Next, the method of manufacturing the master substrate of FIG. 48A will be explained with reference to FIG. 48B.

FIG. 48B is a cross-sectional diagram showing the master substrate. The recording pits 11 (concave pattern (holes or indentations)) are formed when the thin film 10 which is the pattern formation layer formed on the quartz substrate 14 is irradiated by the laser beam 13 which is focused using the objective lens 12.

The method of manufacturing the master substrate will be explained. First, the quartz substrate with high surface accuracy was prepared. Then, RF sputtering is performed using the sputtering apparatus CFS-8EP-55 (from Shibaura Mechatronics Co.) to form the pattern formation layer of ZnS, SiO2 and Zn (the mixed inorganic material, the molar ratio: 54:13:33) of the substrate. The thickness of the pattern formation layer is about 40 nm. It is the pattern formation layer before a fine pattern is formed.

Next, as shown in FIG. 48B, using the objective lens 12 (lens NA: 0.85) of the laser beam irradiation apparatus LA330 (from Shibasoku Co.), the blue laser beam 13 (wavelength: 405 nm) is focused on the pattern formation layer. The laser beam is multi-pulse modulated, and the laser beam irradiation is performed so that random data is recorded in the recording layer.

The hole-like pits (concave pattern) are formed at the laser irradiation portions of the pattern formation layer according to this process. By the atomic force microscope (AFM) and the scanning electron microscope (SEM), the formation of the pits was also confirmed. The depth of the pits is about 40 nm. This corresponds to the thickness of the pattern formation layer formed of the mixed inorganic material. In the measurement using the ellipsometer VASE (from J. A. Woollam Japan), the extinction coefficient k of the pattern formation layer formed of the mixed inorganic material was about $1 \times 10^{-2}$.

The quartz substrate in which the pits are formed in the pattern formation layer can be used as a master substrate of a stamper for optical disc injection molding.

Next, based on the master substrate of the embodiment 3, Ni electroforming was performed and Ni stamper was actually produced. Then, the BD-ROM substrate was produced by injection molding or 2P transfer (Photo-Polymerization) using the Ni stamper.

Figure 49:
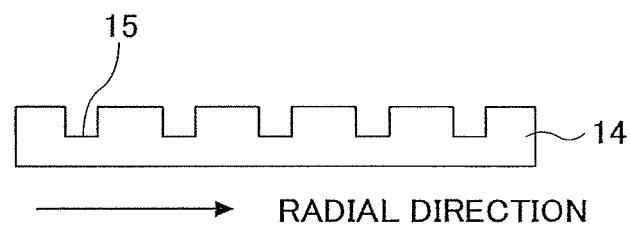
FIG. 49 is a diagram showing the composition of a quartz substrate on which recording pits are formed.

In the above case, the Ni electroforming was performed, and it installs in RIE (Reactive Ion Etching) equipment, and etching by CF4 gas is performed, and Ni electroforming may be performed after making form reflect on the quartz substrate. The section of quartz substrate 14 in which the recording pits 15 are formed in the quartz surface is shown in FIG. 49.

The recording pit 15 was formed in the pattern formation layer formed by ZnS, SiO2 and Zn (the mixed inorganic material, material A, material B and material C). The quartz substrate 14 of FIG. 49 was producible, when RIE etching and hydrofluoric acid removed this pattern formation layer (SiO2 is etched with hydrofluoric acid) and a residue removed further using argon gas.

The master substrate for optical information recording media was produced. The surface schematic diagram of a master substrate is shown in FIG. 48A. As shown in FIG. 48A, recording pit 11 is formed on thin film 10. The track pitch is 0.32 micrometer and the shortest pit size is 150 nm. The substrate material is quartz. The master substrate made from quartz origin a stamper for optical disc injection moldings an optical information recording medium is further producible.

The method of manufacturing the master substrate of FIG. 48A will be explained with reference to FIG. 48B. FIG. 48B is a cross-sectional diagram.

The recording pits 11 are formed by irradiating the thin film 10 (pattern formation layer) on the quartz substrate 14 by the laser beam 13 which is focused with the objective lens 12.

First, the quartz substrate with high surface accuracy was prepared. Then, it is RF sputtering about the pattern formation layer formed using a sputtering apparatus CFS-8EP-55 (from Shibaura Mechatronics Co.) by ZnS, SiO2 and AgInSbTe (the mixed inorganic material, the molar ratio: 54:13:33).

On the quartz substrate, it formed by a thickness of 40 nm. This layer was used as the pattern formation layer. The composition ratio of AgInSbTe is 6:0.7:25.1:68.2 ($Ag_6In_{0.7}Sb_{25.1}Te_{68.2}$). In the following, it is referred to as AgInSbTe, for the sake of convenience.

Next, as shown in FIG. 48B, the blue laser beam 13 (the wavelength: 405 nm) is focused with the objective lens 12 (lens NA: 0.85) of the laser beam irradiation equipment and applied to the pattern formation layer, and the laser beam is multi-pulse modulated so that the random data is recorded.

The hole-like pits (concave pattern) are formed in the laser irradiation portions of the pattern formation layer of this process. Checking formation of this pit (concave pattern) with the atomic force microscope (AFM) and the scanning electron microscope (SEM), the depth is about 40 nm and was equivalent to the thickness of the pattern formation layer. The extinction coefficient k of the pattern formation layer formed of the mixed inorganic material was about $1 \times 10^{-1}$.

Thus, the quartz substrate in which the pit was formed can be used as a master substrate of a stamper for optical disc injection moldings. Ni (nickel) electroforming was actually performed based on the master substrate by the invention, and Ni stamper was produced. Then, the read-only medium (ROM) was produced by injection molding or 2P transfer (photo-polymerization) using the Ni stamper.

In this embodiment, AgInSbTe was used as the material C which is the added mixture to (ZnS) of the material A and (SiO2) of the material B. The AgInSbTe is the 4 element-based mixture of inorganic material. The hole (pit) can be formed in the pattern formation layer and the master substrate can be produced by this material C. Accordingly, if the material (inorganic material of a metal, a semimetal, or a semiconductor) which adds the optical absorption ability is used as the material C and the irradiation conditions of the laser beam corresponding to the optical absorption ability in the mixed inorganic material are chosen suitably, the production of the master substrate is possible.

Figure 50A:
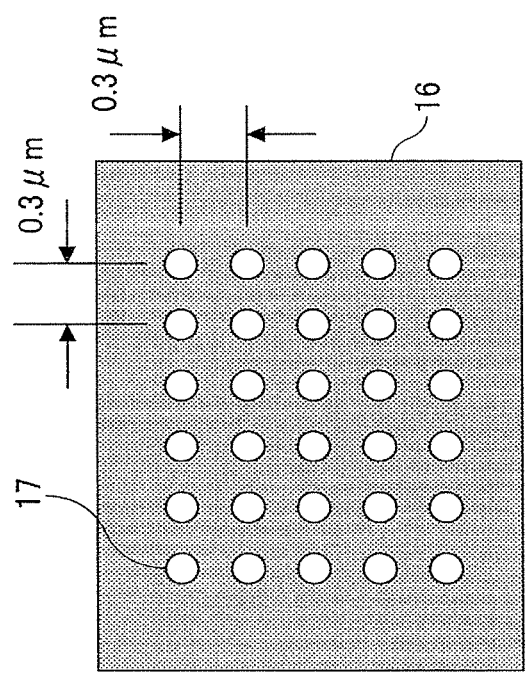
FIG. 50A and FIG. 50B are diagrams showing the composition of a master substrate for an optical nonreflection film in an embodiment of the invention.
Figure 50B:
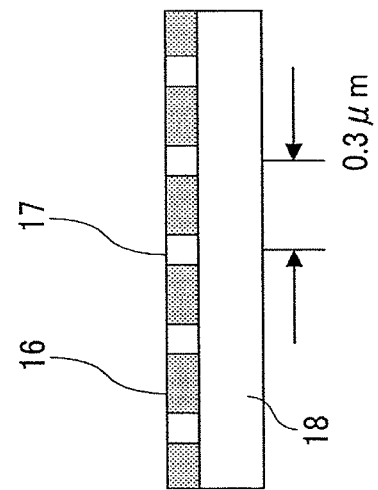

The master substrate for optical nonreflection films (antireflection films) is produced. The schematic diagrams of the master substrate for optical nonreflection films are shown in FIG. 50A and FIG. 50B. FIG. 50A is a top view of the master substrate in which the pattern including the periodical structure of circular pits 17 is schematically shown. FIG. 50B is a cross-sectional diagram of the master substrate.

The period is about 300 nm, the cavity diameter is about 80 nm, and the film thickness is about 20 nm. The substrate is a quartz substrate and the pattern formation layer 16 of the mixed inorganic material is formed.

The materials (the mixed inorganic material) of the periodical structure in the pattern formation layer 16 formed on the quartz substrate 18 are ZnS, SiO2 and Zn (68:17:15).

When compared with a quartz substrate of the same thickness in which the periodical structure is not formed, the transmittance to the light with the wavelength in a range of 400-600 nm is increased, and it is possible to produce a master substrate on which an optical nonreflection film attaining nearly 100% nonreflection is formed. This is because the periodical structure by the minute structure turns into the moth-eye structure, which controls the reflection and makes the incident light penetrate.

Although it is possible to use the master substrate itself as an optical nonreflection film, the reproduction of many optical nonreflection films through Ni electroforming by using it as the master mold is suitable for volume production. The optical nonreflection film is used for polarizing plates, such as a rear projection screen and a projector display, a solar cell, etc.

The manufacturing method will be explained. First, on the quartz substrate 18, a thin film 16 (pattern formation layer) of ZnS, SiO2 and Zn (the molar ratio: 68:17:15) is formed. After forming the thin film, it is placed on the XY stage and the thin film 16 (pattern formation layer) is irradiated by the blue laser beam (the wavelength: 405 nm) which is focused using the objective lens (NA: 0.85).

The periodic pits are formed by irradiating it by the pulsed light at given intervals (the period: 300 nm, the laser power: 11 mW). After the master substrates are produced with the wafer, it is divided into pieces of several millimeter square by dicing, and rinsing is performed to remove impurities therefrom.

Figure 51:
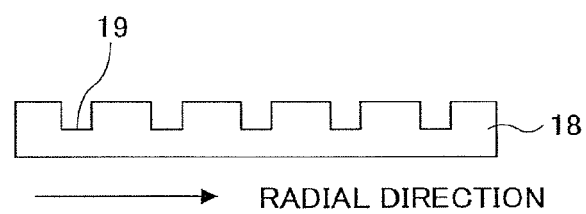
FIG. 51 is a diagram showing the composition of a quartz substrate on which a pattern is formed.

FIG. 51 is a cross-sectional diagram of the quartz substrate 18 to which etching is performed using the quartz substrate having the pattern formation layer in which the periodic pits are formed.

The pattern 19 is formed on the quartz substrate 18. The film of the mixed inorganic material which is formed in the pattern can be used as an optical nonreflection film. However, when the materials of the substrate and the material of the thin film differ from each other, the effect as the optical nonreflection film may fade and exfoliation may arise at the tome of a next dicing process. To avoid the problem, the film of the mixed inorganic material is etched to the quartz substrate 18, and copying of the pattern is performed by transferring the pits (pattern) to the quartz substrate.

The configuration of the pattern 19 (pits) formed on the surface of quartz substrate 18 is quite near the configuration of the structure of ZnS, SiO2 and Zn (the molar ratio: 68:17:15) which is used as the mask (resist).

In this case, the etching rate of the structure of ZnS, SiO2 and Zn (the molar ratio: 68:17:15) to CF4 is small enough, and the configuration of a high aspect ratio (the vertical length is large than the horizontal length) is producible.

Figure 52A:
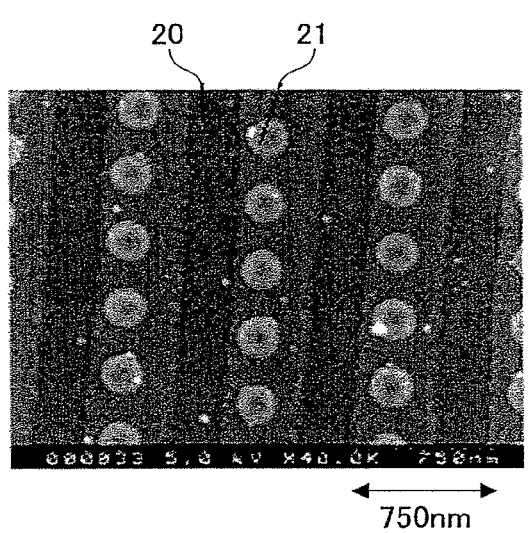
FIG. 52A and FIG. 52B are diagrams showing scanning electron microscope photographs of samples of an optical information recording medium in an embodiment of the invention in which a recording layer formed of a mixed inorganic material is irradiated by a laser beam.
Figure 52B:
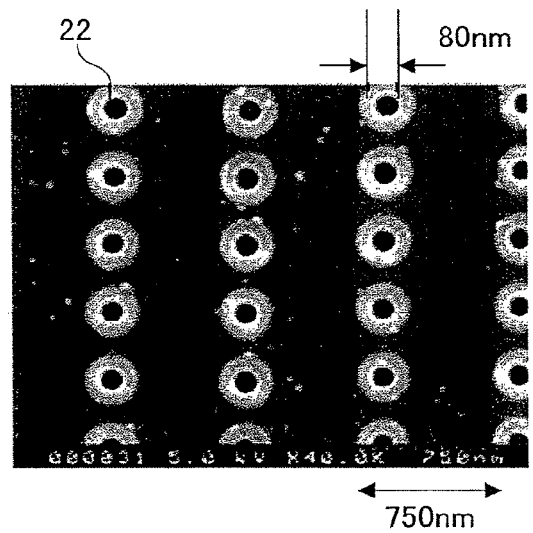

FIG. 52A and FIG. 52B show scanning electron microscope photographs of samples of the optical information recording medium in an embodiment of the invention in which a recording layer formed of a mixed inorganic material is irradiated by a laser beam. The mixed target of ZnS, SiO2 and Ag (the molar ratio: 72:18:10) is used, sputtering is performed so that the thin film 20 with the thickness of 40 nm is formed on the substrate of polycarbonate, and each sample is irradiated by the laser beam (the wavelength: 405 nm, NA: 0.85).

In the case of FIG. 52A, the laser power is 8 mW. The expansion parts 21 are created in the thin film 20. In the case of FIG. 52B, the laser power is 9 mW. The holes 22 with the diameter of about 80 nm are created. If the material which can form the mixed target is used, the mixed target can be produced with any of metals, semimetals and semiconductors may be used.

ZnO which has a large transmittance to blue laser than other elements may be used as the material C, instead of Ag. Specifically, when ZnTe—ZnO is used as the material C and the mixed material of ZnS, SiO2, ZnTe and ZnO (64:18:10:8) is produced and irradiated by the laser beam in the same manner, the holes with the ends being sharp was able to be formed.

It has been confirmed that the pits can be formed also when any of InSb, AgInSbTe, and GeSbTe is used as the material C, instead of Ag, and the laser beam irradiation is performed.

The write-once information recording medium of the invention is applicable as write-once recording media including CD-R, DVD-R, HD DVD (High-Definition Digital Versatile Disc), and BD-R (Blu-ray Disc-Recordable). The information recording medium of the invention is also applicable to a multilayer disc in which two or more recording layers are formed in a single optical recording medium in order to increase the storage capacity. The write-once information recording medium of the invention is also applicable to a single-layer disk in which tracks with a narrow track pitch are formed within the recording layer, in order to increase the storage capacity.

The master substrate of the invention is appropriate for use as master substrates for read-only media (ROM: Read Only Memory) or for nano-imprinting in manufacturing information recording media with low cost.

The present invention is not limited to the above-described embodiments, and variations and modifications may be made without departing from the scope of the present invention.

The present application is based on and claims the benefit of priority of Japanese patent application No. 2007-071485, filed on Mar. 19, 2007, Japanese patent application No. 2007-079482, filed on Mar. 26, 2007, Japanese patent application No. 2007-120218, filed on Apr. 27, 2007, and Japanese patent application No. 2007-276730, filed on Oct. 24, 2007, the contents of which are incorporated by reference in their entirety.

What is claimed is:

1. An information recording medium, comprising:
   a substrate; and
   a mixed inorganic material that is deposited on the substrate,
   wherein the mixed inorganic material contains a sulfur compound and a silicon oxide, and wherein the information recording medium includes minute structures, wherein the minute structures contain the mixed inorganic material, wherein the information recording medium is encoded with information, and wherein the minute structures are configured to emit fluorescent light in response to irradiation of the information recording medium, to thereby reproduce the information from the information recording medium, wherein each of the minute structures has a hemispherical configuration, wherein the mixed inorganic material further contains an inorganic material which is different from the sulfur compound and the silicon oxide and chosen from among a metal, a semimetal, and a semiconductor, and wherein the inorganic material which is different from the sulfur compound and the silicon oxide includes fluorescent material for emitting the fluorescent light in response to the irradiation of the information recording medium, such that the minute structures contain the fluorescent material, to thereby reproduce the information from the information recording medium, and wherein the fluorescent material includes CdSe or CdTe.

2. The information recording medium according to claim 1, further comprising a dielectric layer which is deposited on the substrate.

* * * * *